US012688657B2

(12) United States Patent
Newman et al.

(10) Patent No.: US 12,688,657 B2
(45) Date of Patent: Jul. 21, 2026

(54) SYSTEMS, METHODS, AND GRAPHICAL USER INTERFACES FOR APPLYING VIRTUAL EFFECTS IN THREE-DIMENSIONAL ENVIRONMENTS

(71) Applicant: Apple Inc., Cupertino, CA (US)

(72) Inventors: Joanna M. Newman, San Jose, CA (US); Daniel Escudero, San Francisco, CA (US); Corbin F. Peters, San Mateo, CA (US); Joseph-Alexander P. Weil, San Anselmo, CA (US); Juan Gril, San Francisco, CA (US); Jose Moises Tafolla Carmona, San Jose, CA (US)

(73) Assignee: APPLE INC., Cupertino, CA (US)

( * ) Notice: Subject to any disclaimer, the term of this patent is extended or adjusted under 35 U.S.C. 154(b) by 100 days.

(21) Appl. No.: 18/437,634

(22) Filed: Feb. 9, 2024

(65) Prior Publication Data

US 2024/0273832 A1 Aug. 15, 2024

Related U.S. Application Data

(60) Provisional application No. 63/445,164, filed on Feb. 13, 2023.

(51) Int. Cl.
  *G06T 19/00* (2011.01)
  *G06T 13/40* (2011.01)
  (Continued)

(52) U.S. Cl.
  CPC ............ *G06T 19/006* (2013.01); *G06T 13/40* (2013.01); *G06V 20/44* (2022.01); *G06V 40/20* (2022.01)

(58) Field of Classification Search
  CPC ........ G06V 20/44; G06V 40/20; G06V 20/20; G06T 19/006; G06T 13/40; G06T 7/70; G06T 19/20; G06T 19/00; G06F 3/011
  See application file for complete search history.

(56) References Cited

U.S. PATENT DOCUMENTS 7,072,810 B2 7/2006 Ramanathan et al.
8,244,462 B1 8/2012 Zhu
  (Continued)

FOREIGN PATENT DOCUMENTS

AU 2018101226 A4 9/2018
AU 2019100486 A4 6/2019
  (Continued)

OTHER PUBLICATIONS

Office Action, dated May 23, 2024, received in European U.S. Appl. No. 17/202,233, which corresponds with U.S. Appl. No. 17/202,233, 6 pages.
  (Continued)

*Primary Examiner* — Xilin Guo
(74) *Attorney, Agent, or Firm* — Morgan, Lewis & Bockius LLP

(57) ABSTRACT

A computer system, in response to detecting the occurrence of a first event, applies a first virtual effect to the representation of the field of view of the one or more cameras, including: applying the first virtual effect with a first set of values for a first characteristic of the first virtual effect, wherein the first set of values for the first characteristic of the first virtual effect are selected in accordance with segmentation of the view of the first physical object from the view of the portion of the first physical environment; and applying the first virtual effect with a second set of values for a second characteristic of the first virtual effect, wherein the second set of values for the second characteristic of the first virtual effect are selected in accordance with tracking of movement of one or more portions of the first physical object.

42 Claims, 30 Drawing Sheets

(51) Int. Cl.
    *G06V 20/40*      (2022.01)
    *G06V 40/20*      (2022.01)

(56)         References Cited

U.S. PATENT DOCUMENTS

| | | | |
|---|---|---|---|
| 8,365,081 B1 | 1/2013 | Amacher et al. | |
| 8,982,156 B2 | 3/2015 | Maggiore | |
| 9,152,209 B2 | 10/2015 | Jeong et al. | |
| 9,330,500 B2 | 5/2016 | Karsch et al. | |
| 9,448,687 B1 | 9/2016 | McKenzie et al. | |
| 9,495,794 B2 | 11/2016 | Masumoto | |
| 9,661,308 B1 | 5/2017 | Wang et al. | |
| 9,665,960 B1 | 5/2017 | Masters et al. | |
| 9,678,651 B2 | 6/2017 | Moha et al. | |
| 9,696,897 B2 | 7/2017 | Garcia | |
| 9,767,606 B2 | 9/2017 | Kapinos et al. | |
| 9,830,532 B1 | 11/2017 | Lina | |
| 9,846,027 B2 | 12/2017 | Kimura et al. | |
| 9,870,644 B2 | 1/2018 | Ha et al. | |
| 9,952,820 B2 | 4/2018 | Anderson et al. | |
| 9,953,434 B2 | 4/2018 | Natori et al. | |
| 10,049,504 B2 | 8/2018 | Chen et al. | |
| 10,074,179 B2 | 9/2018 | Arita et al. | |
| 10,268,266 B2 | 4/2019 | Mathey-Owens et al. | |
| 10,296,869 B2 | 5/2019 | Hulth | |
| 10,347,033 B2 | 7/2019 | Masumoto | |
| 10,438,262 B1 | 10/2019 | Helmer et al. | |
| 10,445,867 B2 | 10/2019 | Glatfelter et al. | |
| 10,540,699 B1 | 1/2020 | Prabhu et al. | |
| 10,606,075 B2 | 3/2020 | Choi et al. | |
| 10,606,609 B2 | 3/2020 | Energin et al. | |
| 10,762,716 B1 | 9/2020 | Paul et al. | |
| 10,861,241 B2 | 12/2020 | Ghaleb | |
| 10,972,680 B2 | 4/2021 | Wigdor et al. | |
| 10,999,629 B1 | 5/2021 | Cieslak et al. | |
| 11,204,678 B1 | 12/2021 | Baker et al. | |
| 11,449,189 B1 * | 9/2022 | Bond | G06F 3/0482 |
| 11,523,063 B2 | 12/2022 | Ith et al. | |
| 2008/0008361 A1 | 1/2008 | Nozaki et al. | |
| 2008/0222233 A1 | 9/2008 | Shi et al. | |
| 2008/0255961 A1 | 10/2008 | Livesey | |
| 2009/0002719 A1 | 1/2009 | Chang et al. | |
| 2010/0235726 A1 | 9/2010 | Ording | |
| 2011/0022942 A1 | 1/2011 | Flemings et al. | |
| 2011/0107270 A1 | 5/2011 | Wang et al. | |
| 2011/0216167 A1 | 9/2011 | Katz et al. | |
| 2011/0249117 A1 | 10/2011 | Yoshihama et al. | |
| 2011/0252405 A1 | 10/2011 | Meirman et al. | |
| 2011/0279381 A1 | 11/2011 | Tong et al. | |
| 2011/0279445 A1 | 11/2011 | Murphy et al. | |
| 2011/0304607 A1 | 12/2011 | Ito | |
| 2012/0121134 A1 | 5/2012 | Yoshizumi | |
| 2012/0194544 A1 | 8/2012 | Yokohata | |
| 2012/0249741 A1 | 10/2012 | Maciocci et al. | |
| 2013/0044128 A1 | 2/2013 | Liu et al. | |
| 2013/0127895 A1 | 5/2013 | Miller et al. | |
| 2013/0215230 A1 | 8/2013 | Miesnieks et al. | |
| 2013/0332892 A1 | 12/2013 | Matsuki | |
| 2014/0071130 A1 | 3/2014 | Piedmonte | |
| 2014/0098191 A1 | 4/2014 | Rime et al. | |
| 2014/0125668 A1 | 5/2014 | Steed et al. | |
| 2014/0362111 A1 | 12/2014 | Kim et al. | |
| 2015/0062120 A1 | 3/2015 | Reisner-Kollmann et al. | |
| 2015/0062123 A1 | 3/2015 | Yuen | |
| 2015/0067588 A1 | 3/2015 | Shim et al. | |
| 2015/0074711 A1 | 3/2015 | Spitz et al. | |
| 2015/0169525 A1 | 6/2015 | Palm et al. | |
| 2015/0187119 A1 | 7/2015 | Masumoto | |
| 2015/0193982 A1 | 7/2015 | Mihelich et al. | |
| 2015/0221345 A1 | 8/2015 | Zhao et al. | |
| 2015/0227645 A1 | 8/2015 | Childs et al. | |
| 2016/0004300 A1 | 1/2016 | Baic | |
| 2016/0026253 A1 | 1/2016 | Bradski et al. | |
| 2016/0040981 A1 | 2/2016 | Kang et al. | |
| 2016/0049004 A1 | 2/2016 | Mullens et al. | |
| 2016/0049011 A1 | 2/2016 | Kasahara et al. | |
| 2016/0063714 A1 | 3/2016 | Middleton et al. | |
| 2016/0086322 A1 | 3/2016 | Arita et al. | |
| 2016/0147408 A1 | 5/2016 | Bevis et al. | |
| 2016/0148433 A1 | 5/2016 | Petrovskaya et al. | |
| 2016/0163063 A1 | 6/2016 | Ashman | |
| 2016/0170624 A1 | 6/2016 | Zambetti et al. | |
| 2016/0189426 A1 | 6/2016 | Thomas et al. | |
| 2016/0210602 A1 | 7/2016 | Siddique et al. | |
| 2016/0240011 A1 | 8/2016 | Metaio et al. | |
| 2016/0329006 A1 | 11/2016 | Weber et al. | |
| 2016/0363990 A1 | 12/2016 | Key | |
| 2017/0021273 A1 | 1/2017 | Rios | |
| 2017/0053621 A1 | 2/2017 | Chen et al. | |
| 2017/0061696 A1 | 3/2017 | Li et al. | |
| 2017/0115488 A1 | 4/2017 | Ambrus et al. | |
| 2017/0132841 A1 | 5/2017 | Morrison | |
| 2017/0212585 A1 | 7/2017 | Kim et al. | |
| 2017/0220887 A1 | 8/2017 | Fathi et al. | |
| 2017/0230641 A1 | 8/2017 | Scavezz et al. | |
| 2017/0277670 A1 | 9/2017 | Smith et al. | |
| 2017/0289221 A1 | 10/2017 | Khalid et al. | |
| 2017/0316576 A1 | 11/2017 | Colbert et al. | |
| 2017/0358142 A1 | 12/2017 | Lee et al. | |
| 2017/0372510 A1 | 12/2017 | Ye et al. | |
| 2018/0004283 A1 | 1/2018 | Mathey-Owens et al. | |
| 2018/0045963 A1 | 2/2018 | Hoover et al. | |
| 2018/0075301 A1 | 3/2018 | Everhart et al. | |
| 2018/0088794 A1 | 3/2018 | Graham et al. | |
| 2018/0114372 A1 | 4/2018 | Nagy et al. | |
| 2018/0165888 A1 | 6/2018 | Duan et al. | |
| 2018/0199039 A1 * | 7/2018 | Trepte | G06T 15/405 |
| 2018/0203561 A1 | 7/2018 | Chang et al. | |
| 2018/0203581 A1 | 7/2018 | Takeda | |
| 2018/0204385 A1 | 7/2018 | Sarangdhar et al. | |
| 2018/0300952 A1 | 10/2018 | Evans et al. | |
| 2018/0336732 A1 | 11/2018 | Schuster | |
| 2018/0336737 A1 | 11/2018 | Varady et al. | |
| 2019/0005730 A1 * | 1/2019 | Xu | G06F 3/012 |
| 2019/0033058 A1 | 1/2019 | Tsurumi | |
| 2019/0051054 A1 | 2/2019 | Jovanovic et al. | |
| 2019/0065027 A1 | 2/2019 | Hauenstein et al. | |
| 2019/0068889 A1 | 2/2019 | Lee et al. | |
| 2019/0172261 A1 | 6/2019 | Alt et al. | |
| 2019/0180082 A1 | 6/2019 | Moravec et al. | |
| 2019/0180506 A1 | 6/2019 | Gebbi et al. | |
| 2019/0180512 A1 | 6/2019 | Fedosov et al. | |
| 2019/0213389 A1 | 7/2019 | Peruch et al. | |
| 2019/0221035 A1 | 7/2019 | Clark et al. | |
| 2019/0221041 A1 | 7/2019 | Lin | |
| 2019/0289419 A1 * | 9/2019 | Eronen | G06T 19/006 |
| 2019/0310757 A1 | 10/2019 | Lee et al. | |
| 2019/0311512 A1 | 10/2019 | VanBlon et al. | |
| 2019/0333278 A1 | 10/2019 | Palangie et al. | |
| 2019/0339058 A1 | 11/2019 | Dryer et al. | |
| 2019/0339839 A1 | 11/2019 | Paul, Sr. et al. | |
| 2019/0340799 A1 | 11/2019 | Dryer et al. | |
| 2019/0355121 A1 | 11/2019 | Nelson et al. | |
| 2019/0369404 A1 | 12/2019 | Joshi et al. | |
| 2019/0369722 A1 | 12/2019 | Lehtiniemi et al. | |
| 2020/0005538 A1 | 1/2020 | Neeter | |
| 2020/0020164 A1 | 1/2020 | Coffman et al. | |
| 2020/0027201 A1 | 1/2020 | Chen | |
| 2020/0053318 A1 | 2/2020 | Li et al. | |
| 2020/0074743 A1 | 3/2020 | Zheng et al. | |
| 2020/0098140 A1 | 3/2020 | Jagnow et al. | |
| 2020/0106965 A1 | 4/2020 | Lam et al. | |
| 2020/0143593 A1 | 5/2020 | Rudman et al. | |
| 2020/0184667 A1 | 6/2020 | Miller et al. | |
| 2020/0200794 A1 | 6/2020 | Niles et al. | |
| 2020/0226823 A1 | 7/2020 | Stachniak et al. | |
| 2020/0232783 A1 | 7/2020 | Dryer et al. | |
| 2020/0261799 A1 | 8/2020 | Cahill et al. | |
| 2020/0312029 A1 | 10/2020 | Heinen et al. | |
| 2020/0322595 A1 | 10/2020 | Abe et al. | |
| 2020/0368616 A1 * | 11/2020 | Delamont | H04N 13/239 |
| 2020/0382718 A1 | 12/2020 | Malia et al. | |
| 2021/0004996 A1 | 1/2021 | Murillo et al. | |
| 2021/0019946 A1 | 1/2021 | Sonasath et al. | |

(56)  References Cited

U.S. PATENT DOCUMENTS

| | | |
|---|---|---|
| 2021/0096726 A1 | 4/2021 | Faulkner et al. |
| 2021/0097768 A1 | 4/2021 | Malia et al. |
| 2021/0097776 A1 | 4/2021 | Faulkner et al. |
| 2021/0158427 A1 | 5/2021 | Jobetto et al. |
| 2021/0174596 A1 | 6/2021 | Zhang et al. |
| 2021/0191600 A1 | 6/2021 | Lemay et al. |
| 2021/0241483 A1 | 8/2021 | Dryer et al. |
| 2021/0241505 A1 | 8/2021 | Dryer et al. |
| 2021/0254962 A1 | 8/2021 | Dryer et al. |
| 2021/0286502 A1 | 9/2021 | Lemay et al. |
| 2021/0295602 A1 | 9/2021 | Scalpel et al. |
| 2021/0304465 A1 | 9/2021 | Dryer et al. |
| 2022/0036648 A1 | 2/2022 | Wang et al. |
| 2022/0091722 A1 | 3/2022 | Faulkner et al. |
| 2022/0092861 A1 | 3/2022 | Sharma et al. |
| 2022/0130118 A1 | 4/2022 | Malia et al. |
| 2022/0239842 A1 | 7/2022 | Malia et al. |
| 2022/0276041 A1 | 9/2022 | Dryer et al. |
| 2022/0335697 A1* | 10/2022 | Harding ................ G06T 15/00 |
| 2023/0199296 A1 | 6/2023 | Malia et al. |
| 2023/0368458 A1 | 11/2023 | Dryer et al. |
| 2023/0386146 A1 | 11/2023 | Scapel et al. |
| 2024/0011764 A1 | 1/2024 | Dryer et al. |
| 2024/0045564 A1 | 2/2024 | Dryer et al. |
| 2024/0153219 A1 | 5/2024 | Queen et al. |
| 2024/0290051 A1 | 8/2024 | Malia et al. |
| 2025/0102291 A1 | 3/2025 | Dryer et al. |
| 2025/0231660 A1 | 7/2025 | Dryer et al. |
| 2025/0322618 A1 | 10/2025 | Malia et al. |
| 2026/0065577 A1 | 3/2026 | Dryer et al. |

FOREIGN PATENT DOCUMENTS

| | | |
|---|---|---|
| CN | 1629888 A | 6/2005 |
| CN | 102607423 A | 7/2012 |
| CN | 103218854 A | 7/2013 |
| CN | 105103198 A | 11/2015 |
| CN | 105164999 A | 12/2015 |
| CN | 105554247 A | 5/2016 |
| CN | 105579946 A | 5/2016 |
| CN | 105589199 A | 5/2016 |
| CN | 105608746 A | 5/2016 |
| CN | 106164934 A | 11/2016 |
| CN | 106251185 A | 12/2016 |
| CN | 106575299 A | 4/2017 |
| CN | 108886601 A | 11/2018 |
| CN | 112189220 B | 1/2021 |
| EP | 1563370 A | 8/2005 |
| EP | 2 394 714 A1 | 12/2011 |
| EP | 2 983 139 A1 | 2/2016 |
| EP | 2 988 486 A1 | 2/2016 |
| EP | 3017591 A1 | 5/2016 |
| JP | 6264665 B2 | 11/2002 |
| JP | 2004-145448 A | 5/2004 |
| JP | 2008-287691 A | 11/2008 |
| JP | 2011-070495 A | 4/2011 |
| JP | 2011-199560 | 10/2011 |
| JP | 2011-259243 A | 12/2011 |
| JP | 2013-229672 A | 11/2013 |
| JP | 2014-071499 A | 4/2014 |
| JP | 2014-143453 A | 8/2014 |
| JP | 2015-080199 A | 4/2015 |
| JP | 2015-146173 A | 8/2015 |
| JP | 2016-110676 A | 6/2016 |
| JP | 2017-111515 A | 6/2017 |
| JP | 2017-120531 A | 7/2017 |
| JP | 6189496 B1 | 8/2017 |
| JP | 2017-536618 A | 12/2017 |
| JP | 2019-516180 A | 6/2019 |
| JP | 2019-145072 A | 8/2019 |
| KR | 20100003252 A | 1/2010 |
| KR | 20130108684 A | 10/2013 |
| KR | 20150018828 A | 2/2015 |
| KR | 101629134 B1 | 6/2016 |
| KR | 20160141688 A | 12/2016 |
| KR | 20170087501 A | 7/2017 |
| KR | 20180066276 A | 6/2018 |
| KR | 20210031894 A | 3/2021 |
| KR | 20210081904 A | 7/2021 |
| WO | WO 2011/029209 A1 | 3/2011 |
| WO | WO 2013/096052 A2 | 6/2013 |
| WO | WO 2013/099616 A1 | 7/2013 |
| WO | WO 2013/176830 A | 11/2013 |
| WO | WO 2014/013689 A1 | 1/2014 |
| WO | WO 2014/157340 A1 | 10/2014 |
| WO | WO 2014/197631 A1 | 12/2014 |
| WO | WO 2016/017254 A1 | 2/2016 |
| WO | WO 2017/134886 | 8/2017 |
| WO | WO 2018/164932 A | 9/2018 |
| WO | WO 2019/032736 A1 | 2/2019 |
| WO | WO 2017/213070 A1 | 4/2019 |
| WO | WO 2019/087564 A1 | 5/2019 |
| WO | WO 2019/095816 A1 | 5/2019 |
| WO | WO 2019/217148 A1 | 11/2019 |
| WO | WO 2020/068073 A1 | 4/2020 |
| WO | WO 2021/158427 A1 | 8/2021 |

OTHER PUBLICATIONS

Patent, dated May 13, 2024, received in Japanese Patent Application No. 2022-142210, which corresponds with U.S. Appl. No. 17/344,846, 3 pages.

Extended European Search Report, dated Apr. 26, 2024, received in European Patent Application No. 24151350.6, which corresponds with U.S. Appl. No. 17/750,133, 8 pages.

Office Action, dated Jun. 3, 2025, received in Indian Patent Application No. 202318041184, which corresponds with U.S. Appl. No. 16/138,779, 8 pages.

Office Action, dated Mar. 24, 2025, received in Japanese Patent Application No. 2024-060325, which corresponds with U.S. Appl. No. 16/138,779, 5 pages.

Patent, dated Jul. 7, 2025, received in Japanese Patent Application No. 2024-060325, which corresponds with U.S. Appl. No. 16/138,779, 4 pages.

Office Action, dated Apr. 28, 2025, received in European Patent Application No. 19783191.0, which corresponds with U.S. Appl. No. 16/574,029, 6 pages.

Office Action, dated Jun. 3, 2025, received in Indian Patent Application No. 202318041182, 9 pages.

Notice of Allowance, dated May 27, 2025, received in Chinese Patent Application No. 202210629947.3, which corresponds with U.S. Appl. No. 17/030,209, 5 pages.

Office Action, dated Apr. 16, 2025, received in European Application No. 20789374.4, which corresponds with U.S. Appl. No. 17/030,209, 14 pages.

Office Action, dated Jun. 6, 2025, received in Indian Patent Application No. 202318041185, 8 pages.

Notice of Allowance, dated Jul. 15, 2025, received in U.S. Appl. No. 18/144,746, 9 pages.

Patent, dated Apr. 1, 2025, received in European Patent Application No. 24151350.6, 7 pages.

Office Action, dated Jun. 2, 2025, received in U.S. Appl. No. 18/219,627, 26 pages.

Office Action, dated Jul. 7, 2025, received in Australian Patent Application No. 2024204720, which corresponds with U.S. Appl. No. 18/388,176, 2 pages.

Office Action, dated May 13, 2025, received in Japanese Patent Application No. 2024-076652, which corresponds with U.S. Appl. No. 18/382,444, 4 pages.

Notice of Allowance, dated Jul. 28, 2025, received in Japanese Patent Application No. 2024-076652, which corresponds with U.S. Appl. No. 18/382,444, 2 pages.

Notice of Allowance, dated Jun. 10, 2025, received in U.S. Appl. No. 18/412,251, 8 pages.

Office Action, dated Apr. 29, 2025, received in Australian Patent Application No. 2024202935, 5 pages.

Notice of Allowance, dated May 16, 2025, received in U.S. Appl. No. 18/656,318, 11 pages.

(56)     References Cited

OTHER PUBLICATIONS

Notice of Allowance, dated Mar. 5, 2024, received in Japanese Patent Application No. 2022-103836, which corresponds with U.S. Appl. No. 17/307,957, 1 page.
Notice of Allowance, dated Mar. 25, 2024, received in Australian Patent Application No. 2022202851, which corresponds with U.S. Appl. No. 17/344,846, 3 pages.
Notice of Allowance, dated Mar. 25, 2024, received in Australian Patent Application No. 2022235625, which corresponds with U.S. Appl. No. 17/568,624, 3 pages.
Notice of Allowance, dated Feb. 9, 2024, received in Australian Patent Application No. 2022231686, which corresponds with U.S. Appl. No. 17/750,133, 3 pages.
Office Action, dated Apr. 24, 2024, received in U.S. Appl. No. 18/372,606, 8 pages.
Fukiage et al., "Reduction of Contradictory Partial Occlusion in Mixed Reality by Using Characteristics of Transparency Perception", 2012 IEEE International Symposium On, IEEE, Nov. 5, 2012, 11 pages.
Joaquim, et al., "Dynamic Occlusion Handling for Real-Time AR Applications", https://doi.org/10.1145335/99973365700, Nov. 2019, 10 pages.
Final Office Action, dated Jul. 5, 2024, received in Korean Patent Application No. 2023-7019367, which corresponds with U.S. Appl. No. 17/307,957, 3 pages.
Grant Certificate, dated Jul. 25, 2024, received in Australian Patent Application No. 2022202851, which corresponds with U.S. Appl. No. 17/344,846, 3 pages.
Grant Certificate, dated Jul. 25, 2024, received in Australian Patent Application No. 2022235625, which corresponds with U.S. Appl. No. 17/568,624, 3 pages.
Certificate of Grant, dated Jun. 13, 2024, received in Australian Patent Application No. 2022231686, which corresponds with U.S. Appl. No. 17/750,133, 3 pages.
Notice of Allowance, dated Aug. 7, 2024, received in U.S. Appl. No. 18/372,606, 7 pages.
Office Action, dated Sep. 6, 2024, received in U.S. Appl. No. 18/219,627, 17 pages.
Notice of Allowance, dated Jun. 13, 2024, received in U.S. Appl. No. 18/388,176, 10 pages.
Office Action, dated Jun. 20, 2024, received in U.S. Appl. No. 18/382,444, 14 pages.
Office Action, dated Aug. 14, 2024, received in U.S. Appl. No. 18/412,251, 10 pages.
Aakash G Technical, "App Review #1 / Measure—Tango AR / How to Use", https://www.youtube.com/watch?v=fj2iiOg36KE, May 13, 2017, 2 pages.
Anonymous, "How to Select Surface and Image Anchors", https:helpx.adobe.com/aeor/how-to-surface-and-image-anchors.html, Oct. 20, 2020, 6 pages.
Apple, "MeasureKit—AR ruler app for IOS 11", https://measurekit.com, Sep. 15, 2017, 10 pages.
Berthiaume, "Augmented Reality Scanning Enables Retail Innovation (Video)", https://www.scandit.com/GB/augmented-reality-scanning-enables-retail-innovation-video, Oct. 3, 2017, 5 pages.
Bhalwankar, "Triple Tap to Zoom Feature in Android Phones", https://www.youtube.com/watch?v=KInbLhA2jg8, Jan. 25, 2014, 2 pages.
Burns, "Google Measure it Demo with Tango", https://www.youtube.com/watch?v=b74VtGGJPBg, May 20, 2016, 2 pages.
iPhoneWave, "How to Use iPhone, [online]", http://web.archive.org/web/20111012000236/http:www.ipodwave.com:80/iphone/howto/camera_video.html, Oct. 12, 2011, 5 pages.
Jain et al., "OverLay: Practical Mobile Augmented Reality", Proceedings of the 13th Annual International conference on Mobile Systems, Applications, and Services. May 18, 2015, 14 pages.
LaanLabs, "AirMeasure—AR Tape & Ruler", https://itunes.apple.com/us/app/airmeasure-ar-tape-ruler/id1251282152, Jun. 4, 2018, 3 pages.

Laanlabs, "AirMeasure—The Augmented Reality Toolkit", https://www.youtube.com/watch?v=9ycpvj6hbdE, Sep. 12, 2017, 2 pages.
Langlotz et al., "Sketching up the World: in Situ Authoring for Mobile Augmented reality", http://mooslechner.infor/workperformed/at/smartphone2010.pdf, Jul. 27, 2011, 8 pages.
Lenovo, Lenovo Tech World 2016—Keynote Livestream from San Francisco, https://www.youtube.com/watch?v=MBgQLraVGJQ, Jun. 9, 2016, 2 pages.
Lenovo, "Lenovo_PHAB2_Pro_User_Guide V1.0", https://pcsupport.lenovo.com/do/en/products/tablets/phab-series/phab2-pro-documentation/doc_userguide, Aug. 29, 2017, 10 pages.
Lynch, "How to Zoom in On iPhone: The Quick Tutorial!", https://www.payetteforward.com/how-to-zoom-in-on-iphone-quck-tutorial, Feb. 26, 2018, 4 pages.
Mapletree Apps, "Apple ARKit iPhone Demo—Measure 3D Pro—Ruler on iOS (1)", https://www.youtube.com/watch?v=fzn3RsveJss, Oct. 1, 2017, 2 pages.
Mapletree Apps, "Apple ARKit iPhone Demo—Measure 3D Pro—Ruler on iOS (2)", https://www.youtube.com/watch?v=fzn3RsveJss, Oct. 1, 2017, 2 pages.
Mapletree Apps, "Measure 3D Tutorial series #1—How to Measure a Room", https://www.youtube.com/watch?v=HGV18HXXZqw, Apr. 19, 2018, 2 pages.
Mapletree Apps, Measure 3D Tutorial series #4—How to Measure Length in Horizonal and Vertical Planes, https://www.youtube.com/watch?V-2PjcbrgS50Q, Apr. 19, 2018, 2 pages.
Mapletree Appls, "Measure 3D Tutorial #5—How to Measure Rectangle Shapes", https://www.youtube.com/watch?v=8Gg0SMwkvQU, Apr. 19, 2018, 2 pages.
Marriott, Adobe Aero: Getting Started with AR/Tutorial, https://www.youtube.com/watch?v=EU2V8Pn0GE4, Nov. 19, 2019, 3 pages.
Miller, "Apple Shares Detailed Human Interface Guidelines for Developers Building ARKit Apps", https://9to5mac.com/2017/08/29/arkit-human-interface-guidelines/, Aug. 29, 2017, 5 pages.
Nuernberger et al., "SnapToReality: Aligning Augmented Reality to the Real World", http://eyalofek.org/Papers/CHI2016_Snap2Reality.pdf., May 7-12, 2016, 12 pages.
Occipital HQ, "TapMeasure Spatial Utility to Capture and Measure Your Space", https://www.youtube.com/watch?v=Hy1Ex2MAXM, Sep. 19, 2017, 2 pages.
Perhiniak, "Yes I'm a Designer: Designing an Augmentged Reality Scene in Adobe Aero" https://wwwyoutube.com/watch?v=fo8a?GO, Jan. 27, 2020, 14 pages.
SmartPicture, "PLNAR—Your AR Measurement Tool", https://www.youtube.com/watch?v=H_cqZqKLjws, Sep. 28, 2017, 2 pages.
SmarPicture Tech, "Mobile App Design for Bay Area—Rely on the Reinvently Agency", https://appadvice.com/app/plnar/1282049921, Sep. 21, 2018, 5 pages.
YouTube, "A1 Corner & Edge Detection (beta)", https://www.youtube.com/watch?v=YSNklighUtxA, Nov. 21, 2020, 2 pages.
YouTube, "How Do I Use The iPhone Measure App? How Accurate Is It?", https://www.youtube.com/watch?v=RvhZ074Vs7c, Aug. 8, 2018, 3 pages.
YouTube, "Third Aurora: Adobe Aero Tutorial—How to get Started with Adobe Aero", https://www.youtube.com/watch?v=EU2v8P, Nov. 18, 2019, 3 pages.
YouTube, AR Measure—Automatic Measure in Augmented Reality, https://www.youtube.com/watch?v=70CQfH76vg4, Mar. 16, 2019, 2 pages.
YouTube, Huawei P30 Pro AR Measure / Measure length, depth, area and volume, hxos plus, https;//www.youtube.com/watch?v=00X5QaK7YY, Mar. 26, 2019, 2 pages.
YouTube, Yes, I'm a Designer: "Designing an Augmented Reality Scene in Adobe Aero", https:www.youtube.com/watch?v=fo8aGOvCY7k, Jan. 27, 2020, 3 pages.
Office Action, dated Feb. 21, 2019, received in U.S. Appl. No. 16/145,015, 34 pages.
Notice of Allowance, dated Jun. 5, 2019, received in U.S. Appl. No. 16/145,015, 12 pages.
Office Action, dated Aug. 31, 2018, received in Danish Patent Application No. 201870350, which corresponds with U.S. Appl. No. 16/145,015, 11 pages.

(56) References Cited

OTHER PUBLICATIONS

Office Action, dated May 28, 2019, received in Danish Patent Application No. 201870350, which corresponds with U.S. Appl. No. 16/145,015, 6 pages.

Office Action, dated Feb. 21, 2020, received in Danish Patent Application No. 201870350, which corresponds with U.S. Appl. No. 16/145,015, 3 pages.

Intention to Grant, dated Mar. 30, 2023, received in European Patent Application No. 21178349.3, which corresponds with U.S. Appl. No. 16/145,015, 8 pages.

Intention to Grant, dated Sep. 19, 2023, received in European Patent Application No. 21178349.3, which corresponds with U.S. Appl. No. 16/145,015, 11 pages.

Notice of Allowance, dated Nov. 22, 2019, received in U.S. Appl. No. 16/138,779, 17 pages.

Office Action, dated Jul. 7, 2021, received in Australian Patent Application No. 2019267352, which corresponds with U.S. Appl. No. 16/138,779, 5 pages.

Notice of Acceptance, dated Aug. 9, 2021, received in Australian Patent Application No. 2019267352, which corresponds with U.S. Appl. No. 16/138,779, 3 pages.

Patent, dated Dec. 2, 2021, received in Australian Patent Application No. 2019267352, which corresponds with U.S. Appl. No. 16/138,779, 3 pages.

Office Action, dated Aug. 31, 2018, received in Danish Patent Application No. 201870351, which corresponds with U.S. Appl. No. 16/138,779, 11 pages.

Office Action, dated Feb. 13, 2020, received in Danish Patent Application No. 201870351, which corresponds with U.S. Appl. No. 16/138,779, 10 pages.

Office Action, dated Mar. 21, 2019, received in U.S. Appl. No. 16/145,025, 14 pages.

Final Office Action, dated Sep. 19, 2019, received in U.S. Appl. No. 16/145,025, 15 pages.

Office Action, dated Jun. 12, 2020, received in U.S. Appl. No. 16/145,025, 17 pages.

Final Office Action, dated Dec. 18, 2020, received in U.S. Appl. No. 16/145,025, 17 pages.

Notice of Allowance, dated Mar. 17, 2021, received in U.S. Appl. No. 16/145,025, 5 pages.

Innovation Patent, dated May 22, 2019, received in Australian Patent Application No. 2019100486, which corresponds with U.S. Appl. No. 16/138,779, 3 pages.

Certificate of Examination, dated Jul. 19, 2019, received in Australian Patent Application No. 2019100486, which corresponds with U.S. Appl. No. 16/138,779, 5 pages.

Office Action, dated Aug. 3, 2020, received in Chinese Patent Application No. 16/138,779.3, which corresponds with U.S. Appl. No. 16/138,779, 5 pages.

Office Action, dated Jan. 20, 2021, received in Chinese Patent Application No. 201910261469.3, which corresponds with U.S. Appl. No. 16/138,779, 11 pages.

Notice of Allowance, dated Apr. 20, 2021, received in Chinese Patent Application No. 201910261469.3, which corresponds with U.S. Appl. No. 16/138,779, 6 pages.

Patent, dated Jul. 13, 2021, received in Chinese Patent Application No. 201910261469.3, which corresponds with U.S. Appl. No. 16/138,779, 6 pages.

Office Action, dated Sep. 28, 2018, received in Danish Patent Application No. 201870352, which corresponds with U.S. Appl. No. 16/145,025, 7 pages.

Office Action, dated Jan. 31, 2019, received in Danish Patent Application No. 201870352, which corresponds with U.S. Appl. No. 16/145,025, 4 pages.

Office Action, dated Sep. 16, 2019, received in Danish Patent Application No. 201870352, which corresponds with U.S. Appl. No. 16/145,025, 3 pages.

Office Action, dated Aug. 27, 2020, received in Danish Patent Application No. 201870352, which corresponds with U.S. Appl. No. 16/145,025, 2 pages.

Intention to Grant, dated Mar. 10, 2021, received in Danish Patent Application No. 201870352, which corresponds with U.S. Appl. No. 16/145,025, 2 pages.

Decision to Grant, dated Jul. 2, 2021, received in Danish Patent Application No. 201870352, which corresponds with U.S. Appl. No. 16/145,025, 2 pages.

Patent, dated Nov. 9, 2021, received in Danish Patent Application No. 201870352, which corresponds with U.S. Appl. No. 16/145,025, 3 pages.

Office Action, dated Jul. 17, 2019, received in European Patent Application No. 19159743.4, which corresponds with U.S. Appl. No. 16/145,025, 8 pages.

Office Action, dated Oct. 5, 2020, received in European Patent Application No. 19159743.4, which corresponds with U.S. Appl. No. 16/145,025, 6 pages.

Decision to Grant, dated Jun. 24, 2021, received in European Patent Application No. 19159743.4, which corresponds with U.S. Appl. No. 16/145,025, 2 pages.

Certificate of Grant, dated Aug. 13, 2021, received in European Patent Application No. 19159743.4, which corresponds with U.S. Appl. No. 16/145,025, 3 pages.

Office Action, dated Dec. 13, 2021, received in Japanese Patent Application No. 2020-562126, which corresponds with U.S. Appl. No. 16/145,025, 2 pages.

Notice of Allowance, dated May 30, 2022, received in Japanese Patent Application No. 2020-562126, which corresponds with U.S. Appl. No. 16/145,025, 2 pages.

Patent, dated Jun. 30, 2022, received in Japanese Patent Application No. 2020-562126, which corresponds with U.S. Appl. No. 16/145,025, 3 pages.

Office Action, dated Oct. 26, 2022, received in Korean Patent Application No. 2020-7032392, which corresponds with U.S. Appl. No. 16/145,025, 5 pages.

Notice of Allowance, dated May 19, 2023, received in Korean Patent Application No. 2020-7032392, which corresponds with U.S. Appl. No. 16/145,025, 2 pages.

Patent, dated Jun. 8, 2023, received in Korean Patent Application No. 2020-7032392, which corresponds with U.S. Appl. No. 16/145,025, 4 pages.

Office Action, dated Sep. 20, 2022, received in Indian Patent Application No. 202017052984, which corresponds with U.S. Appl. No. 16/145,025, 11 pages.

Notice of Allowance, dated May 15, 2020, received in U.S. Appl. No. 16/574,029, 10 pages.

Office Action, dated Jan. 20, 2022, received in Australian Patent Application No. 2019349408, which corresponds with U.S. Appl. No. 16/574,029, 3 pages.

Notice of Acceptance, dated Jul. 29, 2022, received in Australian Patent Application No. 2019349408, which corresponds with U.S. Appl. No. 16/574,029, 3 pages.

Notice of Allowance, dated Mar. 2, 2022, received in Chinese Patent Application No. 202110369762.9, which corresponds with U.S. Appl. No. 16/574,029, 7 pages.

Patent, dated Mar. 29, 2022, received in Chinese Patent Application No. 202110369762.9, which corresponds with U.S. Appl. No. 16/574,029, 6 pages.

Notice of Allowance, dated Apr. 25, 2022, received in Japanese Patent Application No. 2021-510765, which corresponds with U.S. Appl. No. 16/574,029, 2 pages.

Patent, dated May 12, 2022, received in Japanese Patent Application No. 2021-510765, which corresponds with U.S. Appl. No. 16/574,029, 3 pages.

Office Action, dated Dec. 29, 2022, received in Indian Patent Application No. 202117008282, which corresponds with U.S. Appl. No. 16/574,029, 10 pages.

Office Action, dated Feb. 24, 2023, received in Indian Patent Application No. 202118009402, which corresponds with U.S. Appl. No. 16/574,029, 7 pages.

Office Action, dated Jul. 6, 2022, received in Korean Patent Application No. 2021-7005584, which corresponds with U.S. Appl. No. 16/574,029, 13 pages.

(56) References Cited

OTHER PUBLICATIONS

Notice of Allowance, dated Mar. 22, 2023, received in Korean Patent Application No. 2021-7005584, which corresponds with U.S. Appl. No. 16/574,029, 2 pages.

Patent, dated Apr. 11, 2023, received in Korean Patent Application No. 2021-7005584, which corresponds with U.S. Appl. No. 16/574,029, 4 pages.

Office Action, dated Apr. 30, 2021, received in U.S. Appl. No. 17/030,209, 27 pages.

Notice of Allowance, dated Sep. 13, 2021, received in U.S. Appl. No. 17/030,209, 9 pages.

Office Action, dated Jan. 8, 2021, received in U.S. Appl. No. 17/018,958, 27 pages.

Notice of Allowance, dated Apr. 20, 2021, received in U.S. Appl. No. 17/018,958, 12 pages.

Office Action, dated Aug. 13, 2021, received in Australian Patent Application No. 2020239688, which corresponds with U.S. Appl. No. 17/018,958, 4 pages.

Office Action, dated Nov. 5, 2021, received in Australian Patent Application No. 2020239688, which corresponds with U.S. Appl. No. 17/018,958, 4 pages.

Notice of Allowance, dated Feb. 22, 2022, received in Australian Patent Application No. 2020239688, which corresponds with U.S. Appl. No. 17/018,958, 3 pages.

Certificate of Grant, dated Jun. 23, 2022, received in Australian Patent Application No. 2020239688, which corresponds with U.S. Appl. No. 17/018,958, 4 pages.

Office Action, dated Dec. 18, 2020, received in Danish Patent Application No. 202070602, which corresponds with U.S. Appl. No. 17/018,958, 10 pages.

Office Action, dated Mar. 14, 2022, received in Danish Patent Application No. 202070602, which corresponds with U.S. Appl. No. 17/018,958, 5 pages.

Office Action, dated Nov. 14, 2022, received in Danish Patent Application No. 202070602, which corresponds with U.S. Appl. No. 17/018,958, 2 pages.

Office action, dated Dec. 3, 2021, received in Indian Patent Application No. 202014041448, which corresponds with U.S. Appl. No. 17/018,958, 10 pages.

Notice of Allowance, dated Dec. 20, 2021, received in Japanese Patent Application No. 2020-159787, which corresponds with U.S. Appl. No. 17/018,958, 2 pages.

Notice of Allowance, dated Feb. 18, 2022, received in Japanese Patent Application No. 2022-005327, which corresponds with U.S. Appl. No. 17/018,958, 2 pages.

Patent, dated Mar. 14, 2022, received in Japanese Patent Application No. 2022-005327, which corresponds with U.S. Appl. No. 17/018,958, 3 pages.

Office Action, dated Nov. 8, 2021, received in Korean Patent Application No. 2020-0124085, which corresponds with U.S. Appl. No. 17/018,958, 9 pages.

Notice of Allowance, dated Jul. 13, 2022, received in Korean Patent Application No. 2020-0124085, which corresponds with U.S. Appl. No. 17/018,958, 2 pages.

Patent, dated Jul. 22, 2022, received in Korean Patent Application No. 2020-0124085, which corresponds with U.S. Appl. No. 17/018,958, 4 pages.

Office Action, dated Aug. 13, 2021, received in U.S. Appl. No. 17/202,233, 19 pages.

Final Office Action, dated Feb. 15, 2022, received in U.S. Appl. No. 17/202,233, 24 pages.

Office Action, dated Aug. 16, 2022, received in U.S. Appl. No. 17/202,233, 25 pages.

Notice of Allowance, dated Mar. 22, 2023, received in U.S. Appl. No. 17/202,233, 8 pages.

Office Action, dated Feb. 21, 2021, received in U.S. Appl. No. 16/841,550, 8 pages.

Notice of Allowance, dated May 4, 2021, received in U.S. Appl. No. 16/841,550, 12 pages.

Notice of Allowance, dated Dec. 7, 2021, received in U.S. Appl. No. 16/997,860, 10 pages.

Office Action, dated Jan. 22, 2021, received in U.S. Appl. No. 17/018,980, 17 pages.

Office Action, dated May 14, 2021, received in U.S. Appl. No. 17/018,980, 4 pages.

Notice of Allowance, dated May 28, 2021, received in U.S. Appl. No. 17/018,980, 5 pages.

Office Action, dated Aug. 20, 2021, received in Australian Patent Application No. 2020239675, which corresponds with U.S. Appl. No. 17/018,980, 4 pages.

Office Action, dated Dec. 16, 2021, received in Australian Patent Application No. 2020239675, which corresponds with U.S. Appl. No. 17/018,980, 2 pages.

Notice of Allowance, dated Jan. 21, 2022, received in Australian Patent Application No. 2020239675, which corresponds with U.S. Appl. No. 17/018,980, 3 pages.

Certificate of Grant, dated May 26, 2022, received in Australian Patent Application No. 2020239675, which corresponds with U.S. Appl. No. 17/018,980, 3 pages.

Office Action, dated Dec. 18, 2020, received in Danish Patent Application No. 202070603, which corresponds with U.S. Appl. No. 17/018,980, 9 pages.

Office Action, dated Feb. 25, 2022, received in Danish Patent Application No. 202070603, which corresponds with U.S. Appl. No. 17/018,980, 2 pages.

Office Action, dated Feb. 17, 2023, received in Danish Patent Application No. 202070603, which corresponds with U.S. Appl. No. 17/018,980, 4 pages.

Office Action, dated Aug. 10, 2021, received in Indian Patent Application No. 202014040937, which corresponds with U.S. Appl. No. 17/018,980, 7 pages.

Office Action, dated Dec. 20, 2021, received in Japanese Patent Application No. 2020-159788, which corresponds with U.S. Appl. No. 17/018,980, 2 pages.

Notice of Allowance, dated Feb. 18, 2022, received in Japanese Patent Application No. 2022-005328, which corresponds with U.S. Appl. No. 17/018,980, 2 pages.

Patent, dated Mar. 14, 2022, received in Japanese Patent Application No. 2022-005328, which corresponds with U.S. Appl. No. 17/018,980, 3 pages.

Office Action, dated Dec. 22, 2023, received in Korean Patent Application No. 2020-0123687, which corresponds with U.S. Appl. No. 17/018,980, 9 pages.

Office Action, dated Jan. 7, 2021, received in U.S. Appl. No. 17/018,994, 7 pages.

Notice of Allowance, dated Feb. 23, 2021, received in U.S. Appl. No. 17/018,994, 8 pages.

Office Action, dated Aug. 13, 2021, received in Australian Patent Application No. 2020239691, U.S. Appl. No. 17/018,994, 5 pages.

Office Action, dated Nov. 15, 2021, received in Australian Patent Application No. 2020239691, U.S. Appl. No. 17/018,994, 4 pages.

Notice of Allowance, dated Mar. 2, 2022, received in Australian Patent Application No. 2020239691, U.S. Appl. No. 17/018,994, 3 pages.

Office Action, dated Jan. 12, 2021, received in Danish Patent Application No. 2020-70604, which corresponds with U.S. Appl. No. 17/018,994, 8 pages.

Office Action, dated Feb. 4, 2022, received in Danish Patent Application No. 2020-70604, which corresponds with U.S. Appl. No. 17/018,994, 3 pages.

Office Action, dated Nov. 2, 2022, received in Danish Patent Application No. 2020-70604, which corresponds with U.S. Appl. No. 17/018,994, 3 pages.

Office Action, dated Dec. 2, 2021, received in Indian Patent Application No. 202014041104, which corresponds with U.S. Appl. No. 17/018,994, 7 pages.

Office Action, dated Jan. 7, 2022, received in Japanese Patent Application No. 2020-159789, which corresponds with U.S. Appl. No. 17/018,994, 5 pages.

Notice of Allowance, dated Aug. 8, 2022, received in Japanese Patent Application No. 2020-159789, which corresponds with U.S. Appl. No. 17/018,994, 1 page.

(56)                    References Cited

OTHER PUBLICATIONS

Office Action, dated Sep. 14, 2023, received in U.S. Appl. No. 17/720,227, 5 pages.
Notice of Allowance, dated Nov. 13, 2023, received in U.S. Appl. No. 17/720,227, 5 pages.
Patent, dated Sep. 9, 2022, received in Japanese Patent Application No. 2020-159789, which corresponds with U.S. Appl. No. 17/018,994, 3 pages.
Office Action, dated Apr. 5, 2022, received in U.S. Appl. No. 17/307,957, 10 pages.
Notice of Allowance, dated May 4, 2022, received in U.S. Appl. No. 17/307,957, 12 pages.
Office Action, dated Aug. 31, 2022, received in Australian Patent Application No. 2021240284, which corresponds with U.S. Appl. No. 17/307,957, 2 pages.
Notice of Allowance, dated Sep. 14, 2022, received in Australian Patent Application No. 2021240284, which corresponds with U.S. Appl. No. 17/307,957, 3 pages.
Patent, dated Jan. 19, 2023, received in Australian Patent Application No. 2021240284, which corresponds with U.S. Appl. No. 17/307,957, 3 pages.
Office Action, dated Nov. 2, 2022, received in Chinese Patent Application No. 202110660753.5, 2 pages.
Patent, dated Jun. 20, 2023, received in Chinese Patent Application No. 202110660753.5, 7 pages.
Office Action, dated Sep. 1, 2023, received in Japanese Patent Application No. 2022-103836, which corresponds with U.S. Appl. No. 17/307,957, 2 pages.
Office Action, dated Nov. 24, 2023, received in Korean Patent Application No. 2023-7019367, which corresponds with U.S. Appl. No. 17/307,957, 7 pages.
Office Action, dated Jul. 22, 2022, received in U.S. Appl. No. 17/344,846, 8 pages.
Final Office Action, dated Dec. 23, 2022, received in U.S. Appl. No. 17/344,846, 8 pages.
Notice of Allowance, dated Apr. 28, 2023, received in U.S. Appl. No. 17/344,846, 5 pages.
Office Action, dated Mar. 29, 2023, received in Australian Patent Application No. 2022202851, which corresponds with U.S. Appl. No. 17/344,846, 3 pages.
Office Action, dated Dec. 8, 2023, received in Japanese Patent Application No. 2022-142210, which corresponds with U.S. Appl. No. 17/344,846, 5 pages.
Office Action, dated Feb. 3, 2023, received in U.S. Appl. No. 17/568,624, 44 pages.
Final Office Action, dated May 15, 2023, received in U.S. Appl. No. 17/568,624, 31 pages.
Office Action, dated Oct. 27, 2023, received in U.S. Appl. No. 17/568,624, 33 pages.
Notice of Allowance, dated Feb. 15, 2024, received in U.S. Appl. No. 17/568,624, 8 pages.
Noticed of Allowance, dated Dec. 7, 2022, received in U.S. Appl. No. 17/716,984, 10 pages.
Office Action, dated Sep. 4, 2023, received in Australian Patent Application No. 2022235625, which corresponds with U.S. Appl. No. 17/568,624, 3 pages.
Office Action, dated Jun. 2, 2023, received in Japanese Patent Application No. 2022-077644, which corresponds with U.S. Appl. No. 17/716,984, 6 pages.
Final Office Action, dated Jun. 2, 2023, received in Japanese Patent Application No. 2022-077644, which corresponds with U.S. Appl. No. 17/716,984, 4 pages.
Office Action, dated Dec. 11, 2023, received in Korean Patent Application No. 2023-7012345, which corresponds with U.S. Appl. No. 17/716,984, 10 pages.
Office Action, dated May 17, 2023, received in U.S. Appl. No. 17/750,133, 23 pages.
Notice of Allowance, dated Jun. 28, 2023, received in U.S. Appl. No. 17/750,133, 10 pages.

Office Action, dated Jul. 5, 2023, received in Australian Patent Application No. 2022231686, which corresponds with U.S. Appl. No. 17/750,133, 2 pages.
Notice of Allowance, dated Jul. 6, 2023, received in U.S. Appl. No. 18/107,381, 24 pages.
European Search Report, dated Sep. 23, 2021, received in European Patent Application No. 21178349.3, which corresponds with U.S. Appl. No. 16/145,015, 4 pages.
Invitation to Pay Additional Fees, dated Jul. 15, 2019, received in International Patent Application No. PCT/US2019/029904, which corresponds with U.S. Appl. No. 16/145,015, 29 pages.
International Search Report and Written Opinion, dated Sep. 9, 2019, received in International Patent Application No. PCT/US2019/029904, which corresponds with U.S. Appl. No. 16/145,015, 31 pages.
European Search Report, dated Jul. 4, 2019, received in European Patent Application No. 19158743.4, which corresponds with U.S. Appl. No. 16/145,025, 4 pages.
Invitation to Pay Additional Fees, dated Dec. 12, 2019, received in International Patent Application No. PCT/US2019052140, which corresponds with U.S. Appl. No. 16/574,029, 18 pages.
International Search Report and Written Opinion, dated Feb. 5, 2020, received in International Patent Application No. PCT/US2019052140, which corresponds with U.S. Appl. No. 16/574,029, 22 pages.
Invitation to Pay Additional Fees, dated Jan. 19, 2021, received in International Patent Application No. PCT/US2020/052641, which corresponds with U.S. Appl. No. 17/030,209, 15 pages.
International Search Report and Written Opinion, dated Mar. 12, 2021, received in International Patent Application No. PCT/US2020/052641, which corresponds with U.S. Appl. No. 17/030,209, 21 pages.
Invitation to Pay Additional Fees, dated Jun. 23, 2021, received in International Patent Application No. PCT/US2021/022378, which corresponds with U.S. Appl. No. 17/200,676, 15 pages.
International Search Report and Written Opinion, dated Aug. 13, 2021, received in International Patent Application No. PCT/US2021/022378, which corresponds with U.S. Appl. No. 17/200,676, 19 pages.
Invitation to Pay Additional Fees, dated May 17, 2021, received in International Patent Application No. PCT/US2021/015556, which corresponds with U.S. Appl. No. 17/018,958, 19 pages.
International Search Report and Written Opinion, dated Jul. 8, 2021, received in International Patent Application No. PCT/US2021/015556, which corresponds with U.S. Appl. No. 17/018,958, 26 pages.
Invitation to Pay Additional Fees, dated Jul. 26, 2022, received in International Patent Application No. PCT/US2022/024894, which corresponds with U.S. Appl. No. 17/720,227, 34 pages.
Invitation to Pay Additional Fees, dated Oct. 5, 2023, received in International Patent Application No. PCT/US2023/021563, which corresponds with U.S. Appl. No. 18/144,746, 19 pages.
International Search Report and Written Opinion, dated Dec. 14, 2023, received in International Patent Application No. PCT/US2023/021563, which corresponds with U.S. Appl. No. 18/144,746, 29 pages.
Patent, dated Mar. 11, 2025, received in Indian Patent Application No. 20207052984, which corresponds with U.S. Appl. No. 16/145,025, 4 pages.
Office Action, dated Dec. 23, 2024, received in Indian Patent Application No. 202118009402, which corresponds with U.S. Appl. No. 16/574,029, 3 pages.
Patent, dated Mar. 21, 2025, received in Indian Patent Application No. 202118009402, which corresponds with U.S. Appl. No. 16/574,029, 4 pages.
Office Action, dated Jan. 16, 2025, received in Chinese Patent Application No. 202210629947.3, which corresponds with U.S. Appl. No. 17/030,209, 2 pages.
Office action, dated Sep. 30, 2024, received in Indian Patent Application No. 202014041448, which corresponds with U.S. Appl. No. 17/018,958, 8 pages.

(56)     References Cited

OTHER PUBLICATIONS

Patent, dated Feb. 27, 2025, received in Indian Patent Application No. 202014041448, which corresponds with U.S. Appl. No. 17/018,958, 6 pages.
Office Action, dated Mar. 4, 2025, received in Japanese Patent Application No. 2024-026846, which corresponds with U.S. Appl. No. 16/997,860, 7 pages.
Notice of Allowance, dated Dec. 5, 2024, received in Korean Patent Application No. 2020-0123687, which corresponds with U.S. Appl. No. 17/018,980, 3 pages.
Patent, dated Sep. 23, 2024, received in Indian Patent Application No. 202014041104, which corresponds with U.S. Appl. No. 17/018,994, 6 pages.
Notice of Allowance, dated Nov. 7, 2024, received in Korean Patent Application No. 2023-7019367, which corresponds with U.S. Appl. No. 17/307,957, 3 pages.
Patent, dated Feb. 6, 2025, received in Korean Patent Application No. 2023-7019367, which corresponds with U.S. Appl. No. 17/307,957, 4 pages.
Office Action, dated Mar. 20, 2025, received in U.S. Appl. No. 18/144,746, 22 pages.
Office Action, dated Nov. 5, 2024, received in Japanese Patent Application No. 2022-077644, which corresponds with U.S. Appl. No. 17/716,984, 17 pages.
Office Action, dated Sep. 23, 2024, received in Korean Patent Application No. 2023-7012345, which corresponds with U.S. Appl. No. 17/716,984, 5 pages.
Intent to Grant, dated Oct. 14, 2024, received in European Patent Application No. 24151350.6, 11 pages.
Decision to Grant, dated Feb. 20, 2025, received in European Patent Application No. 24151350.6, 7 pages.
Final Office Action, dated Jan. 17, 2025, received in U.S. Appl. No. 18/219,627, 19 pages.
Notice of Allowance, dated Jan. 10, 2025, received in U.S. Appl. No. 18/382,444, 6 pages.
Office Action, dated Feb. 27, 2025, received in U.S. Appl. No. 18/656,318, 15 pages.
Patent, dated Aug. 19, 2025, received in Chinese Patent Application No. 202210629947.3, which corresponds with U.S. Appl. No. 17/030,209, 4 pages.
Notice of Allowance, Aug. 22, 2025, received in Japanese Patent Application No. 2024-026846, which corresponds with U.S. Appl. No. 16/997,860, 2 pages.
Intent to Grant, dated Oct. 28, 2025, received in European Patent Application No. 23193039.7, which corresponds with U.S. Appl. No. 17/018,980, 7 pages.

Office Action, dated Jul. 7, 2025, received in Japanese Patent Application No. 2024-113573, which corresponds with U.S. Appl. No. 18/388,176, 6 pages.
Notice of Allowance, dated Oct. 17, 2025, received in Japanese Patent Application No. 2024-113573, which corresponds with U.S. Appl. No. 18/388,176, 2 pages.
Patent, dated Aug. 21, 2025, received in Japanese Patent Application No. 2024-076652, which corresponds with U.S. Appl. No. 18/382,444, 4 pages.
Patent, dated Dec. 31, 2025, received in European Patent Application No. 19783191.0, which corresponds with U.S. Appl. No. 16/574,029, 4 pages.
Grant Decision, dated Nov. 20, 2025, received in European Patent Application No. 21717681.7, which corresponds with U.S. Appl. No. 17/202,233, 2 pages.
Patent, dated Jan. 9, 2026, received in European Patent Application No. 21717681.7, which corresponds with U.S. Appl. No. 17/202,233, 4 pages.
Notice of Allowance, dated Nov. 19, 2025, received in U.S. Appl. No. 18/219,627, 7 pages.
Extended European Search Report, dated Feb. 4, 2026, received in European Patent Application No. 25214090.0, 7 pages.
Office Action, dated Apr. 29, 2026, received in U.S. Appl. No. 18/976,148, 49 pages.
Notice of Allowance, dated Apr. 7, 2026, received in U.S. Appl. No. 18/929,122, 12 pages.
Office Action, dated Mar. 21, 2026, received in Chinese Patent Application No. 2022112472385, 2 pages.
Grant Decision, dated Mar. 5, 2026, received in European Patent Application No. 23193039.7, which corresponds with U.S. Appl. No. 17/018,980, 7 pages.
Patent, dated Apr. 1, 2026, received in European Patent Application No. 23193039.7, which corresponds with U.S. Appl. No. 17/344,846, 2 pages.
Patent, dated Mar. 19, 2026, received in Indian Patent Application No. 202215024600, which corresponds with U.S. Appl. No. 17/344,846, 4 pages.
Office Action, dated Apr. 9, 2025, received in Korean Patent Application No. 10-2024-7038973, which corresponds with U.S. Appl. No. 18/388,176, 9 pages.
Notice of Allowance, dated Mar. 11, 2026, received in Australian Patent Application No. 202401899, which corresponds with U.S. Appl. No. 18/382,444, 5 pages.
Intent to Grant, dated Mar. 11, 2026, received in European Patent Application No. 25214090.0, 4 pages.
Patent, dated May 7, 2026, received in Australian Patent Application No. 2024202935, 1 page.

* cited by examiner

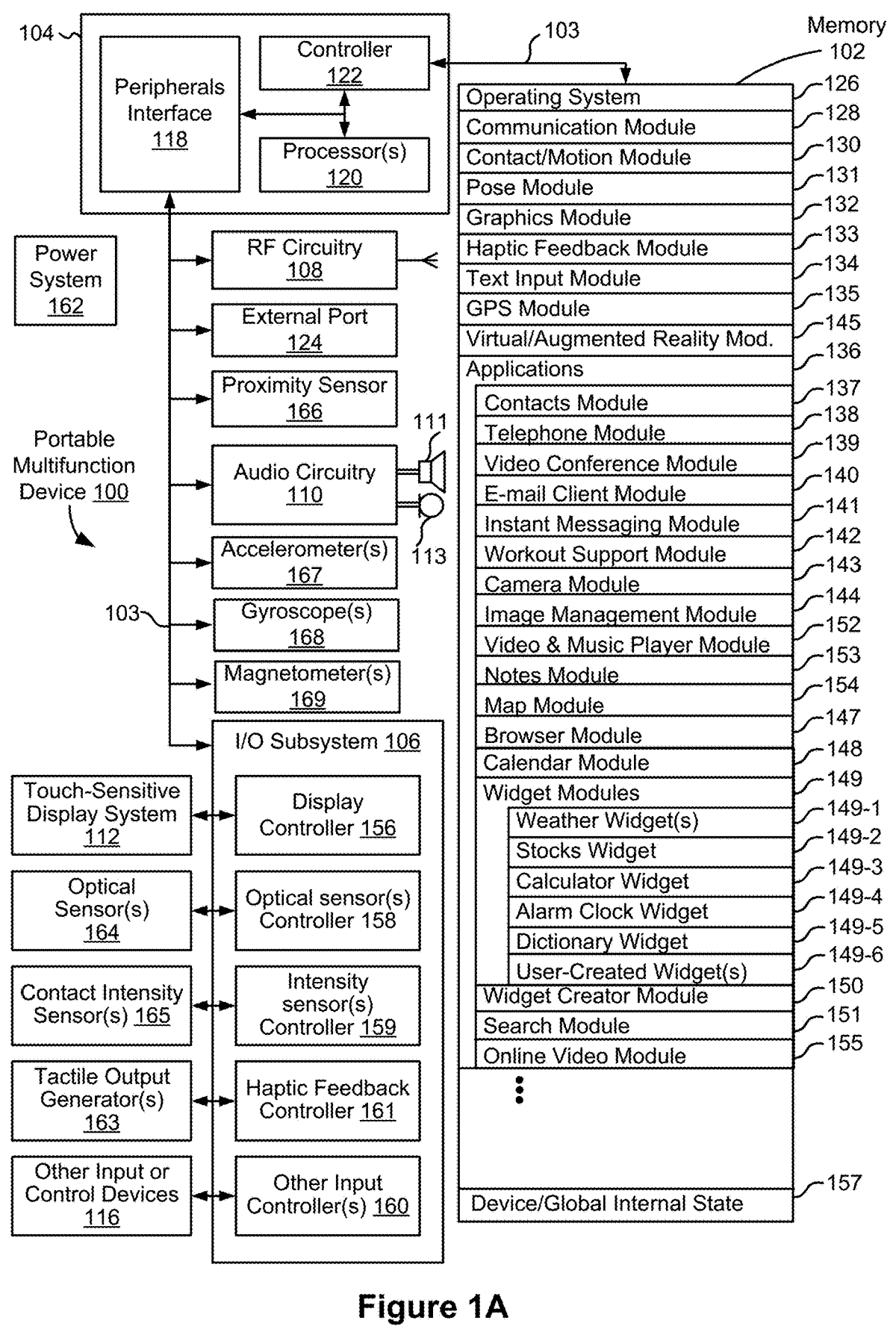

104

Peripherals Interface 118

Controller 122

Processor(s) 120

103

Memory — 102

Power System 162

RF Circuitry 108

External Port 124

Proximity Sensor 166

111

Audio Circuitry 110

Portable Multifunction Device 100

Accelerometer(s) 167

113

103

Gyroscope(s) 168

Magnetometer(s) 169

I/O Subsystem 106

Touch-Sensitive Display System 112

Display Controller 156

Optical Sensor(s) 164

Optical sensor(s) Controller 158

Contact Intensity Sensor(s) 165

Intensity sensor(s) Controller 159

Tactile Output Generator(s) 163

Haptic Feedback Controller 161

Other Input or Control Devices 116

Other Input Controller(s) 160

| Memory Module | Ref |
|---|---|
| Operating System | 126 |
| Communication Module | 128 |
| Contact/Motion Module | 130 |
| Pose Module | 131 |
| Graphics Module | 132 |
| Haptic Feedback Module | 133 |
| Text Input Module | 134 |
| GPS Module | 135 |
| Virtual/Augmented Reality Mod. | 145 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Video & Music Player Module | 152 |
| Notes Module | 153 |
| Map Module | 154 |
| Browser Module | 147 |
| Calendar Module | 148 |
| Widget Modules | 149 |
| Weather Widget(s) | 149-1 |
| Stocks Widget | 149-2 |
| Calculator Widget | 149-3 |
| Alarm Clock Widget | 149-4 |
| Dictionary Widget | 149-5 |
| User-Created Widget(s) | 149-6 |
| Widget Creator Module | 150 |
| Search Module | 151 |
| Online Video Module | 155 |

⋮

Device/Global Internal State — 157

Figure 1A

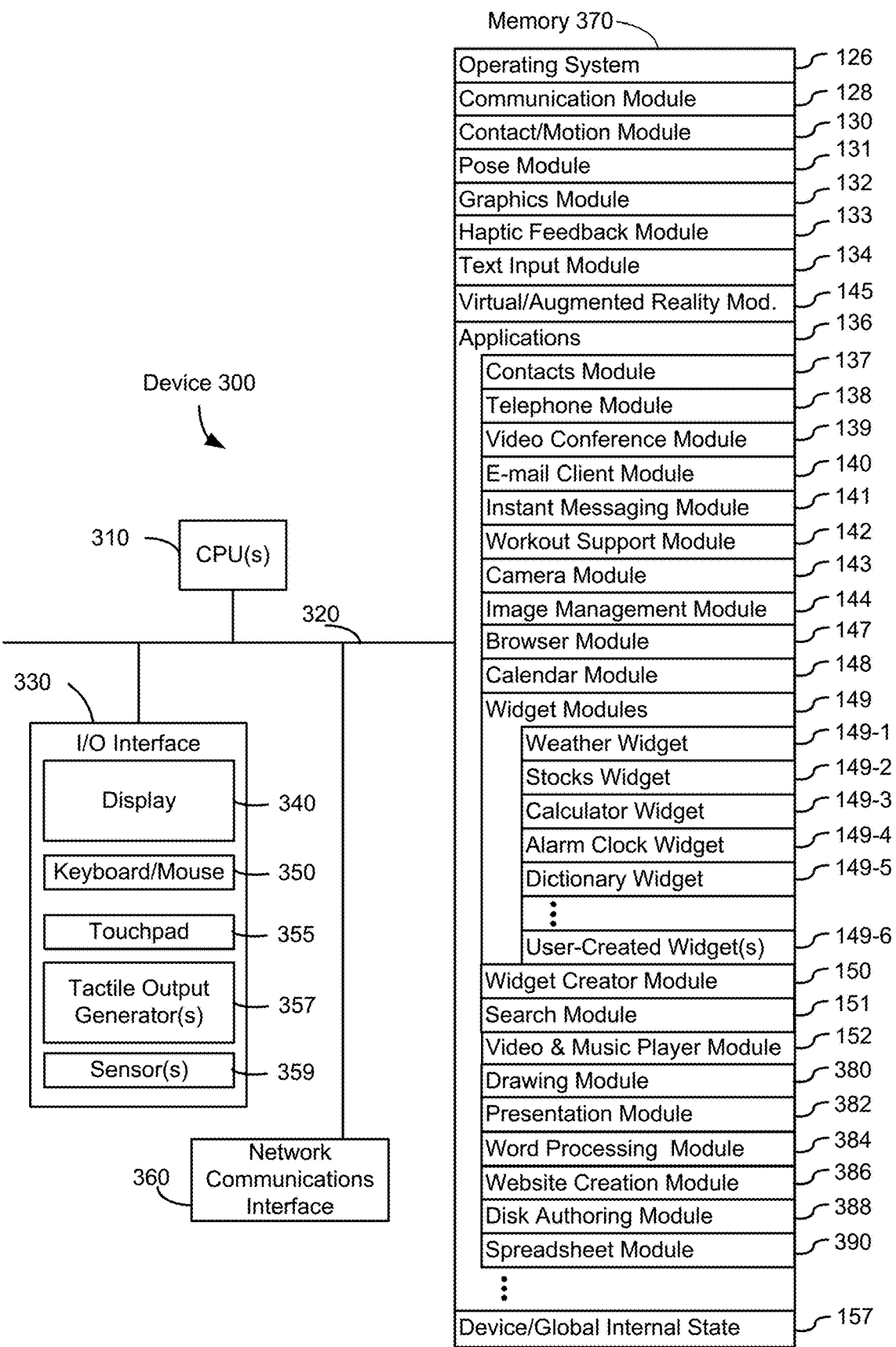

Device 300

310 — CPU(s)

320

330

I/O Interface

Display — 340

Keyboard/Mouse — 350

Touchpad — 355

Tactile Output Generator(s) — 357

Sensor(s) — 359

360 — Network Communications Interface

Memory 370

| | |
|---|---|
| Operating System | 126 |
| Communication Module | 128 |
| Contact/Motion Module | 130 |
| Pose Module | 131 |
| Graphics Module | 132 |
| Haptic Feedback Module | 133 |
| Text Input Module | 134 |
| Virtual/Augmented Reality Mod. | 145 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| ⋮ | |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing  Module | 384 |
| Website Creation Module | 386 |
| Disk Authoring Module | 388 |
| Spreadsheet Module | 390 |
| ⋮ | |
| Device/Global Internal State | 157 |

Figure 3A

Portable Multifunction Device 100
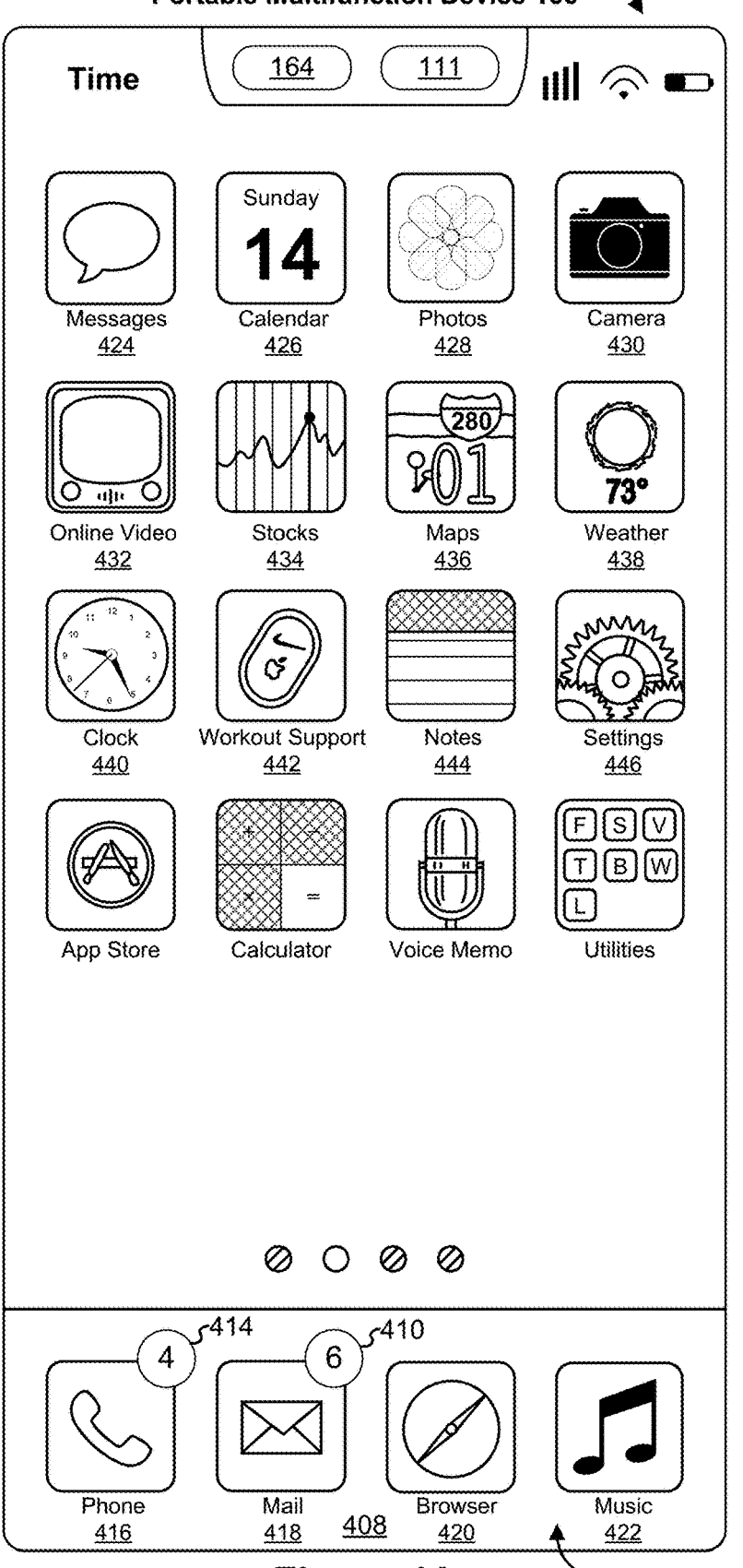
Figure 4A          Touch Screen 112

450

468

470

453

451

460

462

Tactile Output
Generator(s) 357

Contact Intensity
Sensor(s) 359

452

Figure 5A:
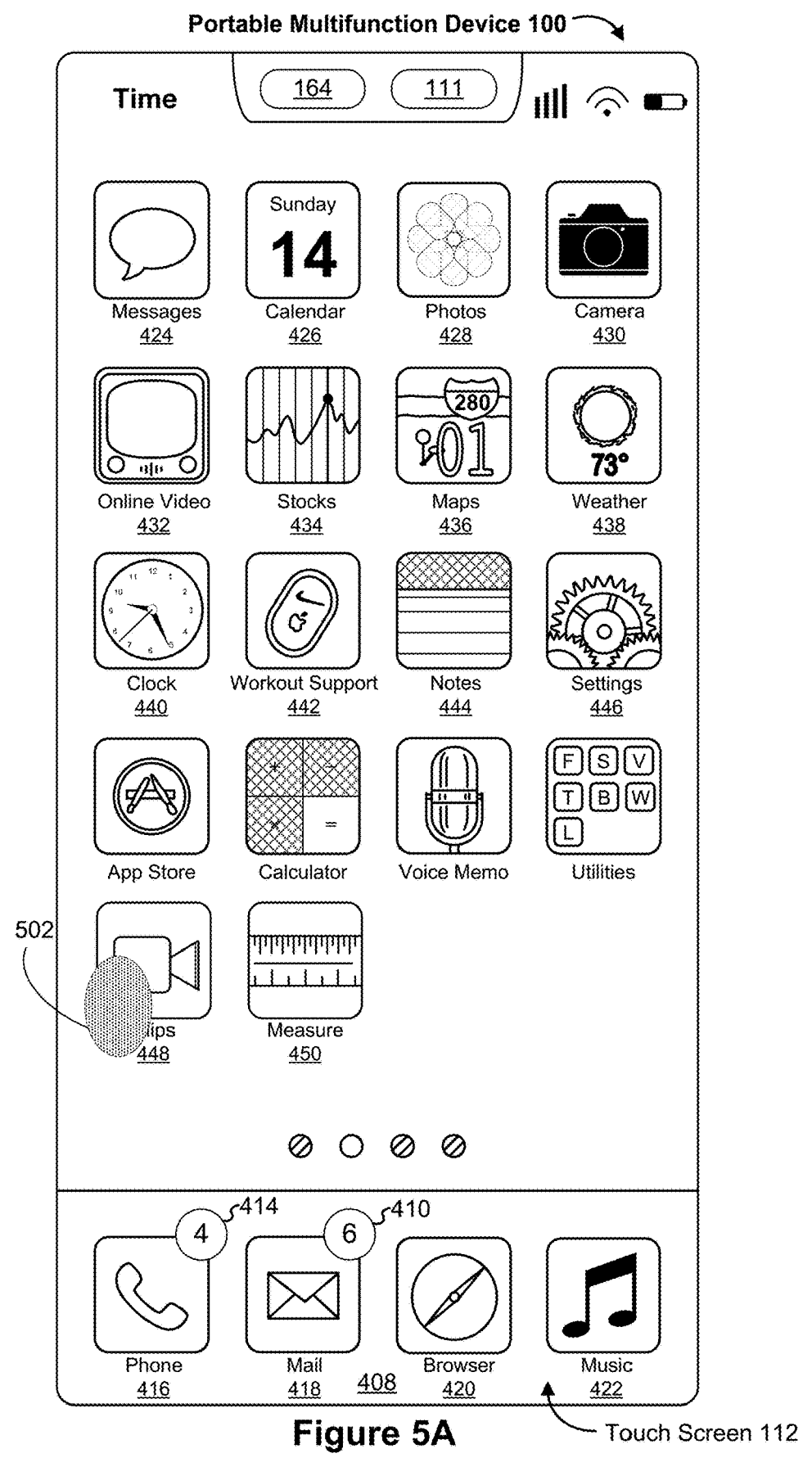

Portable Multifunction Device 100

Time    164    111

Messages
424

Sunday
14
Calendar
426

Photos
428

Camera
430

Online Video
432

Stocks
434

280
01
Maps
436

73°
Weather
438

Clock
440

Workout Support
442

Notes
444

Settings
446

App Store

Calculator

Voice Memo

F S V
T B W
L
Utilities

502

..ips
448

Measure
450

414    410

4    6

Phone
416

Mail
418    408

Browser
420

Music
422

Figure 5A    Touch Screen 112

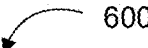

600

602 While a representation of a field of view of the one or more cameras, including a view of a first physical object that moves in a portion of a first physical environment, is visible via the display generation component, detect occurrence of a first event.

604 In response to detecting the occurrence of the first event, apply a first virtual effect to the representation of the field of view of the one or more cameras, including:

606 Applying the first virtual effect with a first set of values for a first characteristic of the first virtual effect, wherein the first set of values for the first characteristic of the first virtual effect are selected in accordance with segmentation of the view of the first physical object from the view of the portion of the first physical environment.

608 Applying the first virtual effect with a second set of values for a second characteristic of the first virtual effect, wherein the second set of values for the second characteristic of the first virtual effect are selected in accordance with tracking of movement of one or more portions of the first physical object in the portion of the first physical environment.

610 Detect first movement of the one or more portions of the first physical object in the portion of the first physical environment from a first position to a second position, wherein applying the first virtual effect with the second set of values for the second characteristic of the first virtual effect includes:
in response to detecting the first movement of the one or more portions of the first physical object from the first position to the second position, displaying animated movements of the first virtual effect in accordance with the first movement of the one or more portions of the first physical object from the first position to the second position.

612 Detect second movement of the one or more portions of the first physical object in the portion of the first physical environment from a first pose to a second pose, wherein applying the first virtual effect with the second set of values for the second characteristic of the first virtual effect includes:
in response to detecting the second movement of the one or more portions of the first physical object from the first pose to the second pose, updating display of the first virtual effect in accordance with the second movement of the one or more portions of the first physical object from the first pose to the second pose.

Figure 6A

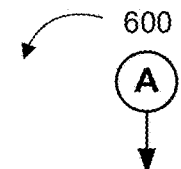

600

614 Applying the first virtual effect with the first set of values for the first characteristic of the first virtual effect includes:

displaying one or more virtual background elements in the view of the portion of the first physical environment, and forgoing display, based on the segmentation of the view of the first physical object from the view of the portion of the first physical environment, of one or more portions of the one or more virtual background elements in the view of the portion of the first physical environment in accordance with a determination that respective positions of the one or more portions of the one or more virtual background elements are behind the first physical object relative to a current viewpoint of the user that corresponds to the view of the portion of the first physical environment.

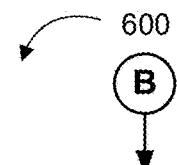

600

(B)

616 The first virtual effect includes a first set of one or more virtual elements; and applying the first virtual effect with the second set of values for the second characteristic of the first virtual effect includes displaying animated movements of the first set of one or more virtual elements, in the view of the portion of the first physical environment, that follow tracked movement of the one or more portions of the first physical object.

618 Displaying the animated movements of the first set of one or more virtual elements that follow the tracked movement of the one or more portions of the first physical object further includes:
forgoing display, based on the segmentation of the view of the first physical object from the view of the portion of the first physical environment, of one or more portions of the first set of one or more virtual elements in the view of the portion of the first physical environment in accordance with a determination that respective positions of the one or more portions of the first set of one or more virtual elements are behind the first physical object relative to a current viewpoint of the user that corresponds to the view of the portion of the first physical environment.

620 The first set of the one or more virtual elements that follow the tracked movement of the one or more portions of the first physical object includes a plurality of virtual elements that move away from the one or more portions of the first physical object during the tracked movement of the one or more portions of the first physical object.

622 The first set of the one or more virtual elements that follow the tracked movement of the one or more portions of the first physical object includes a set of one or more virtual outlines having respective shapes that correspond to a shape of the one or more portions of the first physical object.

624 Detect third movement of at least a first portion of the first physical object relative to the first physical environment; and
in response to detecting the third movement of at least the first portion of the first physical object, in accordance with a determination that the third movement satisfies motion criteria, update the first set of values for the first characteristic of the first virtual effect to an updated first set of values for the first characteristic, wherein the updated first set of values for the first characteristic are selected at least in part in accordance with the third movement of at least the first portion of the first physical object that satisfies the motion criteria.

Figure 6C

600

626 Detecting the third movement of at least the first portion of the first physical object that satisfies the motion criteria includes detecting a first gesture of the first physical object formed by the third movement of at least the first portion of the first physical object.

628 Detecting the third movement of at least the first portion of the first physical object that satisfies the motion criteria includes detecting that the third movement of at least the first portion of the first physical object causes the at least the first portion of the first physical object to come into contact or break contact with one or more physical surfaces in the first physical environment.

630 Applying the first virtual effect with the first set of values for the first characteristic of the first virtual effect includes displaying a second set of one or more virtual elements in the view of the portion of the first physical environment, wherein the first set of values for the first characteristic of the first virtual effect defines respective first positions at which the second set of one or more virtual elements are displayed within the view of the portion of the first physical environment in accordance with respective current positions of the one or more portions of the first physical object, and defines which portions of the second set of one or more virtual elements are occluded by the one or more portions of the first physical object in the view of the portion of the first physical environment. Detect fourth movement of at least a portion of the one or more portions of the first physical object in the portion of the first physical environment; and in response to detecting the fourth movement of the at least a portion of the first physical object in the portion of the first physical environment, update the first set of values for the first characteristic of the first virtual effect to define respective second positions at which the second set of one or more virtual elements are displayed within the view of the portion of the first physical environment in accordance with the respective current positions of the one or more portions of the first physical object, and to update which portions of the second set of one or more virtual elements are occluded by the one or more portions of the first physical object in the view of the portion of the first physical environment.

Figure 6D

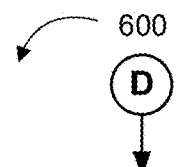

600

632 Applying the first virtual effect with the first set of values for the first characteristic of the first virtual effect includes displaying one or more textual elements in the view of the portion of the first physical environment, wherein the first set of values for the first characteristic of the first virtual effect defines a respective position at which the textual element is displayed within the view of the portion of the first physical environment in accordance with segmentation of the view of the first physical object from the view of the portion of the first physical environment.

634 The respective position at which the textual element is displayed within the view of the portion of the first physical environment is selected in accordance with a requirement that the textual element displayed at the respective position would not intersect with the view of the first physical object in the view of the portion of the first physical environment.

636 The representation of the field of view of the one or more cameras includes a second physical object, distinct from the first physical object, that moves in the portion of the first physical environment.
Apply the first virtual effect with a third set of values for a third characteristic of the first virtual effect, wherein the third set of values for the third characteristic of the first virtual effect are selected in accordance with segmentation of the view of the second physical object from the view of the portion of the first physical environment; and
apply the first virtual effect with a fourth set of values for a fourth characteristic of the first virtual effect, wherein the fourth set of values for the fourth characteristic of the first virtual effect are selected in accordance with tracking of movement of one or more portions of the second physical object in the portion of the first physical environment.

638 Applying the first virtual effect includes displaying a first virtual object at a respective position, relative to the view of the first physical environment, that corresponds to a first portion of the first physical object, wherein at least a portion of an outline of a visible portion of the first virtual object is based on an outline of the view of the first physical object that is determined based on segmenting the view of the first physical object from the view of the portion of the first physical environment.

Figure 6E

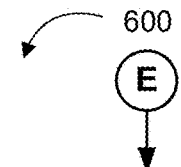

600

E

640 Applying the first virtual effect includes displaying a second virtual object at a respective position, relative to the view of the first physical environment, that is separated from the view of the first physical object.
Detect fifth movement of at least one of the one or more portions of the first physical object in the portion of the first physical environment, wherein applying the first virtual effect with the second set of values for the second characteristic of the first virtual effect includes, in response to detecting the fifth movement of the at least one of the one or more portions of the first physical object, animating the second virtual object to move the second virtual object away from the at least one portion of the one or more portions of the first physical object in accordance with motion tracking of the at least one portion of the one or more portions of the first physical object.

642 Detect sixth movement of the one or more portions of the first physical object in the portion of the first physical environment; and
in response to detecting the sixth movement of the one or more portions of the first physical object:
     in accordance with a determination that the sixth movement is a first type of movement, apply second virtual effect to the representation of the field of view of the one or more cameras, the second virtual effect selected based at least in part on the first type of movement; and
     in accordance with a determination that the sixth movement is a second type of movement, different from the first type of movement, apply a third virtual effect, different from the second virtual effect, to the representation of the field of view of the one or more cameras, the third virtual effect selected based at least in part on the second type of movement.

644 While applying the first virtual effect to the representation of the field of view of the one or more cameras, detect the occurrence of a second event;
in response to detecting the occurrence of the second event:
cease to apply the first virtual effect to the representation of the field of view of the one or more cameras; and
apply a fourth virtual effect, distinct from the first virtual effect to the representation of the field of view of the one or more cameras.

Figure 6F

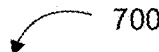

700

702 While a view of a three-dimensional environment, including a view of a first physical object that moves in a first portion of a first physical environment, is visible via the display generation component, detect occurrence of a first event.

704 In response to detecting the occurrence of the first event, apply a first virtual effect to a first portion of the view of the three-dimensional environment with a first set of values for a first set of characteristics of the first virtual effect, wherein the first portion of the three-dimensional environment is proximate to the view of the first physical object in the view of the three-dimensional environment, and wherein the first set of values for the first set of characteristics are selected in accordance with tracking of movement of one or more portions of the first physical object in the first portion of the first physical environment.

706 While applying the first virtual effect to the first portion of the view of the three-dimensional environment with the first set of values for the first set of characteristics of the first virtual effect, detect occurrence of a second event.

707 In response to detecting the occurrence of the second event, in accordance with a determination that the occurrence of the second event meets first criteria, apply the first virtual effect to a second portion, different from the first portion, of the view of the three-dimensional environment, with a second set of values, different from the first set of values, for the first set of characteristics of the first virtual effect, wherein the second portion of the three-dimensional environment is proximate to the view of a second physical object in the view of the three-dimensional environment, and wherein the second set of values for the first set of characteristics are selected in accordance with tracking of movement of one or more portions of the second physical object in a second physical environment

Figure 7A

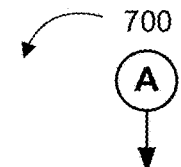

700

708 Prior to detecting the occurrence of the second event: detect first movement of the one or more portions of the first physical object in the first portion of the first physical environment; and in response to detecting the first movement of the one or more portions of the first physical object, update the first virtual effect applied to the first portion of the view of the three-dimensional environment that is proximate to the view of the first physical object, including updating the first set of values of the first set of characteristics of the first virtual effect in accordance with the first movement of the one or more portions of the first physical object in the first portion of the first physical environment; and after detecting the occurrence of the second event:

detect second movement of the one or more portions of the second physical object in the second physical environment; and in response to detecting the second movement of the one or more portions of the second physical object, update the first virtual effect applied to the second portion of the view of the three-dimensional environment that is proximate to the view of the second physical object, including updating the second set of values of the first set of characteristics of the first virtual effect in accordance with the second movement of the one or more portions of the second physical object in the second physical environment.

710 Prior to detecting the occurrence of the second event: detect third movement of the one or more portions of the second physical object in the second physical environment; and in response to detecting the third movement of the one or more portions of the second physical object, forgo updating the first virtual effect applied to the second portion of the view of the three-dimensional environment that is proximate to the view of the second physical object; and after detecting the occurrence of the second event:

detect fourth movement of the one or more portions of the first physical object in the first portion of the first physical environment; and in response to detecting the fourth movement of the one or more portions of the first physical object, forgo updating the first virtual effect applied to the first portion of the view of the three-dimensional environment that is proximate to the view of the first physical object.

Figure 7B

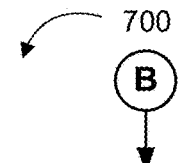

700

B

712 Prior to detecting the occurrence of the second event, apply a second virtual effect to the first portion of the view of the three-dimensional environment that is proximate to the view of the first physical object, wherein the second virtual effect is updated in accordance with tracking of the movement of the one or more portions of the first physical object in the first portion of the first physical environment; and after detecting the occurrence of the second event:
continue to update the second virtual effect that is applied to the first portion of the view of the three-dimensional environment that is proximate to the view of the first physical object in accordance with tracking of the movement of the one or more portions of the first physical object in the first portion of the first physical environment.

714 While applying the first virtual effect to the second portion of the view of the three-dimensional environment that is proximate to the view of the second physical object, without applying the first virtual effect to the first portion of the view of the three-dimensional environment that is proximate to the view of the first physical object, detect occurrence of a third event;
in response to detecting the occurrence of the third event, in accordance with a determination that the occurrence of the third event meets second criteria:
   re-apply the first virtual effect to the first portion of the view of the three-dimensional environment that is proximate to the view of the first physical object in accordance with the tracking of movement of the one or more portions of the first physical object in the first portion of the first physical environment; and
   cease to apply the first virtual effect to the second portion of the view of the three-dimensional environment that is proximate to the view of the second physical object.

716 In response to detecting the occurrence of the second event, in accordance with a determination that the occurrence of the second event does not meet the first criteria, continue to update the first virtual effect that is applied to the first portion of the view of the three-dimensional environment that is proximate to the view of the first physical object in accordance with the tracking of the movement of the one or more portions of the first physical object in the first portion of the first physical environment, without applying the first virtual effect to the second portion of the view of the three-dimensional environment that is proximate to the view of the second physical object.

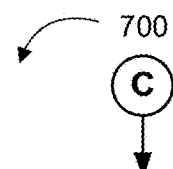

700

C

718 While applying the first virtual effect to the first portion of the view of the three-dimensional environment in accordance with the tracking of movement of the one or more portions of the first physical object in the first portion of the first physical environment, detect occurrence of a third event; and
in response to detecting the occurrence of the third event, and in accordance with a determination that the occurrence of the third event meet third criteria, apply a third virtual effect to the first portion of the view of the three-dimensional environment that is proximate to the view of the first physical object, wherein the third virtual effect is applied in accordance with the tracking of movement of the one or more portions of the first physical object in the first portion of the first physical environment.

720 The determination that the occurrence of the third event meets the third criteria includes a determination that movement of the one or more portions of the first physical object has met a first set of conditions.

722 The first physical object and the second physical object are collocated in the first physical environment, and the second physical environment is a second portion of the first physical environment different from the first portion of the first physical environment.

724 The first physical object and the second physical object are not collocated in a same physical environment, and the first physical environment is different from the second physical environment.

726 Display the view of the three-dimensional environment in a user interface of a real-time communication session.

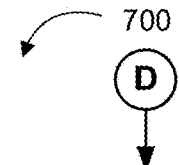

728 Display the view of the first physical object and the view of the second physical object in a first content region and a second content region in a user interface, wherein the first content region is distinct from the second content region;
Prior to detecting the second event, while applying the first virtual effect to the first portion of the view of the three-dimensional environment that is proximate to the view of the first physical object in accordance with the tracking of movement of the one or more portions of the first physical object in the first portion of the first physical environment, visually emphasize the first content region relative to the second content region; and
in response to detecting the occurrence of the second event, in accordance with the determination that the occurrence of the second event meets the first criteria, visually emphasize the second content region relative to the first content region, while applying the first virtual effect to the second portion of the view of the three-dimensional environment that is proximate to the view of the second physical object in accordance with the tracking of movement of the one or more portions of the second physical object in the second physical environment.

730 The first virtual effect is further applied to the first portion of the view of the three-dimensional environment that is proximate to the view of the first physical object in accordance with segmentation of the view of the first physical object from a view of the first portion of the first physical environment.

Figure 7E

SYSTEMS, METHODS, AND GRAPHICAL USER INTERFACES FOR APPLYING VIRTUAL EFFECTS IN THREE-DIMENSIONAL ENVIRONMENTS

RELATED APPLICATIONS

This application claims priority to U.S. Provisional Application Ser. No. 63/445,164, filed Feb. 13, 2023, which is hereby incorporated by reference in its entirety.

TECHNICAL FIELD

This relates generally to computer systems for virtual/ augmented reality, including but not limited to electronic devices that produce virtual/augmented reality environments.

BACKGROUND

The development of computer systems for virtual/augmented reality has increased significantly in recent years. But methods and interfaces for interacting with environments that include at least some virtual elements (e.g., augmented reality environments, mixed reality environments, and virtual reality environments) are cumbersome and inefficient.

Conventional methods of adding virtual effects in an augmented reality environment provide limited interactions with surfaces and objects of the physical environment. In some cases, conventional methods of displaying virtual effects provide limited interactions with an individual that is within the physical environment. In addition, these methods take longer than necessary, thereby wasting energy and/or producing virtual effects. The energy usage consideration is particularly important in battery-operated devices.

SUMMARY

Accordingly, there is a need for computer systems with faster, more efficient methods and interfaces for displaying virtual effects in augmented reality and/or virtual reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for virtual/augmented reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touchscreen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method includes, while a representation of a field of view of the one or more cameras, including a view of a first physical object that moves in a portion of a first physical environment, is visible via the display generation component, detecting occurrence of a first event. The method includes, in response to detecting the occurrence of the first event, applying a first virtual effect to the representation of the field of view of the one or more cameras, including: applying the first virtual effect with a first set of values for a first characteristic of the first virtual effect, wherein the first set of values for the first characteristic of the first virtual effect are selected in accordance with segmentation of the view of the first physical object from the view of the portion of the first physical environment; and applying the first virtual effect with a second set of values for a second characteristic of the first virtual effect, wherein the second set of values for the second characteristic of the first virtual effect are selected in accordance with tracking of movement of one or more portions of the first physical object in the portion of the first physical environment.

In accordance with some embodiments, a method includes, while a view of a three-dimensional environment, including a view of a first physical object that moves in a first portion of a first physical environment, is visible via the display generation component, detecting occurrence of a first event. The method includes, in response to detecting the occurrence of the first event, applying a first virtual effect to a first portion of the view of the three-dimensional environment with a first set of values for a first set of characteristics of the first virtual effect, wherein the first portion of the three-dimensional environment is proximate to the view of the first physical object in the view of the three-dimensional environment, and wherein the first set of values for the first set of characteristics are selected in accordance with tracking of movement of one or more portions of the first physical object in the first portion of the first physical environment. The method further includes, while applying the first virtual effect to the first portion of the view of the three-dimensional environment with the first set of values for the first set of characteristics of the first virtual effect, detecting occurrence of a second event. The method includes, in response to detecting the occurrence of the second event, in accordance with a determination that the occurrence of the second event meets first criteria, applying the first virtual effect to a second portion, different from the first portion, of the view of the three-dimensional environment, with a second set of values, different from the first set of values, for the first set of characteristics of the first virtual effect, wherein the second portion of the three-dimensional environment is proximate to the view of a second physical object in the view of the three-dimensional environment, and wherein the second set of values for the first set of characteristics are selected in accordance with tracking of movement of one or more portions of the second physical object in a second physical environment.

In accordance with some embodiments, a computer system includes (and/or is in communication with) a display generation component (e.g., a display, a projector, a head-mounted display, a heads-up display, or the like), one or more cameras (e.g., video cameras that continuously, or repeatedly at regular intervals, capture and provide a live view of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more pose sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes (and/or is in communication with) a display generation component, one or more cameras, one or more input devices, optionally one or more pose sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more pose sensors, optionally one or more sensors to detect intensities of contacts with the touch-sensitive surface, and optionally one or more tactile output generators, are provided with improved methods and interfaces for adding virtual effects using augmented reality environments, thereby increasing the effectiveness, efficiency, and user satisfaction with such computer systems. Such methods and interfaces may complement or replace conventional methods for adding virtual effects using augmented reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1A is a block diagram illustrating a portable multifunction device with a touch-sensitive display in accordance with some embodiments.

FIG. 3A is a block diagram of an example multifunction device with a display and a touch-sensitive surface in accordance with some embodiments.

FIG. 4A illustrates an example user interface for a menu of applications on a portable multifunction device in accordance with some embodiments.

FIGS. 5A-5K illustrate example user interfaces for adding virtual effects using augmented reality environments in accordance with some embodiments.

FIGS. 6A-6F are flow diagrams of a process for adding virtual effects in augmented reality environments in accordance with some embodiments.

FIGS. 7A-7E are flow diagrams of a process for updating a virtual effect applied to a three-dimensional environment based on movement of two or more subjects in accordance with some embodiments.

DESCRIPTION OF EMBODIMENTS

Figure 1B:
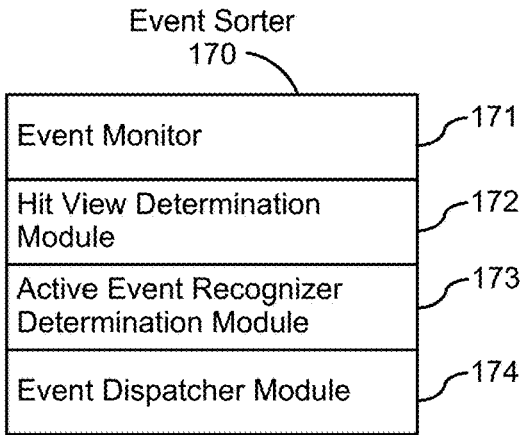
FIG. 1B is a block diagram illustrating example components for event handling in accordance with some embodiments.
Figure 1B:
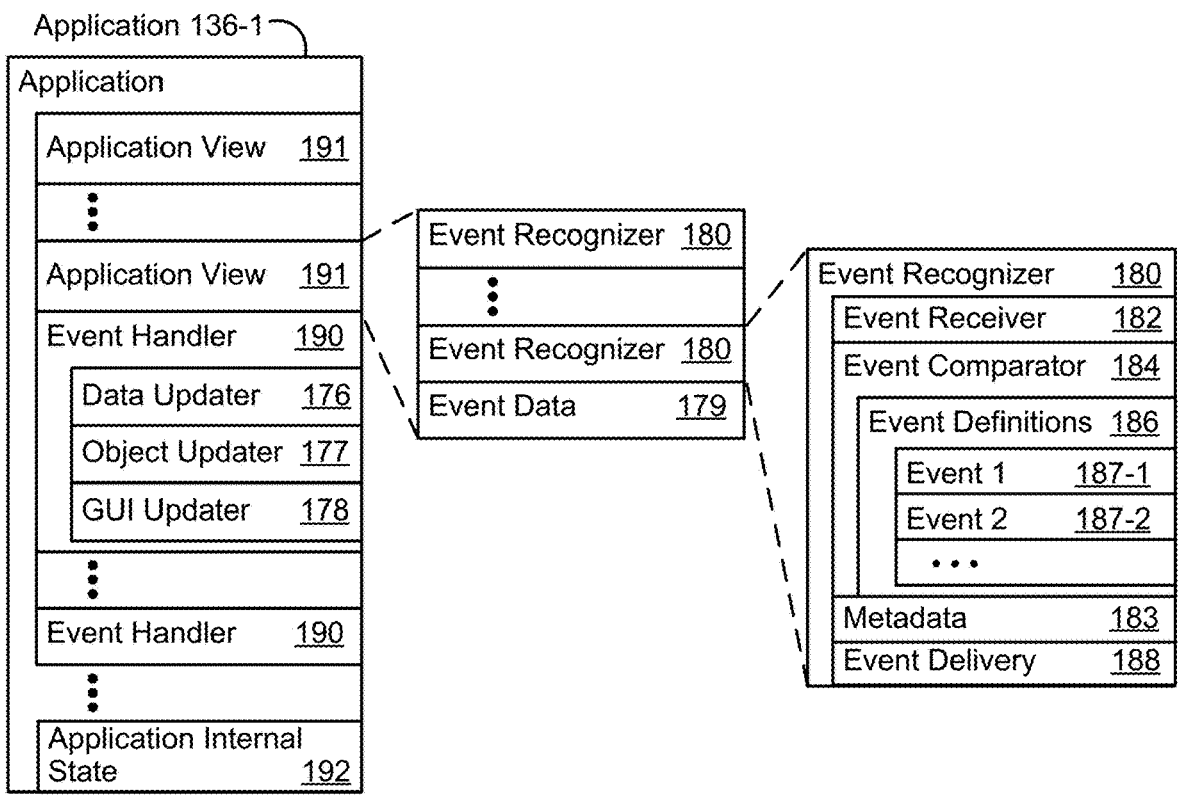

As noted above, it is advantageous to add virtual effects that are intelligently applied to a view of surfaces and objects of the physical environment in an augmented reality environment, as a position of the augmented reality device changes. When displaying virtual effects, scanning features of the physical environment before applying the virtual effect using augmented reality provide improved interactive experience to the user. In some cases, when providing an augmented reality or augmented virtuality experience, taking into account users that are within the physical environment such that the virtual effect is dynamically updated based on the various stationary portions of the physical environment as well as features and movements of the individual makes the experience more realistic, spontaneous, and interactive for the participating users.

The systems, methods, and GUIs described herein improve user interface interactions with virtual/augmented reality environments in multiple ways. For example, they make it easier to apply interactive virtual effects to an augmented reality environment by intelligently detecting moving physical objects such as human subjects within the physical environment to provide virtual effects that update based on a state of the human subject (e.g., shape and movement of the subject as a whole and/or of individual portions of the subject, and/or in isolation or relative to other physical objects and the physical environment). Additionally, the virtual effects that are applied are based both on segmentation of the physical object (e.g., human subject, or other moving objects) from the background of the physical environment and on motion-tracked elements of the physical object that update as the motion-tracked elements move in the physical environment, e.g., relative to other physical objects and/or other portions of the physical object.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or tactile feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Below, FIGS. 1A-1B, 2, and 3A-3C provide a description of example devices. FIGS. 4A-4B and 5A-5K illustrate example user interfaces for applying virtual effects to virtual and/or augmented reality environments. FIGS. 6A-6F illustrate a flow diagram of a method of adding virtual effects in augmented reality environments in accordance with some embodiments. FIGS. 7A-7E illustrate a flow diagram of a method of updating a virtual effect applied to a three-dimensional environment based on movement of two or more subjects in accordance with some embodiments. FIGS. 5A-5I are used to illustrate the processes in FIGS. 6A-6F and 7A-7E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for virtual/augmented reality include electronic devices that produce virtual/augmented reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button (e.g., a single button that rocks in opposite directions, or separate up button and down button) for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the pose (e.g., position and orientation or attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's pose (e.g., location and/or attitude).

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the pre-defined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Pose module 131, in conjunction with accelerometers 167, gyroscopes 168, and/or magnetometers 169, optionally detects pose information concerning the device, such as the device's pose (e.g., roll, pitch, yaw and/or position) in a particular frame of reference. Pose module 131 includes software components for performing various operations related to detecting the position of the device and detecting changes to the pose of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments, virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:

contacts module 137 (sometimes called an address book or contact list);

telephone module 138;

video conferencing module 139;

e-mail client module 140;

instant messaging (IM) module 141;

workout support module 142;

camera module 143 for still and/or video images;

image management module 144;

browser module 147;

calendar module 148;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current pose (e.g., position and orientation) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2:
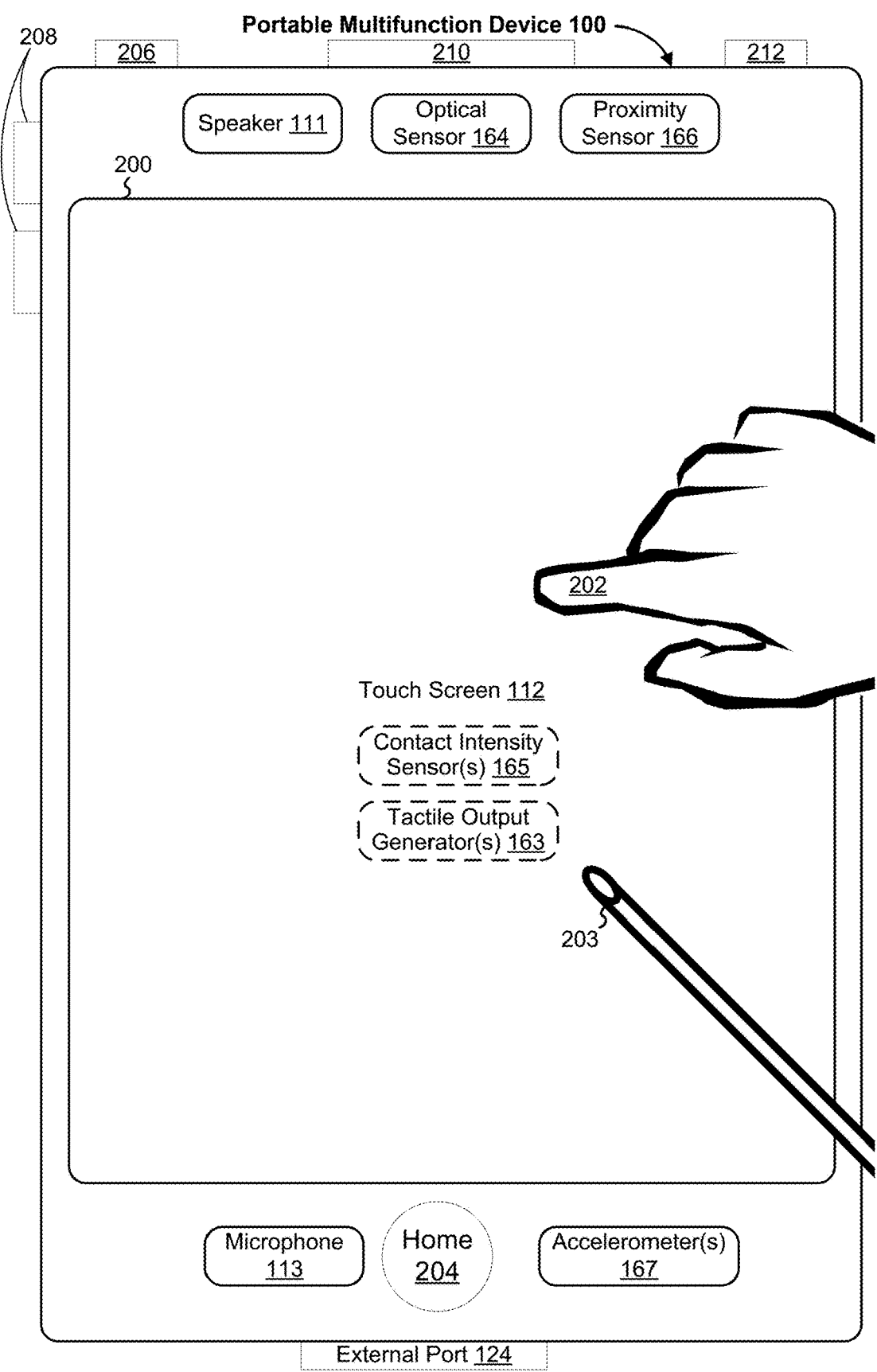
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display, or as a system gesture such as an upward edge swipe.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and/or docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
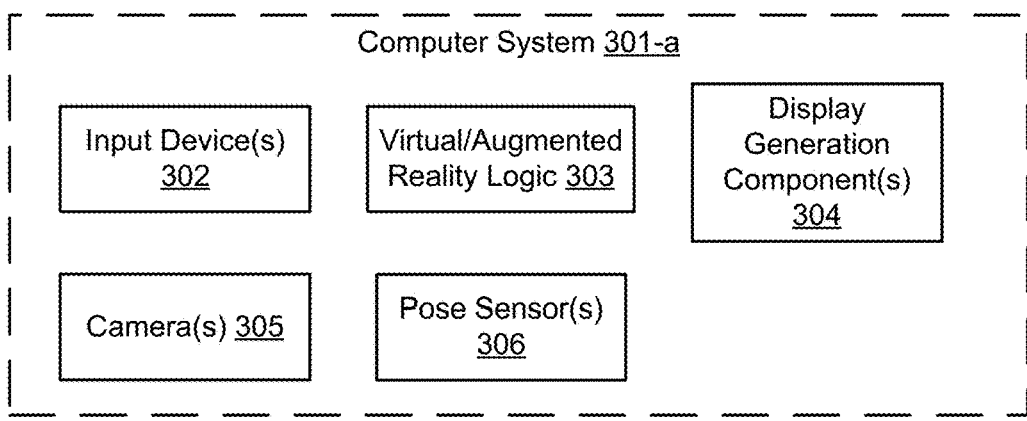
FIGS. 3B-3C are block diagrams of example computer systems in accordance with some embodiments.
Figure 3B:
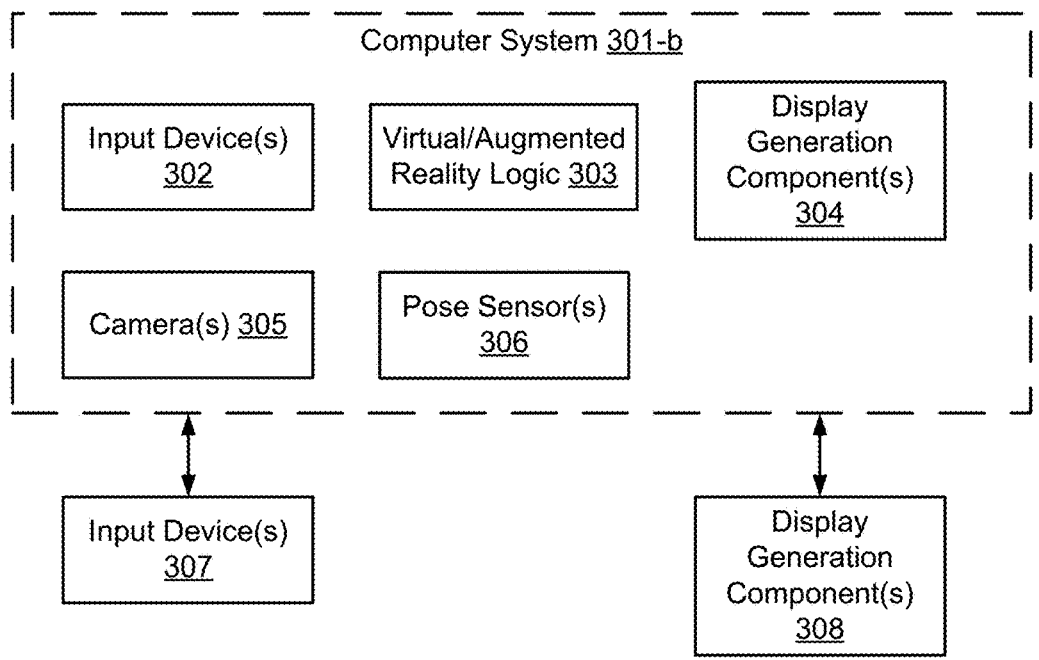
Figure 3C:
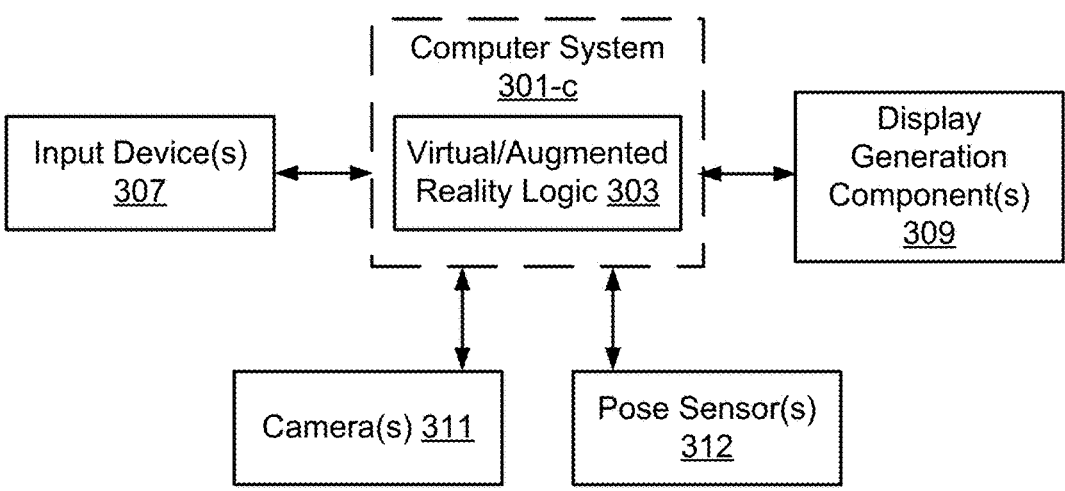

FIGS. 3B-3C are block diagrams of example computer systems 301 in accordance with some embodiments.

In some embodiments, computer system 301 includes and/or is in communication with:

input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);

virtual/augmented reality logic 303 (e.g., virtual/augmented reality module 145);

display generation component(s) (304 and/or 308, e.g., a display, a projector, a head-mounted display, a heads-up display, or the like) for displaying virtual user interface elements to the user;

camera(s) (e.g., 305 and/or 311) for capturing images of a field of view of the device, e.g., images that are used to determine placement of virtual user interface elements, determine a pose of the device, and/or display a portion of the physical environment in which the camera(s) are located; and pose sensor(s) (e.g., 306 and/or 311) for determining a pose of the device relative to the physical environment and/or changes in pose of the device.

In some computer systems (e.g., 301-a in FIG. 3B), input device(s) 302, virtual/augmented reality logic 303, display generation component(s) 304, camera(s) 305; and pose sensor(s) 306 are all integrated into the computer system (e.g., portable multifunction device 100 in FIGS. 1A-1B or device 300 in FIG. 3 such as a smartphone or tablet).

In some computer systems (e.g., 301-b), in addition to integrated input device(s) 302, virtual/augmented reality logic 303, display generation component(s) 304, camera(s) 305; and pose sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-*c* in FIG. 3C), the input device(s) 307, display generation component(s) 309, camera(s) 311; and/or pose sensor(s) 312 are separate from the computer system and are in communication with the computer system. In some embodiments, other combinations of components in computer system 301 and in communication with the computer system are used. For example, in some embodiments, display generation component(s) 309, camera(s) 311, and pose sensor(s) 312 are incorporated in a headset that is either integrated with or in communication with the computer system.

In some embodiments, all of the operations described below with reference to FIGS. 5A-5K are performed on a single computing device with virtual/augmented reality logic 303 (e.g., computer system 301-*a* described below with reference to FIG. 3B). However, it should be understood that frequently multiple different computing devices are linked together to perform the operations described below with reference to FIGS. 5A-5K (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A-5K is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-*a* in FIG. 3B) that contains the virtual/augmented reality logic 303. For example, the computer system may be a desktop computer or laptop computer with an integrated display (e.g., 340 in FIG. 3) and touchpad (e.g., 355 in FIG.

3). As another example, the computing device may be a portable multifunction device 100 (e.g., a smartphone, PDA, tablet computer, etc.) with a touch screen (e.g., 112 in FIG. 2).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-*c* in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;

Time;

a Bluetooth indicator;

a Battery status indicator;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser"; and

Icon 422 for video and music player module 152, labeled "Music"; and

Icons for other applications, such as:

Icon 424 for IM module 141, labeled "Messages";

Icon 426 for calendar module 148, labeled "Calendar";

Icon 428 for image management module 144, labeled "Photos";

Icon 430 for camera module 143, labeled "Camera";

Icon 432 for online video module 155, labeled "Online Video";

Icon 434 for stocks widget 149-2, labeled "Stocks";

Icon 436 for map module 154, labeled "Maps";

Icon 438 for weather widget 149-1, labeled "Weather";

Icon 440 for alarm clock widget 149-4, labeled "Clock";

Icon 442 for workout support module 142, labeled "Workout Support";

Icon 444 for notes module 153, labeled "Notes"; and

Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
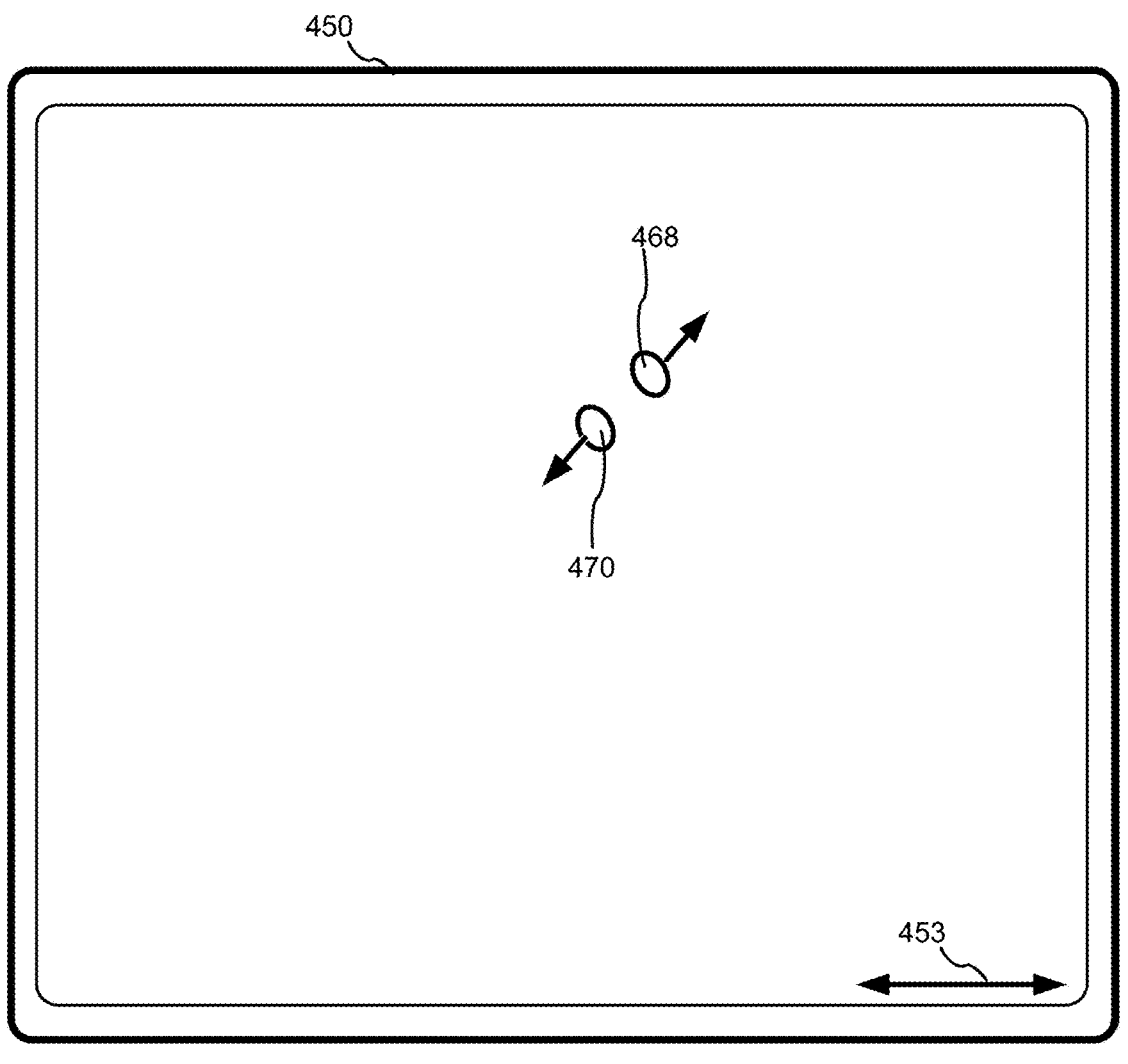
FIG. 4B illustrates an example user interface for a multifunction device with a touch-sensitive surface that is separate from the display in accordance with some embodiments.
Figure 4B:
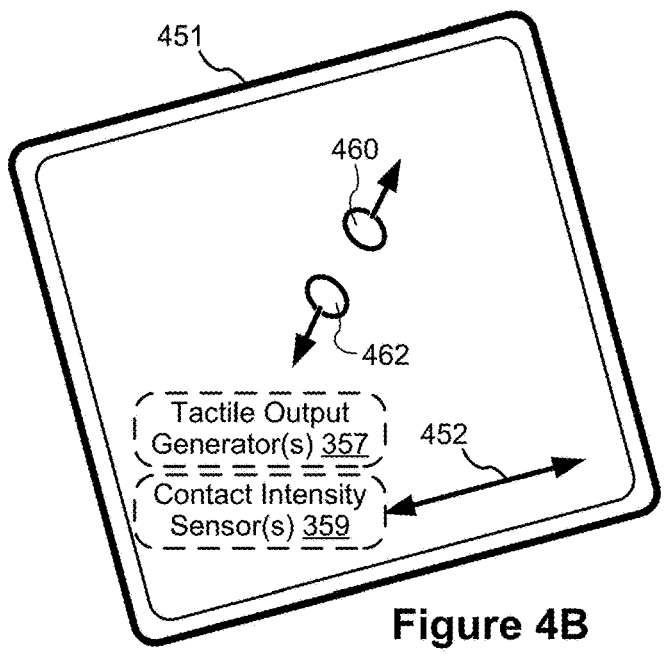

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $IT_D$). FIG. 4D also illustrates two other intensity thresholds: a first intensity threshold $IT_H$ and a second intensity threshold $IT_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $IT_L$.

FIG. 4E illustrate yet another dynamic intensity threshold 492 (e.g., intensity threshold $IT_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $IT_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $IT_L$.

User Interfaces and Associated Processes

Attention is now directed towards embodiments of user interfaces ("UI") and associated processes that may be implemented on a computer system (e.g., portable multifunction device 100 or device 300) that includes (and/or is in communication with) a display generation component (e.g., a display, a projector, a head-mounted display, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, and optionally one or more tactile output generators.

FIGS. 5A-5I illustrate example user interfaces for applying virtual effects in an AR environment in accordance with some embodiments. FIGS. 5J-5K illustrate example user interfaces for passing a virtual effect in a communication session in accordance with some embodiments. The user interfaces in these figures are used to illustrate the processes described below, including the processes in FIGS. 6A-6F and 7A-7E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5B:
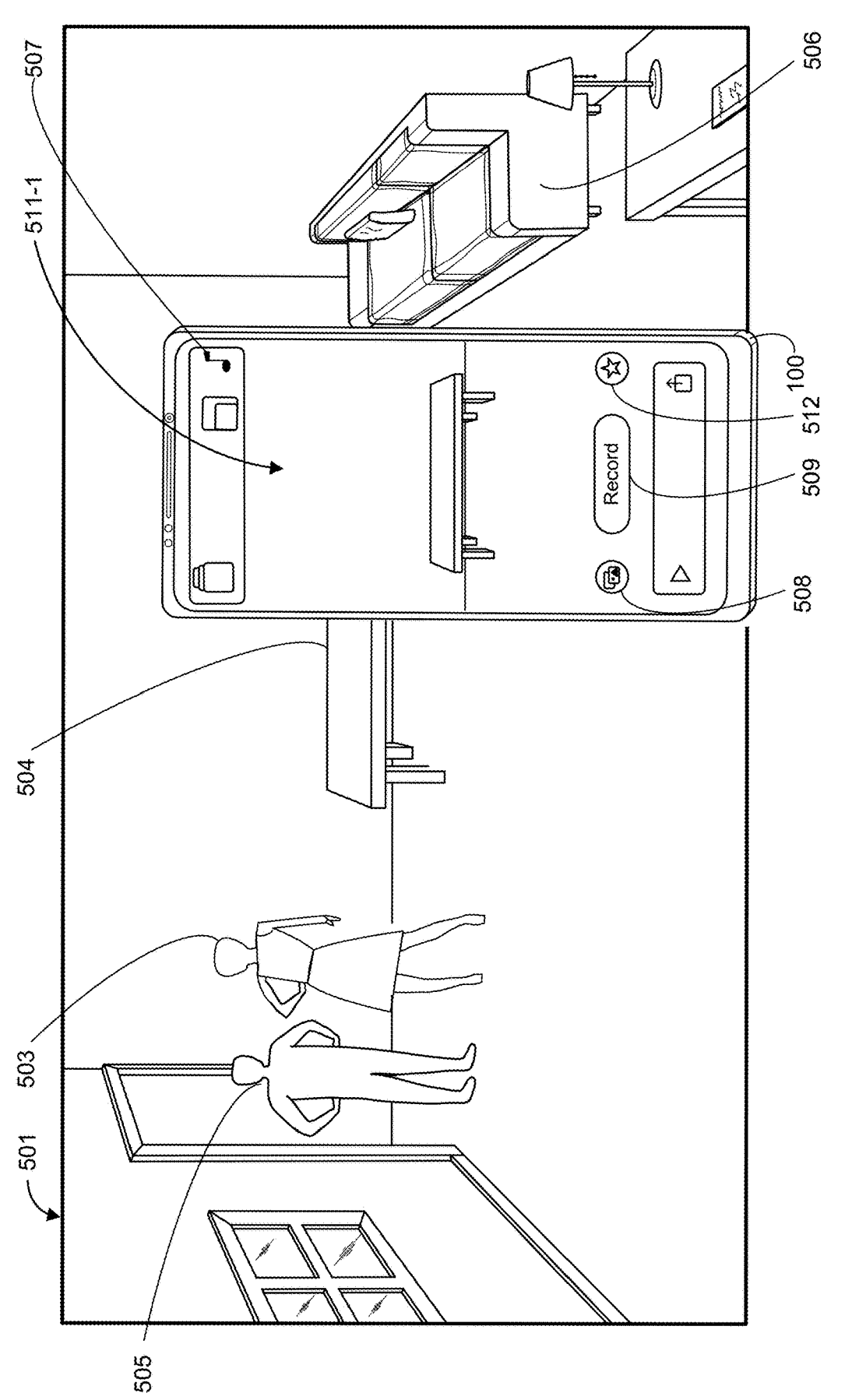
Figure 5C:
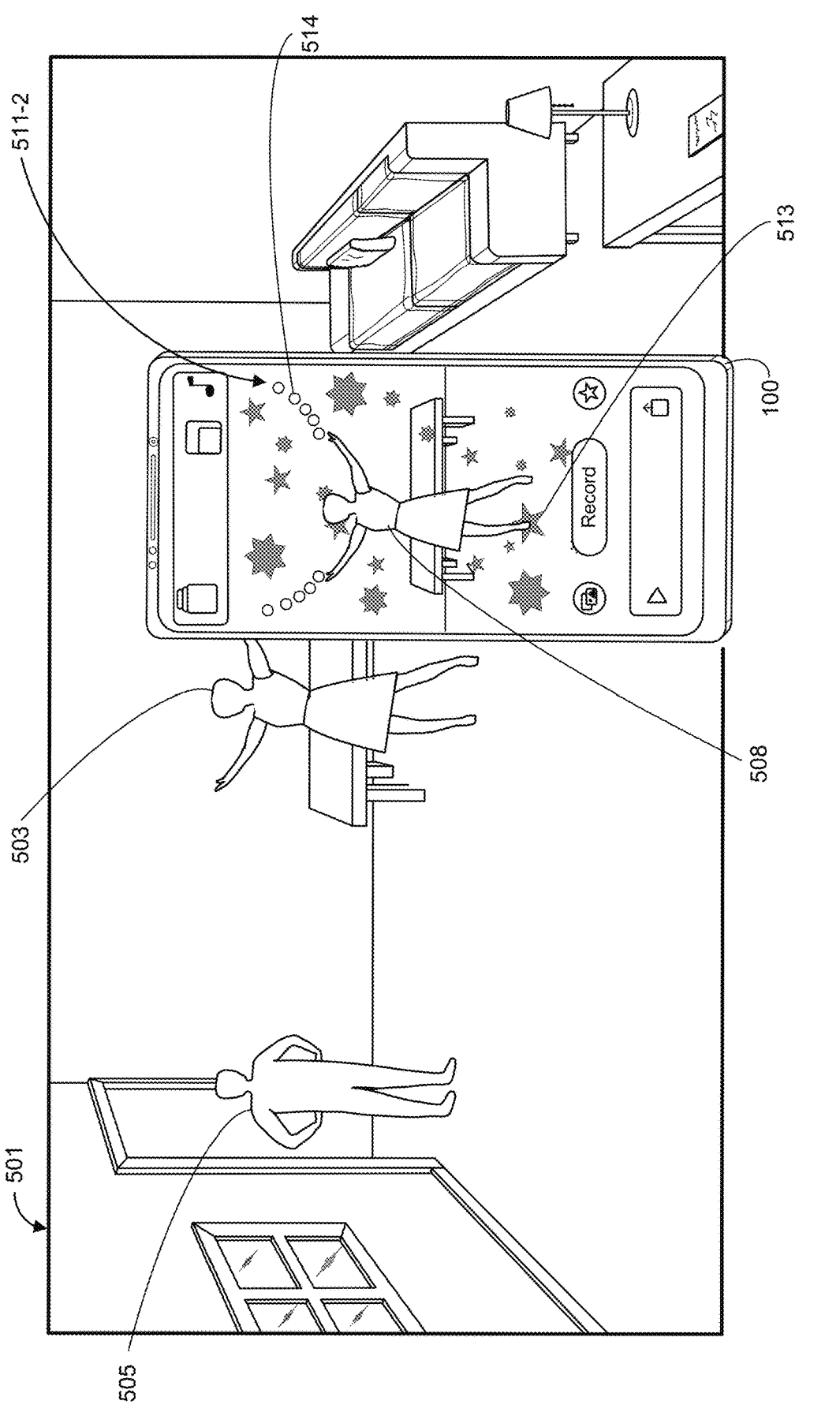
Figure 5D:
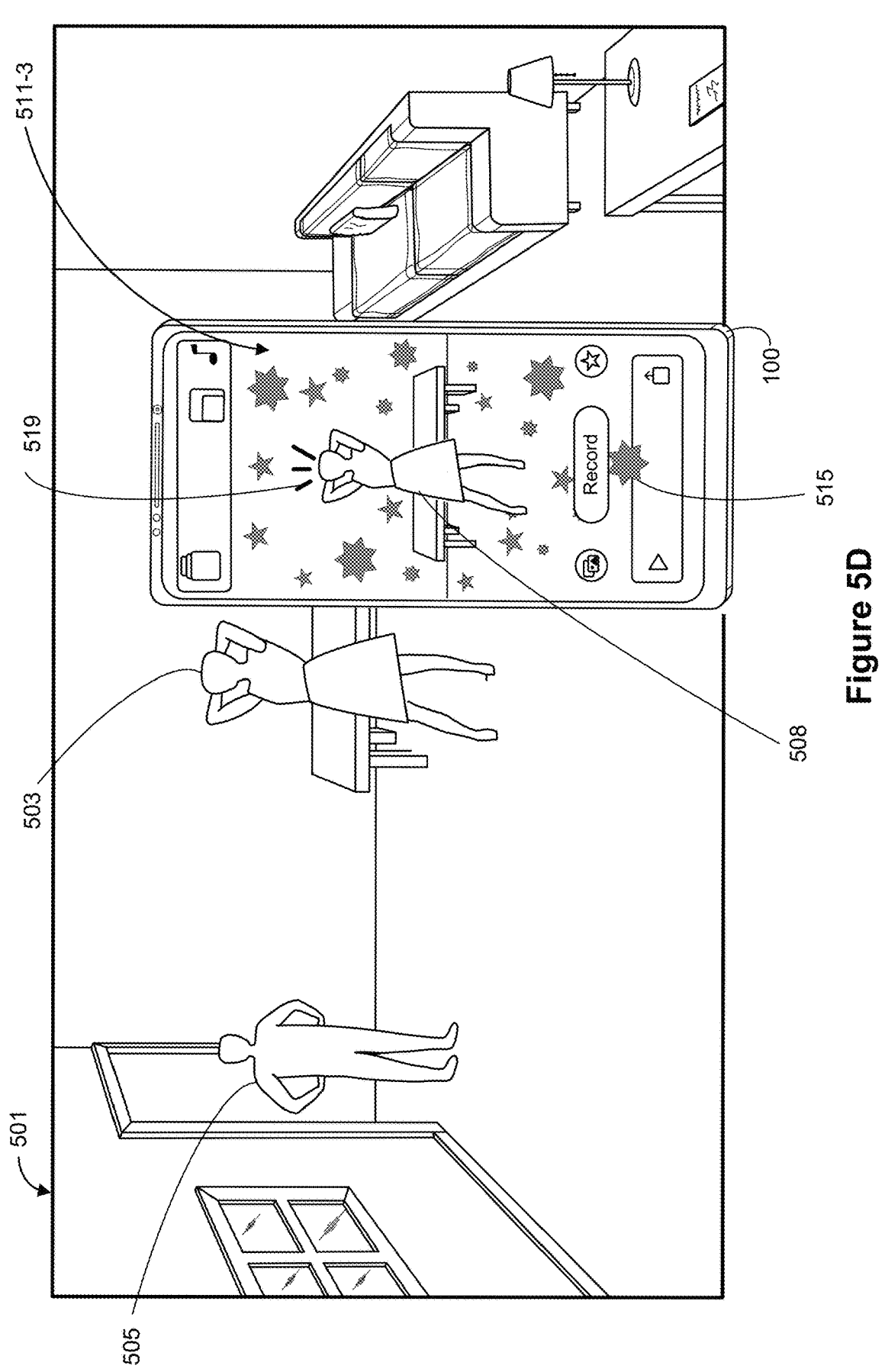
Figure 5E:
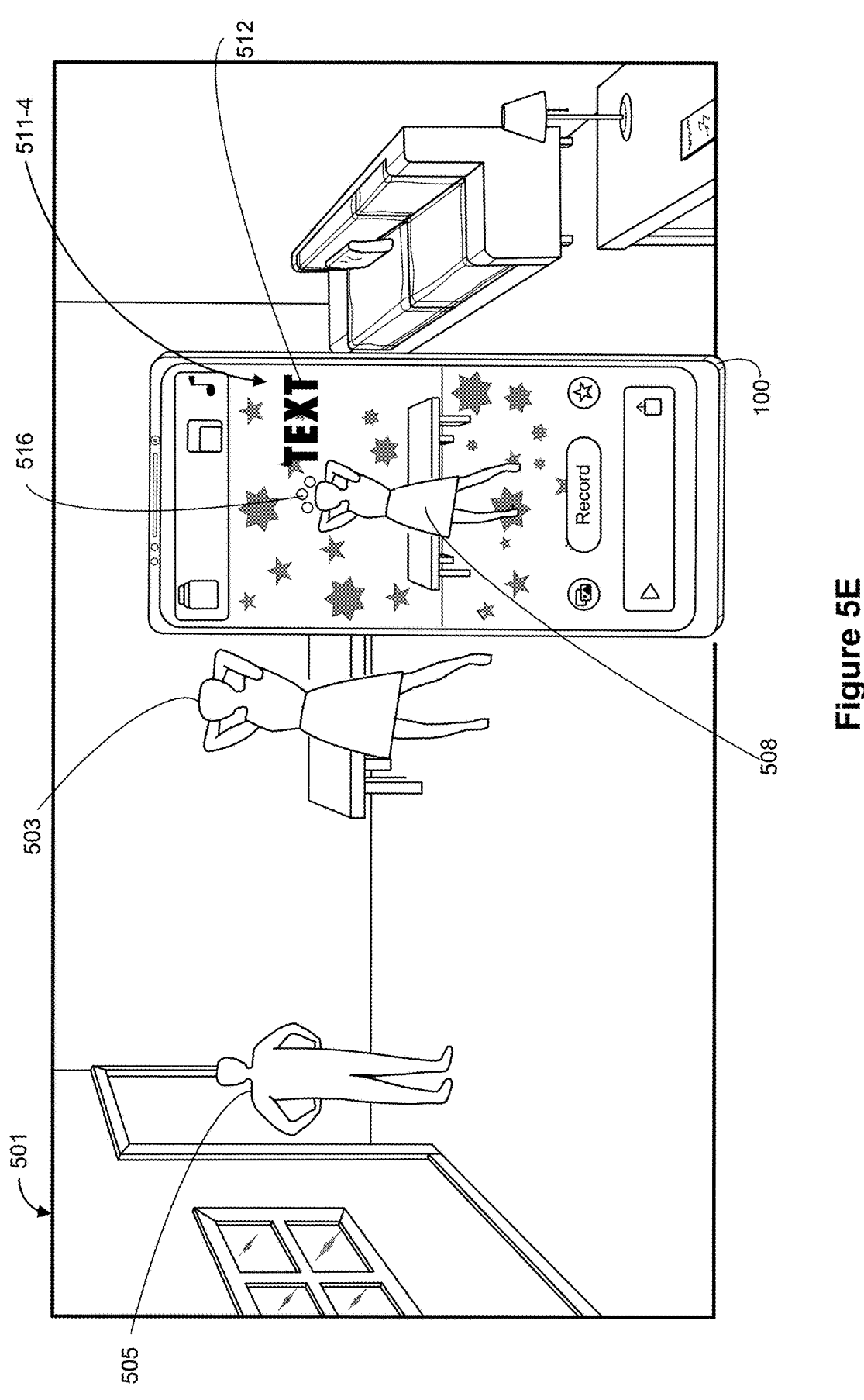
Figure 5F:
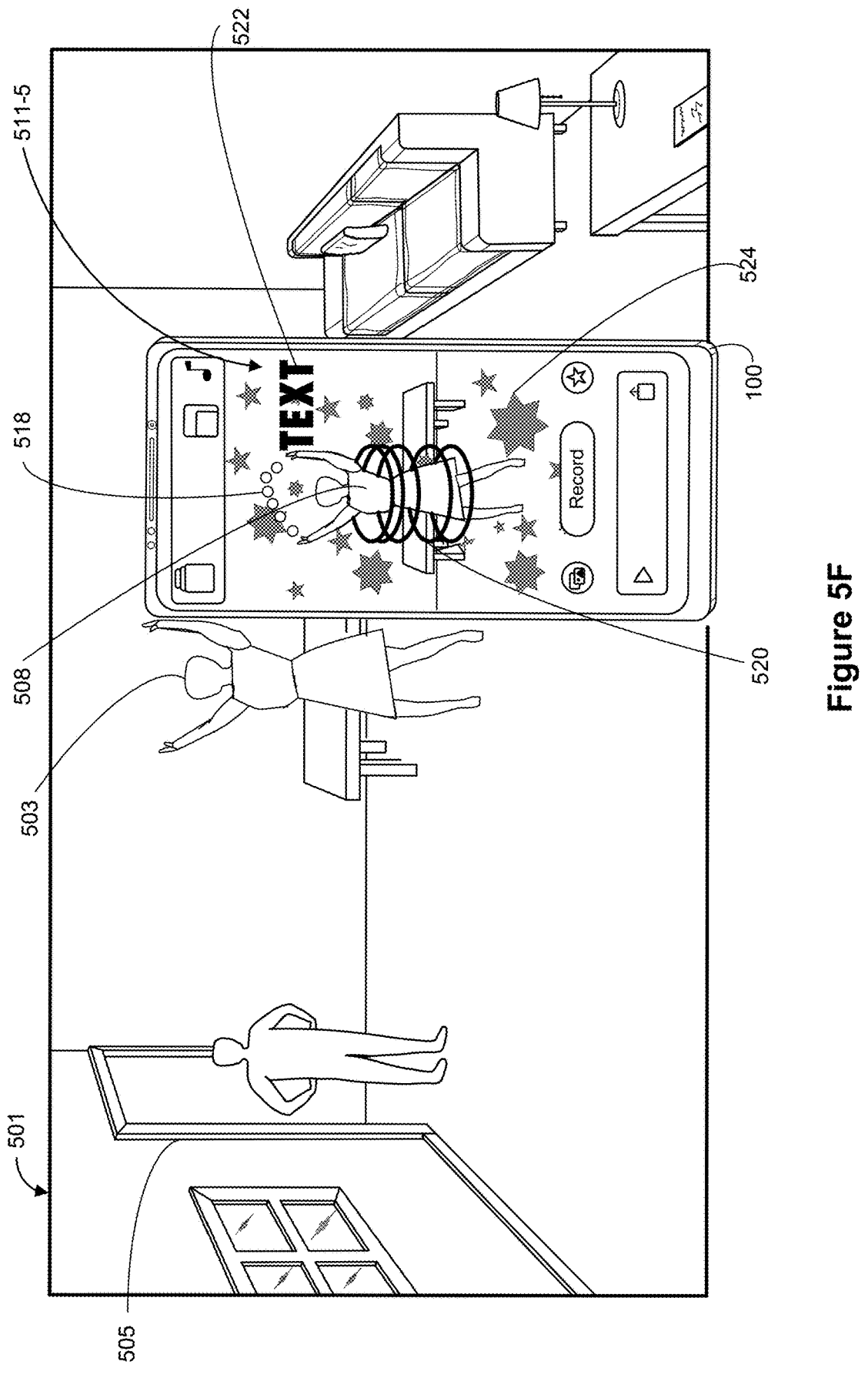
Figure 5G:
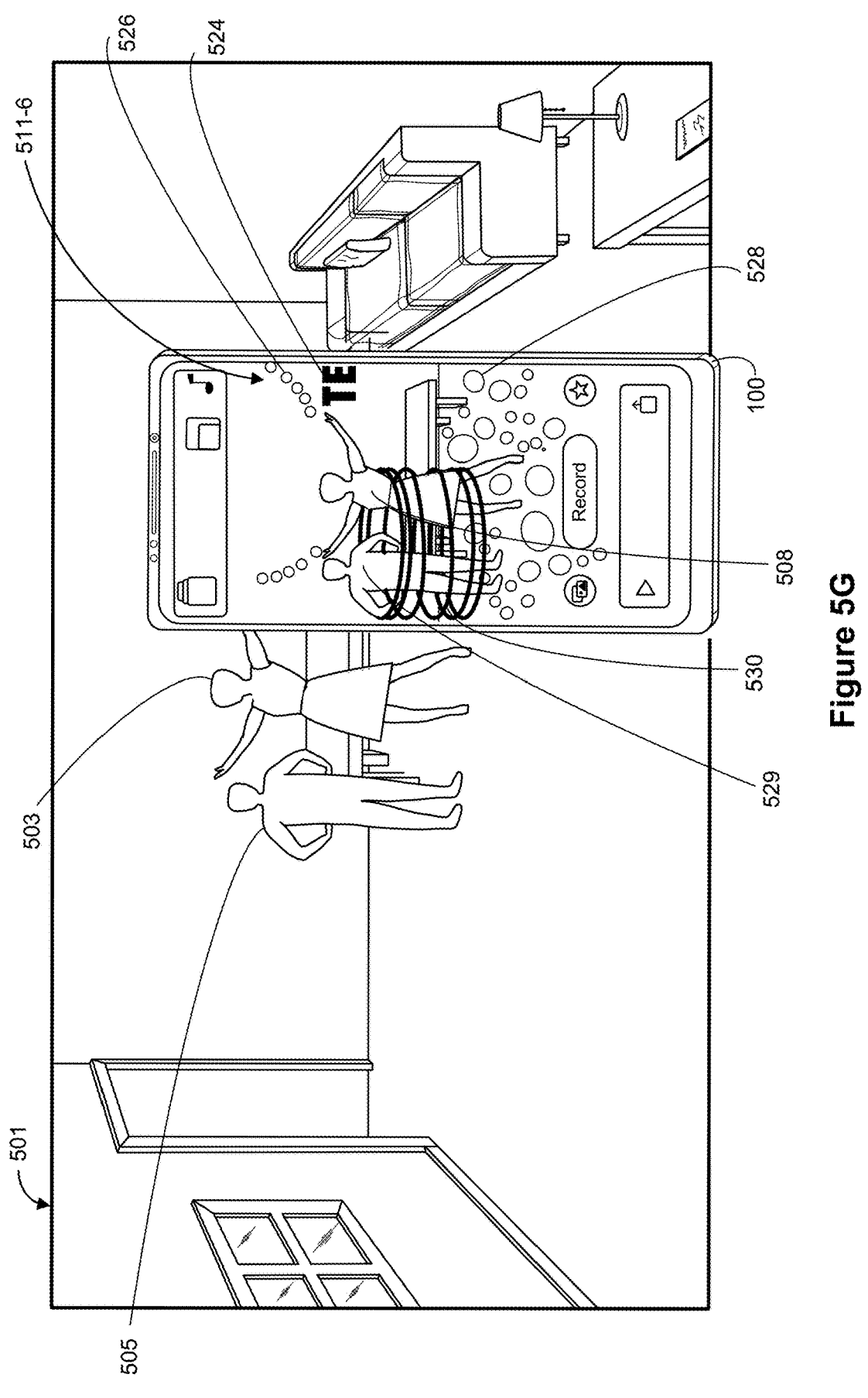
Figure 5H:
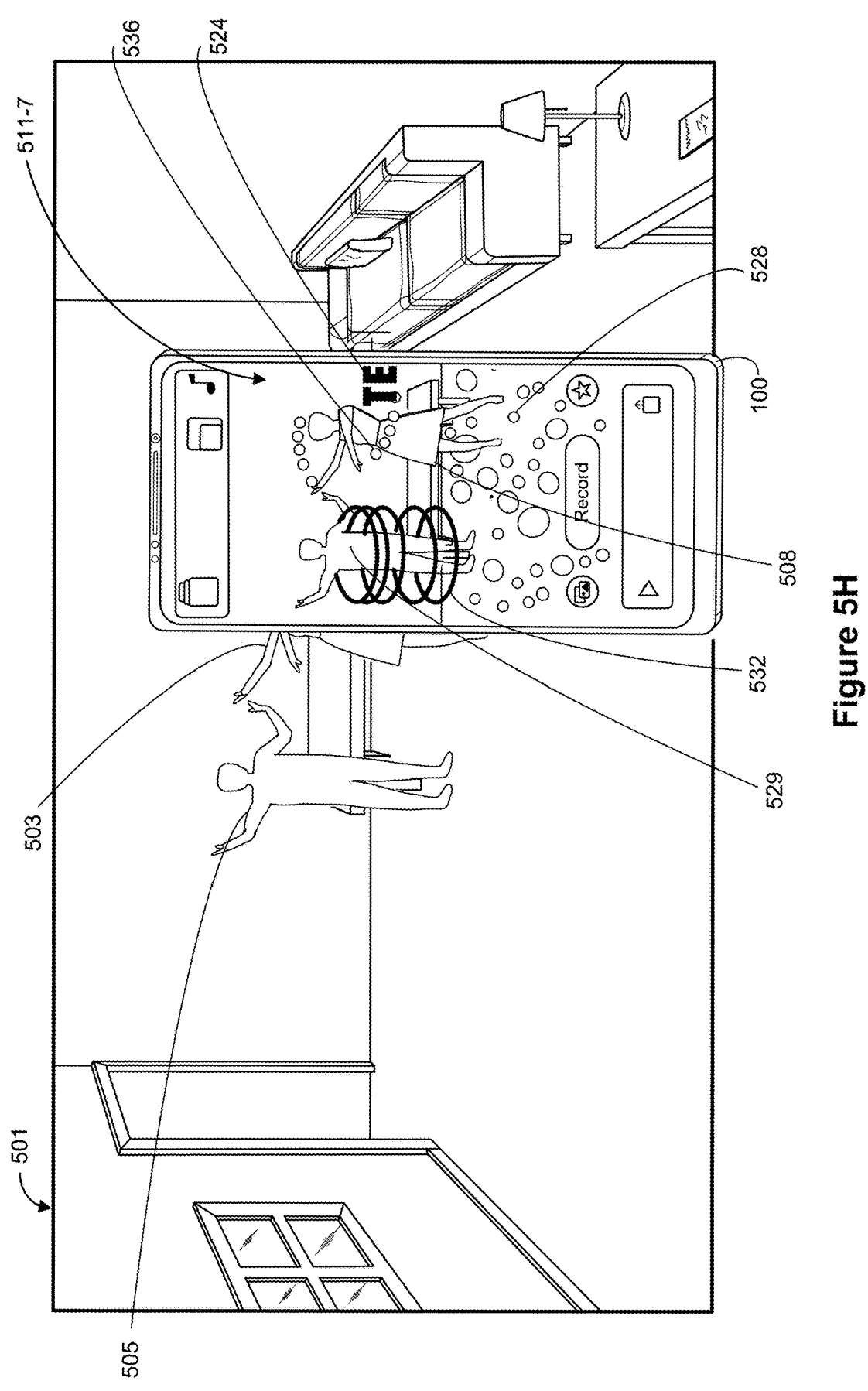
Figure 5I:
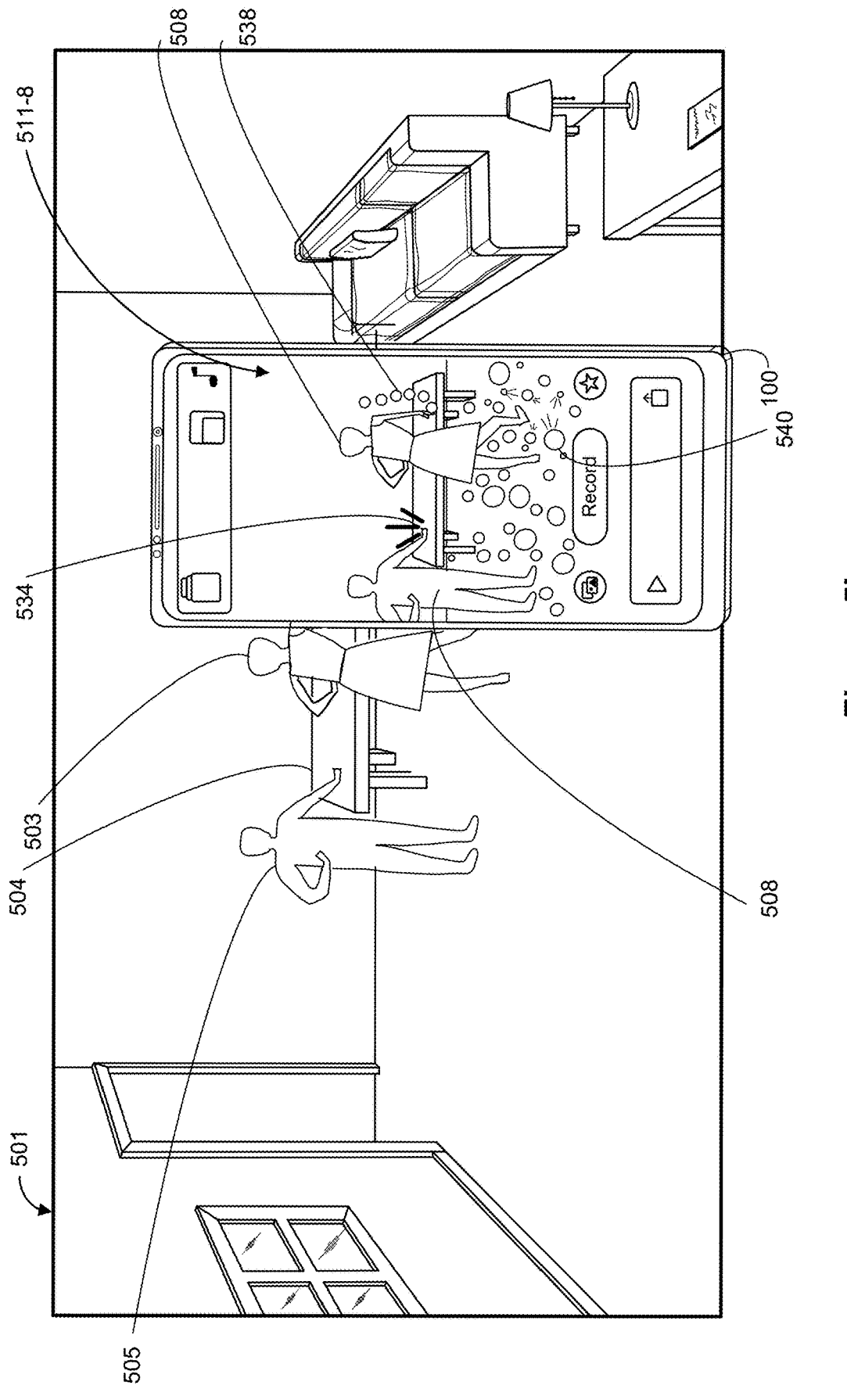
Figure 5J:
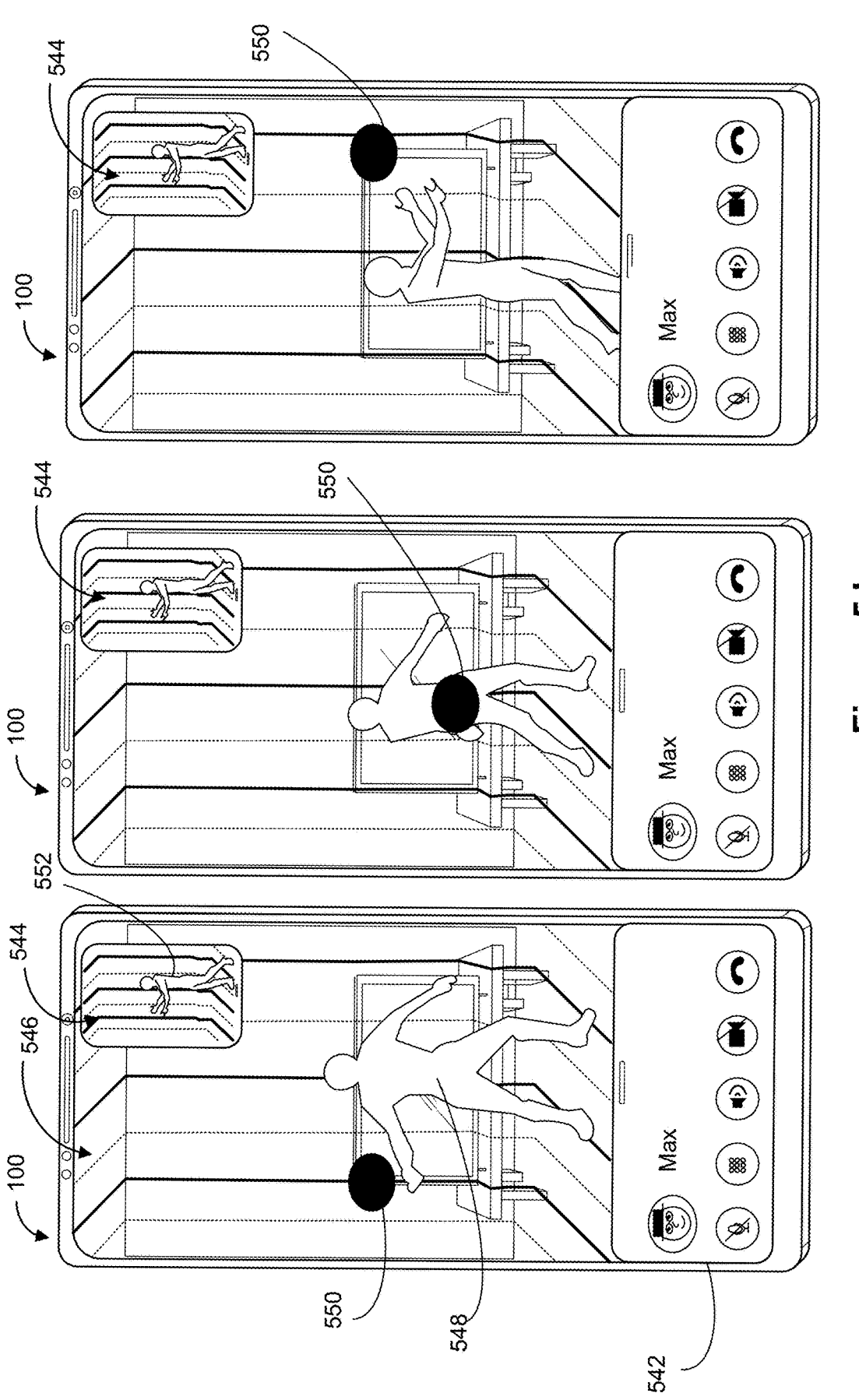
Figure 5K:
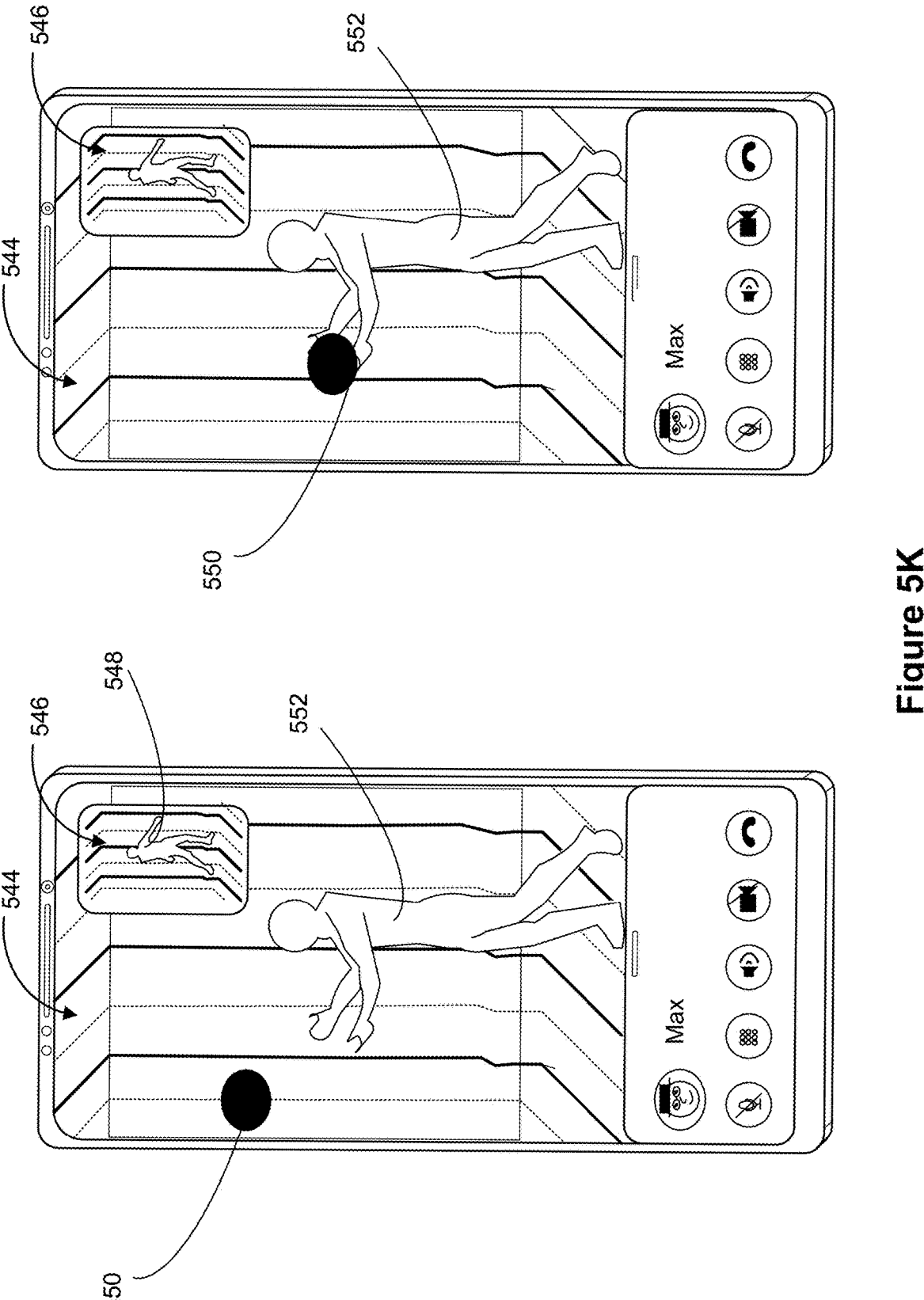

FIGS. 5A-5K illustrate example user interfaces for displaying virtual effects in accordance with some embodiments. FIG. 5A illustrates an example user interface for launching an application (e.g., a home screen user interface, or another user interface that includes an application icon or control (e.g., hyperlink, or another type of user interface object) for launching a user interface that provides augmented reality or augmented virtuality experiences), labeled "Clips" 448, on device 100. For example, the device 100 detects user input 502 (e.g., a tap input, or another type of gesture or input) at a location on the user interface corresponding to the "Clips" application, and in response to detecting user input 502, launches the "Clips" application 448. In some embodiments, the example user interface shown in FIG. 5A is an application launch interface that includes at least a subset of the application icons (e.g., one or more, two or more, several or all of the application icons) discussed above with reference to FIG. 4A.

FIG. 5B illustrates portable multifunction device 100 displaying user interface 511-1 in response to detecting user input 502. For example, user interface 511-1 corresponds to a user interface of the "Clips" application 448. FIG. 5B further illustrates a physical environment 501, which includes physical features (e.g., physical objects, and/or physical surfaces) including a table 504 and a couch 506, the floor and optionally walls, windows, and doors. User interface 511-1 displays a representation of the physical environment that is within a field of view of one or more cameras of device 100 (e.g., optical sensor(s) 164, as illustrated FIG. 1A and FIG. 2), also referred to herein as a camera view that is displayed on the user interface of device 100. For example, in FIG. 5B, the field of view of the one or more cameras of device 100 includes table 504, but does not include couch 506. In FIG. 5B, the field of view of the one or more cameras of device 100 also includes a portion of the floor, and a portion of a wall in the vicinity of table 504. As such, user interface 511-1 includes a representation of the table 504, a representation of a portion of the floor underneath the table 504, and a representation of a portion of the wall behind the table 504, but does not include a representation of the couch 506 or the representations of other objects (e.g., the two people, the other table with a lamp on top) and structures (e.g., the other walls, the door, and the window). As the device 100 moves within the physical environment (e.g., rotates in various directions and around various pivot points or axes, or translate within the physical environment), user interface 511-1 is updated to display a current representation of the physical environment that is within the field of view of the one or more cameras of device 100. The current representation of the physical environment that is within the field of view of the one or more cameras corresponds to a viewpoint of a user that sees the current representation of the physical environment through the display generation component of the device, in accordance with some embodiments. The three-dimensional augmented reality environment or augmented virtuality environment that are generated in accordance with the representation of the physical environment have spatial characteristics (e.g., in terms the spatial relationships between objects, and their relative depths and positions to the viewpoint of the user) that are based on the spatial relationship between the viewpoint and the physical environment, in accordance with some embodiments.

In some embodiments, the representation of the physical environment that is displayed in the user interface 511 (e.g., including 511-1, 511-2, and so on) is a virtual reality (VR) environment (e.g., the representations of physical objects in the physical environment 501 are virtual representations, rather than pass-through representations). In some embodiments, the representation of the physical environment that is displayed in the user interface 511 includes virtual representations for some of the physical objects and surfaces (e.g., virtual overlays on real walls, floors, and furniture), while at least some of the physical objects and surfaces (e.g., motion-tracked subjects, or motion-tracked portions of the subjects) are pass-through representations (e.g., segmented camera view or view through a transparent or semi-transparent portion of the display generation component)). In one example, as described with reference to FIG. 5C, the hand of a first user 503 is tracked and segmented from a camera view of the physical environment and shown in an AR or VR environment. In some embodiments, the representation of the hand that is shown in the camera view is visible in the AR or VR environment and is enabled to interact with one or more virtual objects (e.g., including virtual objects that are not present in the physical environment 501, as well as virtual objects that correspond to representations of physical objects in the physical environment). For example, the first user 503 is enabled to grab, move, throw, toss, or otherwise interact with a virtual object in the AR or VR environment. In some embodiments, as described in more detail with respect to FIGS. 5F-5H and 5J-5K, the first user 503 is enabled to pass (e.g., throw, toss or otherwise handoff) a virtual effect, such as a distribution of virtual objects or another type of virtual effect (e.g., distribution of values for one or more display properties, animated changes of one or more display properties, animated movements of amorphous virtual elements (e.g., virtual mist, virtual fair dust, virtual sparks, virtual fireworks, virtual wind, and other analogous effects)) to another user in the AR or VR environment. In some embodiments, when the first user 503 interacts with a virtual effect that is characterized by an effect or distribution of behavior or changes in appearance (e.g., not limited to direct movement of a virtual object, such as a virtual application window), the virtual effect is dynamically applied to an area that may be adaptable and reactive to the size and shape of the environment for different physical environments (e.g., in a manner analogous to how natural amorphous substances (e.g., air, water, wind, mist, dust, fire, smoke, gossamer of ribbons or fabric, and/or light) would). For example, the virtual effect includes animations that change over time and/or that are applied to different spatial portions of the AR or VR environment. Examples of the behavior or change in appearance of a virtual effect include sparking light, shimmering visual effects, a crack of lightening, rain drops, water, fairy dust, and such, and/or propagation of certain behavior or animated changes in visual properties spatially across the environment, in accordance with some embodiments.

FIG. 5B further illustrates a plurality of user interface elements that are displayed within user interface 511-1. For example, user interface 511-1 includes record button 509, which, when activated, causes device 100 to record an image and/or a video of the AR or VR scene as shown in user interface 511-1, e.g., including objects segmented from the live camera view captured by the one or more cameras of device 100 and virtual augmentations on the live camera view. User interface 511-1 further includes an effects button 512, which, when activated, such as by a tap input or other input, causes the device to display options for modifying the displayed camera view (e.g., by applying virtual effects, such as the virtual stars displayed in FIG. 5C). In some embodiments, user interface 511-1 further includes a media access button 508 for opening media (e.g., photos and/or videos) stored on device 100, such as recently recorded AR and VR images or videos.

In some embodiments, the user interface 511-1 includes music icon 507. In some embodiments, in response to detecting a user input selecting music icon 507, device 100 enables the user to select one or more audio items (e.g., songs, music, or beats) to use in conjunction with the virtual effects displayed in the AR or VR scene. For example, device 100 records (e.g., in response to selection of record button 509) the camera view and one or more virtual effects applied to the camera view, concurrently with playback of the selected audio item. As such, a user is enabled to create a music video that includes both audio of a song and one or more virtual effects that is synchronized with the real-time movement of the physical objects and the changes in the physical environment, as well as the song. In some embodiments, device 100 plays back the audio of the selected audio item while recording the displayed AR or VR scene. For example, in FIGS. 5C-5I, the users are illustrated as dancing, optionally to audio for a selected audio item, and virtual effects are applied to the camera view (e.g., including the dancing users) in real-time during recording. In some embodiments, device 100 adds the audio of selected audio item as an additional sound track or a replacement sound track to the recorded AR or VR scene (e.g., after the user has completed the recording).

FIG. 5C illustrates first user 503 at a position in the physical environment 501 that is within the field of view of the one or more cameras, such that a representation 508 of the first user 503 is displayed in user interface 511-2. In some embodiments, one or more virtual effects are added to the camera view displayed in user interface 511-2. For example, the user of device 100 (e.g., first user 503, second user 505, or another user) is enabled to select the one or more virtual effects to be applied and/or device 100 automatically selects the one or more virtual effects to be applied (e.g., optionally the one or more virtual effects are selected based on the selected audio item).

FIG. 5C illustrates a virtual effect that includes at least two virtual elements. In some embodiments, a first type of virtual elements of the virtual effect is applied using segmentation. Segmentation is an image processing technique that determines a boundary of an object in an image (e.g., a frame or a sequence of frames in a camera view or video stream) based on various image processing methods (e.g., thresholding, edge detection, and other techniques). When a virtual effect is applied based on segmentation, at least a portion of the virtual effect has boundaries that is based on the boundary of the object that is determined based on segmentation of the camera view, in accordance with some embodiments. In particular, the virtual effect may be occluded by the object in the AR or VR scene at locations of the boundary that is determined based on segmentation, in some embodiments. For example, in some embodiments, the virtual effect may be occluded by the object in the AR or VR scene near locations of the boundary of the object that is determined based on segmentation. In some embodiments, the virtual effect may be repelled or reflected near locations of the boundary of the object that is determined based on segmentation. In some embodiments, the virtual effect may originate from locations of the boundary of the object that is determined based on segmentation. In one specific example, a virtual element that is generated based on segmentation includes the background of stars that is displayed on the camera view. For example, the view of the first user 503 is detected and separated from background objects in the physical environment 501, including the walls, floor, ceiling, and/or other stationary objects (e.g., table 504) in the camera view through segmentation of the camera view; and the virtual elements displayed in regions that do not include the view of the user. In some embodiments, if a virtual element is displayed at a location that is partially overlapping with the view of the user (e.g., as viewed from the current viewpoint), the virtual element is segmented and occluded partially by the view of the user. In some embodiments, the background objects in the physical environment are determined by scanning and spatially characterizing the physical environment. In some embodiments, the view of the user 503 is detected and segmented from the background in real-time. For example, the shape (e.g., outline) of the first user 503 is detected and segmented away from any other features in the physical environment. In some embodiments, the virtual effect is applied such that it does not overlap the view of the first user in the AR or VR scene. For example, the virtual stars in FIG. 5C, including virtual star 513, are segmented from the first user 503 such that the virtual stars appear behind the representation of the first user 508 (e.g., without being displayed in front of the representation of the first user 508). In some embodiments, even as the first user 503 moves within the physical environment 501, the virtual stars continue to be segmented from the first user 503, such that the virtual stars continue to appear behind the representation of the first user 508 in the camera view. In some embodiments, the distribution and/or movement of the virtual stars is based on the three-dimensional spatial characteristics of the physical environment. For example, some virtual stars are laid flat at locations that correspond to the floor and/or the table top, while some virtual stars are oriented vertically at locations that correspond to the walls. In some embodiments, the virtual stars move in the AR or VR environment (e.g., in accordance with the changes in volume and rhythm of the music), but are stopped or deflected at locations of physical surfaces (e.g., walls, floors, and/or table top), and/or at the boundary of the view of the user 508 that has been produced via segmentation of the camera view.

In some embodiments, the virtual effect includes a second type of virtual elements. In some embodiments, the second type of virtual elements includes a motion-tracking virtual element, which is applied by the device 100 tracking (e.g., using the one or more cameras) the movement of one or more portions of the motioned-tracked object (e.g., the first user's body, the fingers, hands, arms, feet, hips, and/or facial features of the first user). For example, in FIG. 5C, virtual bubbles 514 are body tracking virtual elements of the virtual effect that follow the movement of the hands (e.g., and/or arms) of the first user 503. For example, as described with reference to FIGS. 5E-5F, as the device 100 detects the hands of the first user 503 moving (e.g., in the physical environment and relative to the body of the first user), the virtual bubbles are displayed as animated to follow the hands of the representation of the first user 508 in the AR or VR scene. In some embodiments, one or more other body tracking virtual elements track the movements of one or more other motion-tracked portions of the first user's body (e.g., the user's head, the user's torso, the user's feet, or another portion of the user's body). In some embodiments, one or more body tracking virtual elements track the movements of the first user's body as a whole (e.g., tracking a center of the user's body, tracking a marked portion of the user's body, tracking a marker held by the user, or tracking a characteristic portion of the user's body (e.g., face, head, another portion of the body)), for example, as the user changes location (e.g., walks or otherwise moves the user's entire body), such that the one or more body tracking virtual elements move with the user in the AR or VR scene. In some embodiments, the motioned tracking virtual elements have different simulated motion characteristics (e.g., simulated inertia, simulated elasticity, simulated viscosity, and/or other simulated physical properties that affect how the virtual elements move, deform, and interact with one another and/or with the environment), as they move in the AR or VR scene in accordance with the tracked motion of the first user in the physical environment.

FIG. 5D illustrates the first user 503 moving, such as dancing, while in the field of view of the one or more cameras. In some embodiments, user interface 511-3 illustrates that the virtual stars (e.g., including virtual star 515) are animated to move within the camera view over time (e.g., virtual stars are added, removed, and/or moved), while continuing to be segmented from the view of the first user 503 based on the current position and pose of the first user 503.

In some embodiments, one or more poses and/or gestures of the first user 503 optionally cause a third virtual element (e.g., of another virtual effect) to be displayed. For example, in response to detecting the hands of the first user 503 crossing behind the first user's head (e.g., based on motion-tracking of the first user's hands relative to the physical environment and/or the rest of the body of the first user, and, optionally, in conjunction with segmentation of the first user's body as a whole), the body tracking virtual bubbles 514 cease to be displayed, and an animation of lines 519 is displayed as shooting out from a region in the AR or VR scene in proximity to where the first user's hands are crossed. In some embodiments, the animation of lines 519 appear to move outward from the representation of the first user 508 (e.g., the animation of lines 519 originate from where the user's hands are crossed and animate as moving away from the first user's body). In some embodiments, the animation of lines 519 appear with different colors and/or lighting effects (e.g., glowing lines and/or a flash of light, or waves propagating away from a source location). In some embodiments, the animation of lines 519 is displayed for a threshold amount of time (e.g., 3 seconds, 5 second, 30 seconds, 1 minute, or another amount of time) before ceasing to be displayed.

In some embodiments, animation of lines 519 (e.g., and/or other virtual effects) are displayed (e.g., come onto the AR or VR scene, or be transform from another existing virtual effect in the AR or VR scene) in response to one or more other poses and/or gestures of the first user 503. For example, detecting that the first user is clapping the first user's hands together, snapping, making contact with a portion of the physical environment (e.g., a wall, the floor, the table, or other object) and/or making contact with another user causes the device 100 to display an additional virtual effect (e.g., the animation of lines 519 or another virtual effect). For example, in response to the device 100 detecting, based on body tracking of the first user 503 relative to the physical features of the physical environment, that the first user 503 stomps on the floor with the user's foot, the device 100 displays a virtual effect, such as virtual confetti and/or virtual sparks, to appear as if the confetti and/or sparks (e.g., or other virtual effect) are flying away from the portion of the floor that made contact with the user's foot stomping. In some embodiments, the motion-tracking virtual effects are implemented with simulated physical properties or movement characteristics that react to and/or change with the movement characteristics (e.g., position, movement direction, speed, acceleration, rhythm, amplitude, and/or spatial relationships and changes thereof between the tracked portions and other physical objects and surfaces in the physical environment) of the tracked portions of the first user's body (e.g., the hands, feet, facial features, hips, fingers, arms, and other portions of the body or markers held by the user). In some embodiments, the motion-tracking virtual effects optionally react (e.g., move and/or change appearance) to spatial interactions between a motion-tracked portion of the first user and another virtual object or surface in the AR or VR scene. In some embodiments, motion-tracking of a first portion of a physical object differs from segmenting a view of the physical object from a camera view without differentiating the first portion of the physical object from the rest of the segmented view of the physical object. In some embodiments, segmentation alone does not provide information about how the first portion of the physical object move relative to the physical environment because the motion of the first portion of the physical object cannot be separately registered and identified by the segmentation results alone. In some embodiments, segmentation of a view of the physical object in a sequence of image frames of a video may indicate movement of the physical object as a whole, but is not sufficient to provide motion-tracking for a sub-portion of the physical object especially when the sub-portion of the physical object moves relative to other parts of the physical object, and/or when the sub-portion of the physical object is located in an interior region within the outline of the physical object as determined based on segmentation alone. In some embodiments, a respective virtual effect applied in the AR or VR scene is based on segmentation and motion-tracking in conjunction with each other. In some embodiments, the virtual effects applied based on segmentation alone and the virtual-effects applied based on motion-tracking alone are concurrently displayed in the AR or VR scene. In some embodiments, a virtual effect applied based on segmentation transforms into another virtual effect applied based on motion-tracking, or vice versa, optionally, in response to detecting occurrence of an event (e.g., a new part of the song starts, a new user joins the scene, a new pose is detected, and/or a timer of the prior effect has expired).

FIG. 5E illustrates user interface 511-4 displaying virtual bubbles 516, which track the movements of the hands of the first user 503. In some embodiments, the virtual bubbles 516 are redisplayed after ceasing display of animation of lines 519 in response to the first user crossing the first user's hands behind the first user's head. In some embodiments, the virtual stars continue to be displayed (e.g., as a segmented virtual element) behind the representation of the first user 508.

In some embodiments, the virtual effect includes virtual text 512 that is displayed in the user interface 511-4. In some embodiments, virtual text 512 is a segmented virtual effect in that it is displayed in a portion of the user interface 511-4 such that virtual text 512 does not overlap with the representation of the first user 508 in the AR or VR scene. In some embodiments, the text 512 is displayed in an area of the current view that is near (e.g., close to, optionally without overlapping) the representation of the first user 508. In some embodiments, text 512 corresponds to lyrics of the selected audio item that is currently playing at device 100. In some embodiments, text 512 is dynamically displayed for one or more portions of the audio item, for example, text for the chorus of a song is displayed while the chorus is playing. In some embodiments, text 512 updates to show different words, such as the current lyrics, over time. In some embodiments, device 100 displays text 512 near the representation of the first user 508, optionally without overlapping the representation of the first user 508. For example, text 512 moves to be displayed as text 522 (FIG. 5F) as the user's hand moves to a wider position, and text 522 continues to shift farther to the right as text 524 (FIG. 5G) as the user's hand moves outward, such that the respective text does not overlap the representation of the user's hand. In some embodiments, text 512 optionally is displayed as animated, for example, text 512 appears to scroll and/or be pushed back within the user interface 511-6. In some embodiments, text 512 is displayed with one or more colors and/or lighting effects (e.g., glowing text, flashing text, or other lighted animations). In some embodiments, text 512 optionally does not move position once it is displayed in the camera view, such that, if the user moves in a way that partially covers or obscures the text, the representation of the first user 508 appears in front of (e.g., or behind) text 512 relative to the current viewpoint that corresponds to the camera view. In some embodiments, the text 512 changes appearance (e.g., changes values for a first set of display properties (e.g., size, spacing, font, brightness, orientation, and other display properties) and/or moves (e.g., bounces, wiggles, rotates, and/or propagates a wave motion)) in accordance with the characteristics of the lyrics and/or the music of the audio item that is being played back.

FIG. 5F illustrates the representation of the first user 508 updating as the first user 503 moves the first user's hands (e.g., and/or arms) farther apart from each other (e.g., away from the first user's head). In some embodiments, virtual bubbles 518 are animated to follow the movement of the first user's arms, for example, by arching over the first user's head before separating into two bubble strands and/or increasing a number of bubbles that follow each of the user's hands, as illustrated in FIG. 5G. In some embodiments, the virtual bubbles 526 (in FIG. 5G) that extend away from the representation of the first user 508 are animated to change in size and/or to move fluidly in accordance with the tracking of the first user's hands. It will be understood that alternative and/or additional virtual elements may be displayed concurrently with, or instead of, the virtual effects described herein. For example, the virtual bubbles 526 are replaced with another virtual object, such as virtual streamers, dots, lightning bolts, or other virtual objects and visual effects.

FIG. 5F further illustrates a rings virtual effect 520 that includes elements of body tracking and segmentation. For example, the back portion of each of the rings is segmented from the representation of the first user 508 such that the rings in the rings virtual effect 520 appear to go around (e.g., behind) the user from the viewpoint that corresponds to the current camera view. In some embodiments, the rings virtual effect 520 also uses body tracking by displaying the rings around the user's body such that, as the user moves within the physical environment, the rings virtual effect 520 is updated (e.g., moves with the user) to continue to be displayed as circling around the user's body. As such, the rings virtual effect 520 uses body tracking of the first user 503 (e.g., the first user's torso or another portion of the first user). In some embodiments, motions of different portions of the first user's torso are separately tracked, and the motion tracking results are used to determine the locations of the different rings relative to the different portions of the first user's torso. For example, some of the rings are "bumped" and bounced away by the motion of one motion-tracked portion of the torso, while other rings are carried by the rhythmic rotation of another motion-tracked portion of the torso, in accordance with some embodiments. In some embodiments, an outline virtual effect is displayed (e.g., instead of or in addition to rings virtual effect 520). For example, the outline virtual effect traces the contours of the detected first user 503, and is optionally displayed with one or more colors and/or lighting effects. In some embodiments, the outline virtual effect is animated as moving inward (e.g., towards the representation of the user 508) and/or moving outward (e.g., with a larger gap between the outline and the representation of the user 508). In some embodiments, the outline virtual effect includes both segmented and body tracking elements, as the outline is updated to trace the first user's shape as the first user moves to change the overall shape of the first user (e.g., raises the user's hands, walks, jumps, dances, or otherwise changes positions relative to the physical environment) and the dynamic outward movement of the outline (e.g., how different portions of the outline propagate away from their initial positions) is generated based on the movement characteristics of various motioned-tracked portions of the first user.

FIG. 5G illustrates a second user 505 entering the field of view of the one or more cameras. In some embodiments, in response to detecting that the second user 505 is within the field of view of the one or more cameras, one or more of the virtual effects are also applied to the representation of the second user 529 (e.g., a view of the second user 529 from a camera view of the physical environment, a passthrough view of the second user 529 through a transparent or semi-transparent portion of the display generation component, or a virtual representation that is generated based on the segmented view of the second user 529). For example, in FIG. 5G, the rings virtual effect 530 is updated to be applied to both the representation of the first user 508 and the representation of the second user 529. In some embodiments, the rings virtual effect 530 is displayed as circling around both of the representations of the users at the same time. In some embodiments, one or more other virtual effects (e.g., the bubbles 526) are optionally not applied to both users. As such, some virtual effects are applied to two or more users concurrently, and other virtual effects are only applied to the representation of the first user 508 without being applied to the representation of the second user 529 in the camera view. In some embodiments, as described in more detail below, one or more virtual effects are optionally passed from being applied to one user to another user. In some embodiments, the two users are physically present in the same physical environment and in the same camera view. In some embodiments, only one of the two users is physically present in the physical environment that is captured in the camera view presented in the AR scene, while the view of the other user is segmented from a different camera view capturing another physical environment including the other user. In some embodiments, the physical environment presented in the camera view is different from the physical environment(s) of the users, and the view of the users are respectively segmented from respective camera views of the users' respective physical environments and graphically incorporated in the AR or VR scene. In some embodiments, the environment is a virtual environment, and the views of the users are segmented from camera views of the users' respective physical environment and incorporated into the virtual environment based on the spatial correlation between the physical environments of the users and the virtual environment (e.g., the floors of the virtual environment and the physical environments are aligned in the same plane). In some embodiments, the motion-tracking and segmentation processing of one or more view(s) of a respective user is performed using the camera view(s) of the physical environment of the respective user, and the results are used to inform and influence how the virtual effect(s) applied to the three-dimensional environment that is presented in the AR or VR scene. In some embodiments, the representation of a respective user presented in the AR or VR scene is a view of the respective user that is segmented from the camera view. In some embodiments, at least one of multiple users is presented as a segmented camera view of the user or is part of a camera view that includes both the user and his/her physical environment, while other portions of the environment or other users can be presented as virtual representations (e.g., optionally virtual representations that are generated based on respective camera views).

In some embodiments, the virtual effects are updated over time, optionally in accordance with one or more features of the currently playing audio item, such as a change in tempo, the recitation of a chorus, a change in singer, an instrumental section, or other features of the currently playing audio item. For example, in FIG. 5G, the virtual stars are no longer displayed in the user interface 511-6, and virtual balls 528 are displayed on the representation of the floor. In some embodiments, the virtual balls 528 displayed on the representation of the floor in a distribution that is segmented based on respective boundaries of the users such that they do not overlap with the representation of the first user and/or the representation of the second user.

FIG. 5H illustrates user interface 511-7, including displaying virtual balls 528 on the representation of the floor in the camera view. In some embodiments, virtual bubbles 536 continue following the movement of the first user's hand (e.g., continue to track the hand of the first user 503). In some embodiments, in response to (e.g., and/or in accordance with a determination that) an event (e.g., optionally performed by the first user 503) occurring, the rings virtual effect 532 is passed from being applied to the representation of the first user 508 to being applied to the representation of the second user 529. In some embodiments, the rings virtual effect 532 is passed to the second user directly from being applied to only the first user (e.g., illustrated in FIG. 5F), optionally without applying the rings virtual effect 532 to both representations of the users, as illustrated in FIG. 5G (e.g., the rings virtual effect 532 is passed directly from the first user to the second user, as shown in FIG. 5F and FIG. 5H). In some embodiments, the rings virtual effect 530 is optionally applied to both representations of the users, as described with reference FIG. 5G. In some embodiments, the rings virtual effect 530 is applied to the representations of both users during a transition animation for passing the rings virtual effect 530 from the representation of the first user 508 to the representation of the second user 529.

For example, in some embodiments, while the rings virtual effect 520 is applied to the representation of the first user 508, an event is detected (e.g., based on analysis of the segmentation and/or motion-tracking of one or more portions of the user's body in light of one or more criteria), such as the first user pointing to the second user, or another event that satisfies a passing criteria (e.g., the first user performing a throwing gesture, the first user holding a predefined pose, the first user exiting the field of view of the one or more cameras, the second user performing a pulling gesture (e.g., as if pulling the virtual effect toward the second user), or another input performed by one or both users). In response to detecting the occurrence of the event, the rings virtual effect 532 is no longer applied to the representation of the first user 508 and is applied to (e.g., passed to) the representation of the second user 529.

In some embodiments, as illustrated in FIG. 5H, rings virtual effect 532 is passed to the representation to the second user 529 while at least one other virtual effect continues to be applied to the representation of the first user 508 (e.g., optionally without being applied to the representation of the second user 529). For example, the virtual bubbles 536 continue to be displayed as following the movements of the hands of the first user 503, while the representation of the second user 529 is displayed without virtual bubbles 536 body tracking the movements of the second user 505.

In some embodiments, representation of the second user 529 is enabled to pass one or more virtual effects to the representation of the first user 508. For example, in response to detecting an event that satisfies passing criteria (optionally the same or different passing criteria than the criteria to pass the rings virtual effect 532 from the representation of the first user 508 to the representation of the second user 529 described above), one or more virtual effects are passed to the representation of the first user 508 (e.g., or another user).

As illustrated in FIGS. 5F-5H, in some embodiments, the first user 503 and the second user 505 are co-located in a same physical environment 501 such that the virtual effects are applied to one and/or both representations of the users that are captured by the one or more cameras of device 100. In some embodiments, the representations of the users are optionally captured by different cameras and are optionally separated (e.g., via various segmentation techniques) from their respective camera views, and merged into the same AR or VR scene. In some embodiments, the representations of the users are optionally captured by different cameras and displayed in their respective camera views but in separate display regions of the user interface (e.g., displayed side by side, displayed one overlaying the other, displayed without a visible gap in between (e.g., blended or merged at their boundary), or displayed with a visible gap in between (e.g., in separate display tiles)), but the virtual effects are applied to both camera views as if they are in different portions of the same three-dimensional environment. It is important to note that the segmentation and motion tracking of the camera view(s) and the application of the virtual effects are performed in real-time, rather than on prerecorded media, so the motion and shape of the subjects in the camera views are determined on the fly, without the availability of a subsequent set of camera views of the subjects that have not been captured or recorded, and without post-recording annotation or assistance of an human or artificial intelligence editor or reviewer.

FIG. 5I illustrates user interface 511-8, including the virtual bubbles 538 displayed as following (e.g., body tracking) one hand of the first user 508, optionally without following the other hand of the first user 508. For example, virtual bubbles 536 are previously displayed as following (e.g., tracking) the movement of both hands of the first user 508, but at least a subset of the virtual bubbles 536 ceases to be displayed in accordance with (e.g., and/or in response to detecting) the first user's current pose (e.g., the first user's hand in on the first user's hip). For example, while the user's hand is overlapping without another portion of the user's body, the virtual bubbles 536 cease to be displayed (e.g., and are optionally redisplayed if the user's hand moves away from overlapping with the user's body (e.g., based on motion-tracking of the user's hand and segmentation of the user's body)).

FIG. 5I further illustrates the second user placing a hand of the second user on the table 504. In some embodiments, a virtual effect 534 is dynamically displayed in response to detecting the second user's hand hitting the table 504 (e.g., and/or any other detected surfaces in the camera view). For example, the device 100 detects one or more surfaces and/or physical objects in the camera view such that, as the users interact with the one or more surfaces and/or physical objects in the physical environment, one or more virtual effects are optionally displayed to highlight the interactions. In some embodiments, the virtual effect 534 is displayed in response to detecting that the motion of the hand of the second user meets speed, direction, and/or rhythm criteria (e.g., based on motion-tracking of the hand), when the hand is detected to be in contact with the surface of the table (e.g., detected based on detecting intersection of the segmentation boundary of the hand or body of the user and the segmentation boundary of the table in the camera view), and the virtual effect 534 is not displayed or ceases to be displayed in response to detecting that the motion of the hand of the second user does not meet or no longer meet the speed, direction and/or rhythm criteria.

In some embodiments, in response to the first user 503 moving the first user's foot, as illustrated in FIG. 5I, the one or more virtual balls that are displayed on the representation of the floor, such as virtual ball 540, are animated as flying away from the representation of the first user 508, as if the user kicked virtual ball 540 out of the way. In some embodiments, virtual balls (e.g., and/or other virtual effects) are displayed as moving out of the way of the user as the user moves within the physical environment. For example, the balls in front of the path of the user move out of the way (e.g., and/or cease to be displayed) as the user walks along the path. As such, the virtual balls virtual effect includes both segmentation elements (e.g., wherein the balls do not overlap or occlude the representation of the user) and body tracking elements (e.g., based on the movements of the user, the path of the user is identified and/or predicted (e.g., based on motion history and trajectory of the motion-tracked feet of the user) so that the virtual balls are displayed as moving out of the way).

FIGS. 5J-5K illustrate a virtual effect that is passed from one user to another user in accordance with some embodiments. In some embodiments, device 100 used by a first user is participating in an ongoing real-time communication session, such as a video conference, or other three-dimensional shared experiences (e.g., gaming, hiking, adventures, group meditation, sports, or fitness training), with another device used by a second user. For example, in some embodiments, control panel 542 displays a plurality of controls for the communication session, including an indication of the communication session (e.g., with a second user, such as "Max"), and one or more controls such as a mute control, a keypad, a speaker, a video-off, and an end call control. In some embodiments, the ongoing real-time communication session includes one or more video tiles (e.g., video tile 546 and/or video tile 544). In some embodiments, one or more of the video tiles display video content received from other devices (e.g., Max's device, illustrated in video tile 546) and/or display video content that is captured by device 100 (e.g., video tile 544 represents video content captured by device 100). In some embodiments, additional video tiles for other devices that are participating in the video conference are concurrently displayed. In some embodiments, all of the video tiles display real-time camera views capturing different participants in their respective physical environments. In some embodiments, some, less than all, of the video tiles optionally display recorded videos or virtual representations of some participants (e.g., due to network delay, privacy, and other considerations), while others display real-time camera views of participants in their respective physical environments. In some embodiments, the video tiles are displayed in various arrangements, such as side-by-side, one overlaying another, or merged into a same virtual background or environment.

In some embodiments, a virtual effect is applied to both representations of the physical environments (e.g., for both users captured via distinct devices). For example, a segmented background virtual effect (e.g., virtual lines applied to the representations of the wall, floor, and ceiling) is applied to the physical environment in which the first user (e.g., corresponding to representation of first user 552) is located, as displayed in video tile 544. In some embodiments, a same background virtual effect (e.g., or a different virtual effect) is applied to the physical environment in which the second user, corresponding to representation of the second user 548, (e.g., displayed in video tile 546) is located. For example, the first user and the second user are not co-located in a physical environment, but are currently in a video conference with each other (e.g., with the second user capturing the camera view shown in video tile 546 with a second device distinct from device 501). In some embodiments, the background virtual effect is applied to the view of a first physical environment for the first user based on the spatial characteristics of the first physical environment, while the background virtual effect is applied to the view of a second physical environment for the second user based on the spatial characteristics of the second physical environment. The background virtual effect is occluded by the view of the first user and the view of the second user in their respective video tiles, based on the segmentation of the views of the first user and the second user from the respective camera views of their respective physical environments, in accordance with some embodiments.

In some embodiments, a virtual effect that tracks the movement of the second user's hand is displayed in the video tile 546. For example, the representation of the second user 548 is displayed as moving in such a way that virtual effect 550 (e.g., a virtual ball, and/or a virtual racket) follows the movement of the second user's hand. In some embodiments, the movement of the second user satisfies passing criteria (e.g., forming a strike pose, or arm swing meeting a set of speed and direction criteria), such that the virtual effect 550 is passed from the representation of the second user 548 to the representation of the first user 552 in the other video tile 544. For example, in some embodiments, the passing criteria require that the second user 548 performs a pose, a gesture (e.g., a throwing, tossing or pointing gesture), and/or a particular sequence of movement (e.g., to generate a trajectory of virtual effect 550) in order for the passing criteria to be met. In some embodiments, in accordance with a determination that the passing criteria are met, virtual effect 550 is displayed as being passed from the representation of the first user 548 in the video tile 546 to the representation of the second user 552 in video tile 544, as illustrated in FIG. 5K. It will be understood that alternative virtual effects, including any of the virtual effects described with reference to FIGS. 5C-5H, could also be applied to the representations of the users during the communication session.

In some embodiments, the video tile 544 is enlarged (e.g., as the main video tile displayed by the display generation component) in accordance with a determination that virtual effect 550 is passed to the representation of first user 552 in the video tile 544. For example, the video tiles are updated to emphasize (e.g., enlarge, highlight, or otherwise visually emphasize) the video tile that currently applies virtual effect 550. For example, if the first user passes the virtual effect 550 back to the second user, optionally the video tiles switch again such that the video tile 546 is displayed as the main video tile and video tile 544 is redisplayed as a smaller video tile. In some embodiments, the video tile 544 and video tile 546 are optionally displayed as a same size (e.g., displayed in a stacked or side-by-side view, or in another arrangement of tiles), and a visual emphasis, such as a highlighted outline of the respective video tile, is applied to the respective video tile to which the virtual effect 550 is applied. In some embodiments, the user interface shown in FIG. 5J is representative of a user interface configuration shown on the device used by the second user 548, while the user interface 544 shown in FIG. 5K is representative of a user interface configuration shown on the device of the first user 552 (except that the name and avatar in the user interface would be switched to that of the second user 548).

FIGS. 6A-6F are flow diagrams illustrating method 600 of applying a virtual effect with body tracking and segmentation elements in accordance with some embodiments. Method 600 is performed at a computer system (e.g., portable multifunction device 100, or device 300) that is in communication with a display generation component, one or more cameras, and optionally one or more input devices. Some operations in method 600 are, optionally, combined and/or the order of some operations is, optionally, changed.

As described below, method 600 determines when a person is detected within a physical environment that is within a field of view of one or more cameras, and, in response to a request to apply a virtual effect to a representation of the physical environment, intelligently displays the virtual effect applied to the detected person within the representation of the physical environment, wherein the virtual effect includes both segmented virtual elements (e.g., that are displayed in accordance with the user being segmented from the physical environment) and body tracking virtual elements (e.g., by automatically detecting movement of particular portions of the person within the physical environment). Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system, while a representation of a field of view of the one or more cameras, including a view of a first physical object that moves in a portion of a first physical environment (e.g., the first physical object is a person, an animal, or an automated or remote controlled object that moves in the first physical environment) (e.g., a physical object that can move as a whole and/or includes moving parts that move relative to other parts of the physical object), is visible (e.g., visible to the first physical object if the first physical object is a person, and/or visible to other users that are not the first physical object) via the display generation component (optionally, among one or more virtual objects and/or virtual visual effects (e.g., virtual lighting effects, animated changes in visual appearances of objects, and/or virtual overlays)), detects (602) occurrence of a first event (e.g., receipt of a user input that corresponds to a request to perform an operation, satisfaction of one or more conditions (e.g., in the computer system, and/or in the real-world), and/or other user-generated or system-generated events). For example, as described with reference to FIGS. 5B-5C, in some embodiments, a user input selecting virtual effects button 512 enables the user to select one or more virtual effects to apply to the camera view. In some embodiments, the representation of the field of view of the one or more cameras is displayed in a user interface of an application, such as an application that supports real-time communication between two or more users located in the same physical environment or in different physical environments, an application that provides a shared experience for users that are located in the same environment or in different physical environments, and/or applications that provide augmented reality experiences for users.

In response to detecting the occurrence of the first event, the computer system applies (604) a first virtual effect (e.g., an animated visual effect (e.g., including virtual lighting, animated changes in appearances of physical and objects, and/or display and movement of virtual objects) that overlays or changes the appearance of the view of the first physical environment and/or the first physical object in the field of view of the one or more cameras that is visible via the display generation component) to the representation of the field of view of the one or more cameras, including applying (606) the first virtual effect with a first set of values for a first characteristic of the first virtual effect, wherein the first set of values for the first characteristic of the first virtual effect (e.g., location of the virtual effect, boundary lines of the virtual effect, animated movement of the virtual effect, which portions of the virtual effect would be blocked by the view of the physical object, and/or other characteristics that are determined by the location and outline of the first physical object resulted from the segmentation of the view of the first physical object from the rest of the first physical environment) are selected in accordance with segmentation of the view of the first physical object from the view of the portion of the first physical environment. For example, as described with reference to FIG. 5C, the virtual stars, including virtual star 513, are a segmented virtual element that are displayed behind the representation of user 508. In some embodiments, one or more virtual elements of the first virtual effect are applied to the background of the first physical object optionally without applying/adding the one or more virtual elements in front of the first physical object, or applying the virtual effect in different manners to the view of the first physical object and the view of the first physical environment surrounding the first physical object. In some embodiments, the first characteristic corresponds to a characteristic of the first virtual effect that has an abrupt change in visual appearance or disappears when crossing into a region occupied by the first physical object as determined based on segmentation of the first physical object from its surrounding physical environment.

Applying the first virtual effect includes applying (608) the first virtual effect with a second set of values for a second characteristic of the first virtual effect, wherein the second set of values for the second characteristic of the first virtual effect (e.g., the speed, movement direction, movement pattern, rhythm, trajectory, spatial extent, and/or other characteristics that are determined by the tracking of the movement of the first physical object or portions thereof (e.g., movement speeds, current positions, movement rhythms, and/or other movement characteristics of one or more tracked portions of the first physical object)) are selected in accordance with tracking of movement of one or more portions of the first physical object (e.g., tracking of one or more portions moving relative to other portions of the first physical object) in the portion of the first physical environment. For example, as described with reference to FIG. 5C, the virtual bubbles 514 track the movements of the hands of the first user 503. Thus, the virtual effect described in FIG. 5C includes both segmented (e.g., virtual stars) and body tracking (e.g., virtual bubbles) elements. In some embodiments, as described with reference to FIG. 5F, rings virtual effect 520 includes both segmented and body tracking elements, whereby a portion of the rings virtual effect 520 is displayed as being occluded behind the representation of the first user 508, as if the rings are placed around the representation of the first user 508, and body tracking, whereby the rings move in position in accordance with the movement of the first user 503. In some embodiments, as a portion of the first physical object (e.g., the user's hands, arms, body, feet, and/or other portions of the user; or one or more marker points on the first physical object) moves in the first physical environment relative to other portions of the first physical object and/or relative to the first physical environment, the virtual elements of the virtual effect "follow" and/or "are repelled" the movement of the portion of the first physical object. In some embodiments, segmentation produces boundaries of the first physical object in the view of the first physical environment, and does not produce data on the movements of particular portions of the first physical object relative other portions and/or relative to the first physical environment. In some embodiments, segmentation data is optionally used as input, among other sensor data, to generate the movement tracking data for one or more portions of the first physical object. In some embodiments, movement tracking for a portion of the first physical object requires the portion of the first physical object to be identified in a sequence of images of the first physical environment including the first physical object, even though the portion of the first physical object would likely have different positions and shapes in different images of the sequence of images, and would likely have different spatial relationships to other portions of the first physical object that have stayed stationary or have moved in different manners. Movement tracking for a particular portion of the first physical object and for multiple portions of the first physical object are different from segmenting the first physical object from the view of the first physical environment without recognizing different portions of the first physical object and their current and previous positions, in accordance with some embodiments.

In some embodiments, the computer system detects (610) first movement of the one or more portions of the first physical object in the portion of the first physical environment from a first position to a second position, wherein applying the first virtual effect with the second set of values for the second characteristic of the first virtual effect includes: in response to detecting the first movement of the one or more portions of the first physical object from the first position to the second position, displaying animated movements of the first virtual effect (e.g., animated movement of one or more virtual objects, animated changes in the appearance of virtual objects, virtual lighting, virtual augmentation of the appearance of physical objects, and/or virtual overlays) in accordance with the first movement of the one or more portions of the first physical object from the first position to the second position (e.g., the speeds, locations, movement directions, acceleration, deceleration, and/or simulated physical dynamic properties (e.g., collision, friction, forces, deformation, and/or other physical properties or laws of motion) of the first virtual effect are selected based on the speed, movement direction, acceleration, deceleration, distance, duration, and other properties of the tracked movement of the one or more portions of the physical object, as well as the spatial relationships and changes thereof between the one or more portions of the first physical object with other portions of the first physical object, the first physical environment, and/or the virtual objects in the field of view). For example, in some embodiments, the first physical object is a person and the movement of the hands, arms, legs, feet, and/or hips of the person is tracked; and the first virtual effect includes virtual lighting, visual appearances of virtual overlays, and virtual objects (e.g., virtual confetti, virtual rain drops, text, virtual sparks, virtual fireworks, and other virtual visual effects), and the movement, distribution, and shapes of the individual or groups of elements of the first virtual effect changes in accordance with the characteristics of the movement of the tracked portions of the person. In some embodiments, the movement of the facial features of the person is tracked, and the first virtual effect is changed in response to the movement of the facial features, which optionally corresponds to different moods and different appearances and/or subject matter of the first virtual effect (e.g., a smile on the person's face causes a cheerful color scheme and virtual elements to be displayed, and movement pattern of the virtual elements is lively and bouncy; and a frown on the person's face causes a somber color scheme and virtual elements to be displayed, and movement patter of the virtual elements is heavy and clunky). In some embodiments, the relative movement of different portions of the first physical object are tracked and evaluated, and if the relative movement meets certain criteria (e.g., different tracked portions are within a threshold distance of each other, are in contact with each other, and/or are moving away from each other), the first virtual effect includes additional virtual elements and/or movement (e.g., virtual sparks flying off, virtual fireball forming, radiating pulses of colors, and other virtual elements, animated changes in appearance, and/or movements) that corresponds to the relative movement of the different portions of the first physical object (e.g., two portions of the tracked portions make contact with each other (e.g., clapping hands, hand tapping on shoulder, and other contacts between parts of the person's body), moving away from each other (e.g., one hand pulling away from another hand, two arms opening up, and/or one foot stepping away from another foot), and/or different portions moving relative to each other in a synchronized matter (e.g., two arms moving in waves, steps according to a dance rhythm, and head bobbing in a same or opposition direction with the movement of the hand, and other movement patterns). In some embodiments, virtual elements and animated changes move toward a tracked portion during the movement of the tracked portion. In some embodiments, virtual elements and animated changes follow or trail a tracked portion during the movement of the tracked portion. In some embodiments, virtual elements and animated changes originate and propagate away from the tracked portion during the movement of the tracked portion. In some embodiments, the virtual elements and animated changes experience a sudden change (e.g., in movement direction, in quantity, in color, in brightness, in shape, in appearances, and/or in other characteristics) in response to the movement of the tracked portion(s) meeting one or more conditions (e.g., conditions related to position, movement speed, movement direction, contact, movement distance, relative distance, and/or relative spatial relationship to other tracked portions, to other portions of the first physical object, to other tracked physical object or portions thereof, to the first physical environment, and/or to other virtual objects). For example, as described with reference to FIGS. 5C and 5E-5F, virtual bubbles 514, 518 and 526 are illustrated as following the movements of the hands of the first user 503. For example, as the first user 503 moves the first user's hands, the virtual bubbles 518 update to virtual bubbles 526 to move by a direction, rate and/or amount based on the direction, rate and/or amount of the movement of the first user's hands. Updating display of a body tracking element of a virtual effect such that the body tracking element follows the movements of the user's body provides improved visual feedback to the user indicating that one or more portions of the person have moved relative to the device.

In some embodiments, the computer system detects (612) second movement of the one or more portions of the first physical object in the portion of the first physical environment from a first pose to a second pose (e.g., a change in expression and/or pose of the first physical object (e.g., based on a change in configuration of how various parts of the first physical object (e.g., tracked portions and, optionally other untracked but segmented portions) are oriented and positioned relative to one another)), wherein applying the first virtual effect with the second set of values for the second characteristic of the first virtual effect includes: in response to detecting the second movement of the one or more portions of the first physical object from the first pose to the second pose, updating display of the first virtual effect (e.g., changing the types and appearance of the virtual objects, displaying animated movement of one or more virtual objects, animated changes in virtual lighting, virtual augmentation of the appearance of physical objects, and/or virtual overlays) in accordance with the second movement of the one or more portions of the first physical object from the first pose to the second pose (e.g., the speeds, locations, movement directions, acceleration, deceleration, and simulated physical dynamic properties (e.g., collision, friction, forces, deformation, and/or other physical properties or laws of motion) of the first virtual effect are selected based on various characteristics of the poses of the one or more portions of the physical object (e.g., the type of poses, the nature of poses, the spatial extent, duration, sequence, and/or other characteristics of the poses)). For example, as described with reference to FIGS. 5C-5D, the body tracking element of the virtual effect (e.g., virtual bubbles 514) is updated in response to detecting the first user 503 in the pose illustrated in FIG. 5D. For example, in response to detecting the pose of the first user 503 (e.g., wherein the first user's hands are crossed behind the first user's head) in FIG. 5D, the virtual bubbles 514 cease to be displayed and a virtual effect (e.g., animation of lines 519) is displayed. Updating display of a body tracking element of a virtual effect such that the body tracking element follows the movements of the user's body, including changing the effect based on one or more detected poses that the user performs, provides improved visual feedback to the user indicating that the person has performed a particular pose that has been detected by the device.

In some embodiments, applying the first virtual effect with the first set of values for the first characteristic of the first virtual effect includes (614): displaying one or more virtual background elements (e.g., displaying virtual wallpaper, virtual ambient light, virtual décor, virtual furniture, and/or virtual sceneries, optionally, with spatial characteristics (e.g., shapes, positions, and/or orientations) that correspond to the spatial characteristics of the first physical environment (e.g., shape, positions, and/or orientations of walls, furniture, floors, doors, and/or windows)) in the view of the portion of the first physical environment, and forgoing display, based on the segmentation of the view of the first physical object from the view of the portion of the first physical environment, of one or more portions of the one or more virtual background elements in the view of the portion of the first physical environment in accordance with a determination that respective positions of the one or more portions of the one or more virtual background elements are behind the first physical object relative to a current viewpoint of the user that corresponds to the view of the portion of the first physical environment. For example, in some embodiments, the one or more virtual background elements are displayed in areas surrounding one or more portions of the first physical object, and do not extend into or visually occlude the view of the first physical environment if the one or more virtual background element exist behind the first physical object from the viewpoint of the user (e.g., the view of the first physical object would occlude one or more portions of the virtual elements and virtual background if the one or more portions of the virtual elements and virtual background have positions behind the first physical object in the three-dimensional environment (e.g., the AR environment including the view of the first physical object and the view of the first physical environment surrounding the first physical object), a virtual environment including a view of the first physical object and a virtual environment that has is based on the first physical environment surrounding the first physical object). In some embodiments, the view of the first physical object is segmented from the view of the first physical environment, such that the boundary of the first virtual effect is determined based on the boundary of the first physical object, and the first virtual effect can optionally be applied to regions in front of the first physical object and in regions on the sides of the first physical object, but portions of the first virtual effect can be visually occluded by the view of the first physical object if the first virtual effect is a three-dimensional effect and the portions of the first virtual effect have positions that are behind the position of the first physical object relative to the viewpoint of the user that corresponds to the view of the first physical environment and/or the view of the first physical object. For example, as described with reference to FIG. 5C, the segmented virtual elements of the virtual effect (e.g., virtual star 513) are displayed in the background of the camera view optionally without being displayed in front of the representation of the first user 508. Automatically detecting a person within the field of view of the one or more cameras, and automatically displaying segmented virtual elements to appear to be at least partially hidden behind the detected person, or otherwise be displayed as surrounding the person (e.g., without occluding the person), provides the user with visual feedback indicating that the person has been detected without requiring the user to provide inputs to manually identify the person or manually remove portions of the virtual effect that cover the person.

In some embodiments, the first virtual effect includes (616) a first set of one or more virtual elements (e.g., colorful lines, virtual balls or other objects, confetti, stars, and/or other virtual elements); and applying the first virtual effect with the second set of values for the second characteristic of the first virtual effect includes displaying animated movements (e.g., movement of virtual objects in positions, and/or shifts in colors and distributions of values of one or more visual properties) of the first set of one or more virtual elements, in the view of the portion of the first physical environment, that follow (e.g., extend from, start from, originate and propagate away from, and/or are otherwise connected to) tracked movement of the one or more portions of the first physical object (e.g., without overlapping the view of the first physical object in the view of the portion of the first physical environment (e.g., based on the segmentation of the view of the first physical object)) (e.g., wherein the second set of values (e.g., movement direction, movement speed, movement distances, shape, and/or other simulated dynamic and static properties of the virtual elements) are based at least in part on the tracked movement of the one or more portions of the first physical object (e.g., based on the speed, movement direction, movement distance, movement duration, spatial relationships and changes thereof relative to other portions of the first physical object and/or the first physical environment)). For example, as described with reference to FIGS. 5E-5H, virtual bubbles 516, 518, 526 and 536 are animated as moving in accordance with the detected movements of the hands of the first user 503. Updating display of a body tracking element of a virtual effect such that the body tracking element changes based on interactions between the user and portions of the physical environment provides the user with an improved sense of depth perception of the virtual effect as applied to the representation of the physical environment.

In some embodiments, displaying the animated movements of the first set of one or more virtual elements that follow the tracked movement of the one or more portions of the first physical object further includes (618): forgoing display, based on the segmentation of the view of the first physical object from the view of the portion of the first physical environment, of one or more portions of the first set of one or more virtual elements in the view of the portion of the first physical environment in accordance with a determination that respective positions of the one or more portions of the first set of one or more virtual elements are behind the first physical object relative to a current viewpoint of the user that corresponds to the view of the portion of the first physical environment (e.g., movement tracking and segmentation are both used to determine how to display and/or occlude the first set of one or more virtual elements in the view of the portion of the first physical environment). For example, as described with reference to FIG. 5C, in some embodiments, virtual bubbles 514 track the movements of the first user 503 without overlapping the first user (e.g., and are thus segmented from the first user). For example, in FIG. 5H, the virtual bubbles 536 are optionally not displayed in front of the representation of the first user 508 and instead are displayed as animating around the representation of the first user 508 (e.g., without overlapping the representation of the first user 508). Automatically updating display of a virtual effect to maintain the position of the virtual effect relative to a position of a person within the physical environment, without overlapping the person, provides continual visual feedback to the user indicating that the virtual effect is still applied and provides the user with an improve sense of depth perception, as the person moves relative to the device in the physical environment without being occluded by a virtual effect.

In some embodiments, the first set of the one or more virtual elements that follow the tracked movement of the one or more portions of the first physical object includes (620) a plurality of virtual elements (e.g., dots of identical or varied sizes, sparks, balls, and a type of virtual objects of other shapes and sizes that have the same or similar appearances and characteristics to one another) that move away (e.g., fly off, are ejected, and/or bounce off) from the one or more portions of the first physical object during the tracked movement of the one or more portions of the first physical object. In some embodiments, the plurality of virtual elements are displayed as animating away from a first portion of the first physical object to a point that is separated by a non-zero distance from the first portion of the first physical object during the movement of the first portion of the first physical object. In some embodiments, the first portion of first physical object moves through a plurality of positions in the first physical environment, and different elements of the plurality of virtual elements start to move away from respective positions of the plurality of positions, during the movement of the first portion of the first physical object (e.g., as if the different virtual elements are ejected from the first portion of the first physical object one by one as the first portion of the first physical object moves through the plurality of positions with different movement speed, direction, and/or accelerations). In some embodiments, the movement trajectories of the different virtual elements are based on the respective speeds and directions of movement of the first portion of the first physical environment when the different virtual elements are ejected from the first portion of the first physical object (or from positions proximate and not touching the first portion of the first physical object). For example, as described with reference to FIG. 5C, virtual bubbles 504 are virtual elements that are animated as flying away from the first user's hands in the representation of the first user 508. In some embodiments, as described with reference to FIG. 5I, virtual ball 540 is displayed as being kicked away (e.g., ejected, bounced off, or otherwise moved away) from the first user's foot in the representation of the first user 508. Displaying a virtual effect, such as virtual dots, bubbles, balls, or other virtual objects, as animating away from (e.g., flying outward from) a portion of the user's body that has been detected in the physical environment provides the user with continual visual feedback of how movement of the portion of the user within the physical environment changes the displayed virtual effect.

In some embodiments, the first set of the one or more virtual elements that follow the tracked movement of the one or more portions of the first physical object includes (622) a set of one or more virtual outlines (e.g., highlighted outlines, radiating illuminations, or other virtual objects that surrounds and encompass the first physical object or one or more motion tracked portions of the first physical object) having respective shapes that correspond to a shape of the one or more portions of the first physical object. In some embodiments, the virtual outline(s) expand and contract (e.g., away from and closer to) a border (e.g., edges) of the first physical object or the one or more portions of the first physical object that are tracked. In some embodiments, a plurality of stacked virtual outlines are displayed as encompassing the first physical object or the tracked portions of the first physical object. In some embodiments, the stacked virtual outlines are displayed with one or more colors that optionally change over time. In some embodiments, once a virtual outline moves away from the immediate vicinity of the first physical object or the tracked portion(s) of the first physical object from which the virtual outline is originated, the shape of the virtual outline optionally changes gradually and is optionally influenced by another object (e.g., virtual and/or physical) present in the view of the first physical environment. For example, as described with reference to FIG. 5C, in some embodiments, the body tracked virtual element includes an outline that conforms to a shape of the first user. In some embodiments, the outline expands outward and/or inward away from and/or towards the user's body. In some embodiments, as illustrated in FIG. 5F, a rings virtual effect 520 is displayed as encircling the representation of the first user 508. In some embodiments, a radius of the rings in rings virtual effect 520 optionally increases and/or decreases to move away from and/or closer to the representation of the user 508 over time, to produce a moving animation. Displaying a virtual effect, such an outline that encompasses the representation of the user's body, provides the user with improved visual feedback.

In some embodiments, the computer system detects (624) third movement of at least a first portion of the first physical object relative to the first physical environment (e.g., based on motion tracking of the first portion of the first physical object, or based on segmentation of the view of the first physical object as a whole from the view of the first physical environment in a sequence of views of the first physical environment); and in response to detecting the third movement of at least the first portion of the first physical object, in accordance with a determination that the third movement satisfies motion criteria (e.g., the motion criteria include criteria that are met when the first physical object performs a particular gesture, movement, pose, or other interaction), updates the first set of values for the first characteristic of the first virtual effect to an updated first set of values for the first characteristic, wherein the updated first set of values for the first characteristic are selected at least in part in accordance with the third movement of at least the first portion of the first physical object that satisfies the motion criteria. For example in some embodiments, the values of the first characteristic changes in response to detecting the particular gesture, movement, pose, or other interaction performed by the first physical environment. For example, in some embodiments, virtual background elements that are occluded by the first physical object are updated to display animated colors and/or shapes at a location where the first physical object satisfies the motion criteria (e.g., when the user's foot stomps on the floor, the virtual background is segmented behind the view of the user's foot where the foot causes an impact on the floor and animated changes is applied to portions of the virtual background around the user' foot)). In some embodiments, displaying the virtual background includes displaying virtual wallpaper, virtual ambient light, virtual décor, virtual furniture, and/or virtual sceneries, optionally, with spatial characteristics (e.g., shapes, positions, and/or orientations) that correspond to the spatial characteristics of the first physical environment (e.g., shape, positions, and/or orientations of walls, furniture, floors, doors, and/or windows), and visual changes are applied, in response to detected motion of the first portion of the first physical environment that meets the motion criteria, to the virtual background proximate to the region of the first portion of the first physical object that is separated (e.g., distinguished based on segmentation) from the view of the first physical environment based on segmentation. For example, as described with reference to FIGS. 5G-5H, virtual balls 528 are segmented from the first user 503 and the second user 505, and are thus not displayed as overlapping with the user. In some embodiments, as the first user 503 and/or the second user 505 move in the physical environment, virtual balls 528 are updated to move out of the way of the representation of the user (e.g., so as to not overlap the representation of the user at the user's new position). Automatically detecting a person within the field of view of the one or more cameras, and automatically hiding one or more virtual elements that would, in a physical environment, appear to be hidden behind the detected person, provides the user with visual feedback indicating that the person has been detected without requiring the user to provide inputs to manually identify the person or manually remove portions of the virtual effect that cover the person.

In some embodiments, detecting the third movement of at least the first portion of the first physical object that satisfies the motion criteria includes (626) detecting a first gesture of the first physical object formed by the third movement of at least the first portion of the first physical object (e.g., hands clapping together, hand/arm performing a throwing motion to throw a virtual object, waving a hand, opening arms to embrace something or bending the arms or fingers to form a heart shape or a peace sign, or another gesture). For example, as described with reference to FIG. 5I, in response to detecting the first user 503 performing a gesture (e.g., a kicking motion gesture), virtual ball 540 (e.g., a segmented virtual element) is displayed as moving away from the foot and/or leg of the representation of the first user 538, thus updating in accordance with the movement of the first user 503. Automatically updating one or more virtual elements in accordance with a detected gesture performed by a detected person, provides the user with visual feedback indicating that the gesture has been detected without requiring the user to provide additional inputs to update virtual effect, thereby reducing a number of inputs required to update the virtual effect.

In some embodiments, detecting the third movement of at least the first portion of the first physical object that satisfies the motion criteria includes (628) detecting that the third movement of at least the first portion of the first physical object causes the at least the first portion of the first physical object to come into contact or break contact with one or more physical surfaces in the first physical environment (e.g., the first portion of the first physical object includes a foot of a user stomping on the floor, hopping up and down, kicking on a punching bag, or making or breaking contact with other physical surfaces; or the first portion of the first physical is a hand tapping on another person's shoulder, high-fiving another person's hand, swiping across a table surface, and/or otherwise touching and exerting force on or reacting to impact with a physical surface). For example, as described with reference to FIG. 5I, in response to detecting the second user 505 making contact with the surface of table 504, a virtual effect 534 is displayed at a position near the impact between the representation of the second user 508 and the surface of the table. Automatically detecting surfaces of the physical environment such that the device is enabled to update one or more virtual elements in accordance with interactions between a detected person and a detected surface, provides the user with visual feedback indicating that the impact between the person and surface has been detected and reduces the number of inputs required to update the virtual effect.

In some embodiments, applying the first virtual effect with the first set of values for the first characteristic of the first virtual effect includes (630) displaying a second set of one or more virtual elements (e.g., that are segmented from the view of the first physical object from the view of the portion of the first physical environment) in the view of the portion of the first physical environment, wherein the first set of values for the first characteristic of the first virtual effect defines respective first positions at which the second set of one or more virtual elements are displayed within the view of the portion of the first physical environment in accordance with respective current positions of the one or more portions of the first physical object, and defines which portions of the second set of one or more virtual elements are occluded (e.g., not displayed, or blocked) by the one or more portions of the first physical object in the view of the portion of the first physical environment (e.g., the virtual objects are positioned relative to the first physical object (e.g., virtual balls are positioned to be near the subject's feet, and virtual puddles of water are displayed overlaying a view of the floor, where movement of the virtual balls and/or water is influenced by the movement of the subject's feet, but the virtual balls and water is not displayed at positions where they would be visually occluded by the view of the subject's feet (without overlapping, being segmented from the subject's feet)). In some embodiments, the computer system detects fourth movement of at least a portion of the one or more portions of the first physical object in the portion of the first physical environment (e.g., detecting movement of the subject's feet across the floor based on motion tracking of the subject's feet, detecting movement of the subject's hand across a table top based on motion tracking of the subject's hand); and in response to detecting the fourth movement of the at least a portion of the first physical object in the portion of the first physical environment, updates the first set of values for the first characteristic of the first virtual effect to define respective second positions at which the second set of one or more virtual elements are displayed within the view of the portion of the first physical environment in accordance with the respective current positions of the one or more portions of the first physical object, and updates which portions of the second set of one or more virtual elements are occluded (e.g., not displayed, or blocked) by the one or more portions of the first physical object in the view of the portion of the first physical environment. For example, in some embodiments, the virtual objects follow the movement of the first physical object (e.g., virtual balls are kicked around by the subject's feet, and virtual puddles of water are disturbed by the movement of the subject's feet, some the virtual balls and portions of the puddle are not displayed at positions where they would be visually occluded by the view of the subject's feet (e.g., without overlapping, being segmented from the subject's feet) as the feet have reached those positions, while other balls and portions of the water that were previously occluded may become visible and optionally displayed with some animated movements if the feet have left the positions at which the balls and water were supposed to be displayed. In some embodiments, the one or more portions of the first physical object includes a hand whose motion is tracked, and as the hand moves across a table top in the first physical environment, virtual flower petals displayed at or near the current position of the hand are shown as being pushed and moving with the hand on the table top, and some of the virtual flower petals are shown as flying off to the side by the virtual movement of the air surrounding the moving hand (e.g., based on the motion tracking of the hand), and at the same time, some virtual flower petals may be present or may move to positions that are behind the hand and are partially or completely occluded by the view of the moving hand. In some embodiments, the computer system determines which virtual flower petals are full occluded and partially occluded by the view of the hand based on segmentation of the hand at the current position of the hand in the view of the portion of the first physical environment, and forgoes displaying portions of the virtual flower petals with outlines that depend on the result of the segmentation. For example, as described with reference to FIGS. 5G-5I, the virtual balls displayed on the representation of the floor follow the representation of the first user 508 (e.g., are segmented and displayed as filling in behind the representation of the first user 508) as the first user 503 walks around (e.g., and changes position within the camera view). For example, in FIG. 5H, after the first user 503 has changed the position of the first user's feet, one or more virtual balls are displayed as being partially occluded by the representation of the first user 508, even if one or more of the virtual balls were previously displayed (e.g., before the detected user movement). Automatically detecting a person within the field of view of the one or more cameras, and automatically hiding one or more virtual elements that would, in a physical environment, appear to be hidden behind the detected person, and updating the one or more virtual elements as the detected person moves such that the one or more virtual elements continue to not obscure the detected person, provides the user with visual feedback indicating that the person, and the person's movements, have been detected without requiring the user to provide inputs to manually identify the person or manually remove portions of the virtual effect that cover the person.

In some embodiments, applying the first virtual effect with the first set of values for the first characteristic of the first virtual effect includes (632) displaying one or more textual elements (e.g., characters, strings, lyrics for currently played songs, closed captions for currently played media content, speech to text of speech input received from a user, or other textual elements that can be entered via a keyboard, including symbols, numbers, signs, emoji, and/or glyphs, optionally, with various styles (e.g., capitalization, fonts, highlighting, animations, colors, background, and/or effects)) (e.g., that are segmented from the view of the first physical object from the view of the portion of the first physical environment) in the view of the portion of the first physical environment, wherein the first set of values for the first characteristic of the first virtual effect defines a respective position at which the textual element is displayed within the view of the portion of the first physical environment in accordance with segmentation of the view of the first physical object from the view of the portion of the first physical environment (e.g., optionally, the textual elements are displayed proximate to respective current positions of the one or more portions of the first physical object, and optionally, the first set of values defines which portions of the second set of one or more text are occluded (e.g., not displayed, or blocked) by the first physical object in the view of the portion of the first physical environment). For example, as described with reference to FIG. 5E, text 512 is displayed optionally at a position that is near the representation of the first user 508 (e.g., optionally without overlapping the representation of the first user 508). Displaying virtual objects, including virtual text, at a position relative to (e.g., near) a person that is automatically detected while in the field of view of the one or more cameras provides the user with continual visual feedback without requiring the user to provide inputs to manually select the placement of the virtual text to be displayed near the detected person's body.

In some embodiments, the respective position at which the textual element is displayed within the view of the portion of the first physical environment is selected (634) in accordance with a requirement that the textual element displayed at the respective position would not intersect with the view of the first physical object in the view of the portion of the first physical environment (e.g., based on the segmentation of the view of the first physical environment from the view of the portion of the first physical environment, and outside of segmented outline of the first physical object (e.g., not overlapping with, does not intersect with) the view of the first physical subject). For example, as described with reference to FIG. 5E, text 512 is displayed optionally at a position that does not overlap with the representation of the first user 508. Automatically detecting a person within the field of view of the one or more cameras, and automatically displaying virtual elements, such as virtual text, to appear at positions that do not intersect with the detected person, provides the user with visual feedback without requiring the user to provide inputs to manually identify the person or manually remove, or request to move, portions of the virtual text that cover the person.

In some embodiments, the representation of the field of view of the one or more cameras includes (636) a second physical object, distinct from the first physical object, that moves in the portion of the first physical environment. In some embodiments, the computer system applies the first virtual effect with a third set of values for a third characteristic of the first virtual effect (e.g., while applying the first virtual effect with the first set of values for the first characteristic of the first virtual effect and the second set of values for the second characteristic of the first virtual effect), wherein the third set of values for the third characteristic of the first virtual effect (e.g., location of the virtual effect, boundary lines of the virtual effect, animated movement of the virtual effect, which portions of the virtual effect would be blocked by the view of the physical object, and/or other characteristics that are determined by the location and outline of the second physical object resulted from the segmentation of the view of the second physical object from the rest of the first physical environment) are selected in accordance with segmentation of the view of the second physical object from the view of the portion of the first physical environment. In some embodiments, one or more virtual elements of the first virtual effect are applied to the background of the second physical object (optionally, as well as the background of the first physical object) optionally without applying/adding the one or more virtual elements in front of the second physical object, or applying the virtual effect in different manners to the view of the second physical object and the view of the first physical environment surrounding the second physical object (e.g., in FIG. 5F, the rings virtual effect 520 is applied to the representation of the first user 508 without being applied to the representation of the second user even 529 if the second user is within the field of view of the one or more cameras). In some embodiments, the third characteristic corresponds to a characteristic of the first virtual effect that has an abrupt change in visual appearance or disappears when crossing into a region occupied by the second physical object as determined based on segmentation of the second physical object from its surrounding physical environment. In some embodiments, the first visual effect is the same effect when applied to the first physical object and the second physical object, but are different in various aspects in accordance with the different segmentation results from segmenting the view of the first physical object and the view of the second physical object from the view of the first physical environment. For example, as described with reference to FIG. 5G, the rings virtual effect 530 is concurrently applied to the representation of the first user 508 and the representation of the second user 529. Further, the virtual balls 528 are segmented from both representations of the users at the same time (e.g., as to not overlap the representation of either user). In some embodiments, the computer system applies the first virtual effect with a fourth set of values for a fourth characteristic of the first virtual effect, wherein the fourth set of values for the fourth characteristic of the first virtual effect (e.g., the speed, movement direction, movement pattern, rhythm, trajectory, spatial extent, and/or other characteristics that are determined by the tracking of the movement of the second physical object or portions thereof (e.g., movement speeds, current positions, movement rhythms, and/or other movement characteristics of one or more tracked portions of the second physical object)) are selected in accordance with tracking of movement of one or more portions of the second physical object (e.g., tracking of one or more portions moving relative to other portions of the second physical object) in the portion of the first physical environment. In some embodiments, as a portion of the second physical object (e.g., a second user's hands, arms, body, feet, and/or other portions of the second user; or one or more marker points on the second physical object) moves in the first physical environment relative to other portions of the second physical object and/or relative to the first physical environment, the virtual elements of the virtual effect "follow" and/or "are repelled" the movement of the portion of the second physical object. In some embodiments, segmentation produces boundaries of the second physical object in the view of the first physical environment, and does not produce data on the movements of particular portions of the second physical object relative other portions and/or relative to the second physical environment. In some embodiments, segmentation data is optionally used as input, among other sensor data, to generate the movement tracking data for one or more portions of the second physical object. In some embodiments, movement tracking for a portion of the second physical object requires the portion of the second physical object to be identified in a sequence of images of the first physical environment including the second physical object, even though the portion of the second physical object would likely have different positions and shapes in different images of the sequence of images, and would likely have different spatial relationships to other portions of the second physical object that have stayed stationary or have moved in different manners. Movement tracking for a particular portion of the second physical object and for multiple portions of the second physical object are different from segmenting the second physical object from the view of the first physical environment without recognizing different portions of the second physical object and their current and previous positions, in accordance with some embodiments. In some embodiments, the first visual effect is the same effect when applied to the first physical object and the second physical object, but are different in various aspects in accordance with the different motion tracking results from tracking the motions of respective one or more portions of the first physical object and the second physical object in the first physical environment. In some embodiments, the spatial relationship between the first physical object and the second physical object is determined from segmenting the view of the first physical object and the view of the second physical object from the view of the portion of the first physical environment (e.g., in one or more representations of the field of view of the cameras, optionally, while the views of the first physical object and the second physical object change during movement of the first physical object and the second physical object in the first physical environment), and used to determine the values of various characteristics of the first virtual effect (e.g., how the virtual effect is displayed, occluded, moved, and/or animated between the first physical object and the second physical object, and around the first physical object and the second physical object). In some embodiments, the interactions and coordination between the movement and positions of the first physical object and the second physical object are determined based on segmentation of the view of the first physical object and the view of the second physical object from the views of the first physical environment at different moments in time, and/or based on motion tracking of respective portions of the first physical object and the second physical object, and used to determine the values of various characteristics of the first virtual effect (e.g., how the virtual effect is displayed, occluded, moved, and/or animated between the first physical object and the second physical object, and around the first physical object and the second physical object). In some embodiments, the spatial relationships of the first physical object and the second physical object relative to other physical objects in the physical environment (e.g., walls, floor, window, table top, obstacles, and other stationary or moving physical objects and surfaces) are also used to determine the values of various characteristics of the first virtual effect over time. Other details of how the first virtual effect is applied are analogous to those described with respect to the first physical object, and are not repeated herein in the interest of brevity. Displaying a virtual effect that interacts with multiple users at the same time, including automatically detecting the presence of two or more users, provides continuous visual feedback to the users and reduces a number of inputs needed to apply virtual effects to different users as the number of users in the physical environment changes over time.

In some embodiments, applying the first virtual effect includes (638) displaying a first virtual object at a respective position, relative to the view of the first physical environment, that corresponds to a first portion of the first physical object (e.g., the respective position is determined based on segmenting the view of the first physical object from the view of the portion of the first physical environment, and optionally, determining a position of the first portion of the first physical object based on an orientation of the first physical object (e.g., the respective position is at the bottom of the segmented view of the first physical object, the respective position is on an outline of the segmented view of the first physical object, or the respective position is at another position relative to the segmented view of the first physical object), and/or based on an identification of the first portion of the first physical object using other means (e.g., markers, and/or registration based on motion tracking)), wherein at least a portion of an outline of a visible portion of the first virtual object is based on an outline of the view of the first physical object that is determined based on segmenting the view of the first physical object from the view of the portion of the first physical environment (e.g., at least a portion of the first virtual object is segmented from the view of the first physical object such that they appear to lie underneath or behind the first portion of the first physical object, such as under the subject's feet, or behind the subject relative to the current viewpoint of the one or more cameras). For example, as illustrated in FIG. 5C, virtual star 513 is displayed under the representation of the user's foot in the representation of the first user 508. Automatically detecting a person within the field of view of the one or more cameras, and automatically displaying segmented virtual elements to appear to be at least partially hidden behind the detected person, such as under the person's foot, provides the user with visual feedback indicating that the person has been detected without requiring the user to provide inputs to manually identify the person or manually remove portions of the virtual effect that cover the person.

In some embodiments, applying the first virtual effect includes (640) displaying a second virtual object at a respective position, relative to the view of the first physical environment, that is separated from the view of the first physical object (e.g., proximate to a first tracked portion of the first physical object) (e.g., the respective position is determined based on segmenting the view of the first physical object from the view of the portion of the first physical environment, and optionally, determining a position of the first portion of the first physical object based on an orientation of the first physical object (e.g., the respective position is at the bottom of the segmented view of the first physical object, the respective position is on an outline of the segmented view of the first physical object, or the respective position is at another position relative to the segmented view of the first physical object), and/or based on an identification of the first portion of the first physical object using other means (e.g., markers, and/or registration based on motion tracking)). In some embodiments, the computer system detects fifth movement of at least one of the one or more portions of the first physical object in the portion of the first physical environment (e.g., movement in a first direction and/or in accordance with a first movement pattern), wherein applying the first virtual effect with the second set of values for the second characteristic of the first virtual effect includes, in response to detecting the fifth movement of the at least one of the one or more portions of the first physical object, animating the second virtual object to move the second virtual object away from the at least one portion of the one or more portions of the first physical object in accordance with motion tracking of the at least one portion of the one or more portions of the first physical object. In some embodiments, the system predicts the movement of the first physical object and animates the one or more virtual objects to move out of the way of the predicted position of the first physical object. In some embodiments, the system determines that the at least one portion of the one or more portions of first physical object has reached or is within a threshold distance of a position in the physical environment that corresponds a position at which the second virtual object is displayed, and the computer system moves the second virtual object in a direction that corresponds to a direction of movement of the at least one portion of the one or more portions of the first physical object (e.g., showing a virtual ball being kicked away by the subject's foot as the foot moves close to the position in the physical environment that corresponds to the position of the virtual ball; or showing virtual birds scattering in different directions when the subject has reached or is walking toward a position in the physical environment that corresponds to a resting position of a flock of virtual birds). For example, as described with reference to FIG. 5I, virtual ball 540 is animated as moving away from the first user's foot (e.g., that is kicking the virtual balls out of the way). Automatically updating display of a virtual effect to move virtual elements out of the user's path by detecting a position and movement of a person, in real-time, without overlapping the person, provides continual visual feedback to the user indicating that the virtual effect is still applied and provides the user with an improved sense of depth perception, as the person moves in the physical environment.

In some embodiments, the computer system detects (642) sixth movement of the one or more portions of the first physical object in the portion of the first physical environment; and in response to detecting the sixth movement of the one or more portions of the first physical object: in accordance with a determination that the sixth movement is a first type of movement (e.g., arms tilting to the left and right, arms or fingers making a heart shape, hands clapping together, or other types of movement, gesture, and/or pose), applies a second virtual effect (e.g., displays, animates, segments, moves, and/or changes the appearance of one or more of first virtual backgrounds, first virtual objects, first virtual overlays, first virtual lighting, first textual elements, and other virtual effects, in a second set of manners) to the representation of the field of view of the one or more cameras (e.g., same as the first virtual effect, analogous to the first virtual effect, or different from the first virtual effect), the second virtual effect selected based at least in part on the first type of movement (e.g., based on segmentation and/or motion tracking in a matter similar to those described with respect to the first virtual effect); and in accordance with a determination that the sixth movement is a second type of movement (e.g., feet stomping on the floor, movement that mimic movement of a respective type of animal, twirling on the floor, jumping up and down, or another type of movement, gesture, and/or pose), different from the first type of movement, applies a third virtual effect (e.g., displays, animates, segments, moves, and/or changes the appearance of one or more of second virtual backgrounds, second virtual objects, second virtual overlays, second virtual lighting, second textual elements, and other virtual effects, in a second set of manners), different from the second virtual effect, to the representation of the field of view of the one or more cameras, the third virtual effect selected based at least in part on the second type of movement (e.g., based on segmentation and/or motion tracking in a matter similar to those described with respect to the first virtual effect). In some embodiments, different types of movement of the first physical object causes the system to display different virtual effects in response to the movement. For example, as illustrated in FIG. 5D, in response to detecting the first user 503 crossing the user's hands behind the user's head (e.g., or another movement of the first user, such as the first user clapping, snapping, or tilting the user's arms to sway), a different virtual effect (e.g., animation of lines 519) is displayed that the virtual bubbles that were previously following the movements of the first user's hands. In some embodiments, a different detected type of movement causes a different virtual effect (e.g., in FIG. 5D, in response to detecting the first user stomping on the floor, another virtual effect is displayed proximate to the impact of the user's foot on the floor). Automatically displaying one or more virtual elements in response to and/or based on a detected type of movement, such as the user's hands moving together, performed by a detected person, provides the user with visual feedback indicating that the respective movement has been detected and automatically changes a displayed virtual effect, thereby reducing a number of inputs required to update the virtual effect.

In some embodiments, while applying the first virtual effect to the representation of the field of view of the one or more cameras, the computer system detects (644) the occurrence of a second event (e.g., start of a new portion of a song, such as the chorus, expiration of a threshold amount of time since the start of the first virtual effect, detecting of a user input that corresponds to a request to switch the virtual effect, detecting a different physical object in the portion of the first physical environment, detecting movement of a different physical object in the portion of the first physical environment, and other types of events); in response to detecting the occurrence of the second event: ceases to apply the first virtual effect to the representation of the field of view of the one or more cameras; and applies a fourth virtual effect, distinct from the first virtual effect to the representation of the field of view of the one or more cameras (e.g., the third virtual effect replaces the first virtual effect). In some embodiments, the third virtual effect is based on segmentation as well as motion tracking of one or more portions of the first physical object (optionally different from the portions that were segmented and/or tracked when supporting the application of the first virtual effect)). For example, as described with reference to FIGS. 5F-5G, one or more of the virtual effects updates over time (e.g., with different portions of the song as playback continues), for example replacing virtual stars as the background virtual effect with virtual balls that are displayed on the representation of the floor. Automatically switching from one virtual effect to another virtual effect over time provides the user with visual feedback without requiring additional user input.

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6F. For example, the virtual effects described above with reference to method 600 optionally have one or more of the characteristics of the virtual effects described herein with reference to other methods described herein (e.g., method 700). For brevity, these details are not repeated here.

FIGS. 7A-7E are flow diagrams illustrating method 700 of applying a virtual effect to two physical objects in different portions of a physical environment in accordance with some embodiments. Method 700 is performed at a computer system (e.g., portable multifunction device 100, or device 300) that is in communication with a display generation component, one or more cameras, and optionally one or more input devices, optionally one or more pose sensors, optionally one or more sensors to detect intensities of contacts with the touch-sensitive surface, and optionally one or more tactile output generators. Some operations in method 700 are, optionally, combined and/or the order of some operations is, optionally, changed.

As described below, method 700 detects two or more objects that are within respective portions of a physical environment that is within a field of view of one or more cameras, and displays a body tracking virtual effect applied to a first object of the two or more objects in the respective portion that includes the first object. In response to a request to pass the body tracking virtual effect from the first object to a second object of the two or more objects, the computer system intelligently displays the body tracking virtual effect within the respective portion of the physical environment that includes the respective body tracked object. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system, while a view of a three-dimensional environment, including a view of a first physical object that moves in a first portion of a first physical environment (e.g., a first user, a first portion of a first user, a first object held by a first user, a first autonomous or remote controlled object, or a first animal) (e.g., the first physical object can move as a whole and/or includes moving parts that move relative to other parts of the first physical object), is visible via the display generation component (optionally, among one or more virtual objects and/or virtual visual effects (e.g., virtual lighting effects, animated changes in visual appearances of objects, and/or virtual overlays)), detects (702) occurrence of a first event (e.g., receipt of a user input that corresponds to a request to perform an operation, satisfaction of one or more conditions (e.g., in the computer system, and/or in the real-world), and/or other user-generated or system-generated events). In some embodiments, the view of the three-dimensional environment is displayed in a user interface of an application, such as an application that supports real-time communication sessions between two or more users located in the same physical environment or in different physical environments, an application that provides a shared experience for users that are located in the same environment or in different physical environments, and/or applications that provide virtual reality and/or augmented reality experiences for users. In some embodiments, the view of the three-dimensional environment includes a representation of the first physical environment. In some embodiments, the view of the three-dimensional environment is generated based on the field of view of one or more cameras. In some embodiments, the view of the three-dimensional environment also includes a view of a second physical object that moves in a second portion of the first physical environment (e.g., a second user, a second portion of a second user, a second object held by a second user, a second autonomous or remote controlled object, or a second animal) (e.g., the second physical object can move as a whole and/or includes moving parts that move relative to other parts of the second physical object). In some embodiments, the first representation of the field of view of the one or more cameras is concurrently displayed with a second representation of the field of view of a different set of cameras, wherein the second representation of the field of view of the different set of cameras includes a view of the second physical object that moves in a second physical environment different from the first physical environment, and remote from the first physical environment (e.g., in different rooms, or in different geographical locations). In some embodiments, the views of the first physical object and the second physical object are optionally merged in the same three-dimensional virtual or augmented reality environment (e.g., a virtual dance studio, a virtual sports arena, or other environments of shared experiences). For example, as described with reference to FIG. 5B, the user is enabled to select virtual effects button 512 to apply a first virtual effect to the camera view.

The computer system, in response to detecting the occurrence of the first event, applies (704) a first virtual effect (e.g., an animated visual effect (e.g., including virtual lighting, animated changes in appearances of physical and objects, and/or display and movement of virtual objects) that overlays or changes the appearance of the view of the first physical environment and/or the first physical object in the field of view of the one or more cameras that is visible via the display generation component) to a first portion of the view of the three-dimensional environment with a first set of values for a first set of characteristics of the first virtual effect, wherein the first portion of the three-dimensional environment is proximate to (e.g., at or within a threshold distance of) the view of the first physical object (e.g., the view of the first physical object is optionally generated by segmenting the view of the first physical object from a view of the first physical environment captured by one or more cameras) in the view of the three-dimensional environment, and wherein the first set of values for the first set of characteristics are selected in accordance with tracking of movement of one or more portions of the first physical object (e.g., tracking of one or more portions moving relative to other portions of the first physical object) in the first portion of the first physical environment (e.g., the speed, movement direction, movement pattern, rhythm, trajectory, spatial extent, and/or other characteristics of the first virtual effect are determined by the tracking of the movement of the first physical object (e.g., movement speeds, current positions, movement rhythms, and/or other movement characteristics of one or more tracked portions of the first physical object). More details about how the first virtual effect can be applied are described with respect to method 600 and are not repeated herein in the interest of brevity. For example, as described with reference to FIG. 5F, rings virtual effect 520 is applied to the representation of the first user 508. In some embodiments, as described with reference to FIG. 5J, a virtual effect 550 is applied to the representation of the user 548.

The computer system, while applying the first virtual effect to the first portion of the view of the three-dimensional environment with the first set of values for the first set of characteristics of the first virtual effect (e.g., applying the first virtual effect in accordance with the tracking of movement of the one or more first portions of the first physical object, and/or segmentation of the view of the first physical object), detects (706) occurrence of a second event (e.g., receipt of a user input that corresponds to a request to perform an operation, satisfaction of one or more conditions (e.g., in the computer system, and/or in the real-world), and/or other user-generated or system-generated events). For example, as described with reference to FIG. 5H, the device 100 detects a gesture that satisfies passing criteria (e.g., the first user 503 pointing to the second user 505). In some embodiments, as described with reference to FIG. 5J, a passing gesture (e.g., the user performing a throwing gesture) is detected.

The computer system, in response to detecting the occurrence of the second event, in accordance with a determination that the occurrence of the second event meets first criteria (e.g., a first gesture and/or pose of the first physical object, such as a passing gesture and/or a pointing gesture is detected, or other conditions related to the motion of the first physical object, the position of the first physical object, the spatial relationship between the first physical object and a second physical object, and/or other aspects of the interaction between the first physical object and the second physical object (e.g., in a communication session, or shared experience, or in the physical world)), applies (707) the first virtual effect (e.g., an animated visual effect (e.g., including virtual lighting, animated changes in appearances of physical and objects, and/or display and movement of virtual objects) that overlays or changes the appearance of the view of the three-dimensional environment and/or the second physical object in the view of the three-dimensional environment that is visible via the display generation component) to a second portion, different from the first portion, of the view of the three-dimensional environment, with a second set of values, different from the first set of values, for the first set of characteristics of the first virtual effect, wherein the second portion of the three-dimensional environment is proximate to the view of a second physical object (e.g., the view of the second physical object is optionally generated by segmenting the view of the second physical object from a view of a second physical environment captured by one or more cameras) in the view of the three-dimensional environment, and wherein the second set of values for the first set of characteristics are selected in accordance with tracking of movement of one or more portions of the second physical object (e.g., tracking of one or more portions moving relative to other portions of the second physical object) in a second physical environment (e.g., in a second portion of the first physical environment, or in a different physical environment from the first physical environment) (e.g., the speed, movement direction, movement pattern, rhythm, trajectory, spatial extent, and/or other characteristics of the first virtual effect are determined by the tracking of the movement of the second physical object (e.g., movement speeds, current positions, movement rhythms, and/or other movement characteristics of one or more tracked portions of the second physical object)). More details about how the first virtual effect can be applied are described with respect to method 600 and are not repeated herein in the interest of brevity. In some embodiments, the second physical environment is optionally distinct from the first physical environment; for example, the second physical environment corresponds to a different location that is visible via a video conference (e.g., the second physical environment is outside of the field of view of the one or more first cameras and is instead in the field of view of one or more second cameras). In some embodiments, the second physical environment is within a same field of view of the one or more first cameras (e.g., the first physical environment and the second physical environment are the same physical environment (e.g., within a same room)). In some embodiments, the first virtual effect is passed (e.g., like a ball, or like an object) from the view of the first physical object to the view of the second physical object in the view of the three-dimensional environment (and ceases to be displayed in proximity to the first physical object and/or cease to track the movement of the one or more portions of the first physical object). In some embodiments, the first virtual effect is propagated (e.g., like a propagating wave, a virtual rainbow, or a piece of virtual fabric) from the view of the first physical object to the view of the second physical object in the view of the three-dimensional environment (and continues to be displayed in proximity to the first physical object and continues to track the motion of the one or more portions of the first physical object). For example, as described with reference to FIG. 5H, in some embodiments, in response to the first user 503 pointing to the second user 505, the rings virtual effect 532 is applied to the representation of the second user 529. In some embodiments, as described with reference to FIGS. 5J-5K, a virtual effect 550 is passed between two users that are participating in a real-time video communication session.

In some embodiments, prior to detecting the occurrence of the second event (e.g., while the first virtual effect is applied to the first portion of the view of the three-dimensional environment that is proximate to the first physical object and is tracking the movements of the first physical object): the computer system detects (708) first movement of the one or more portions of the first physical object (e.g., between positions, and/or forming various gestures or poses) in the first portion of the first physical environment; and in response to detecting the first movement of the one or more portions of the first physical object, updates the first virtual effect applied to the first portion of the view of the three-dimensional environment that is proximate to the view of the first physical object, including updating the first set of values of the first set of characteristics of the first virtual effect in accordance with the first movement of the one or more portions of the first physical object in the first portion of the first physical environment (and, optionally, forgoes displaying and/or updating the first virtual effect in a second portion of the three-dimensional environment that is proximate to the view of the second physical object based on movement of the second physical object in a second portion of the first physical environment or in a second physical environment). For example, in some embodiments, the first movement of the first physical object causes the first virtual effect to update, such as to follow the movement of the first physical object, remove virtual objects from a movement path of the first physical object, and/or allow actions of the first physical object to move virtual objects (e.g., a user can kick virtual objects out of the way on the floor). In some embodiments, after detecting the occurrence of the second event (e.g., while the first virtual effect is applied to a second portion of the view of the three-dimensional environment that is proximate to the view of the second physical object and is tracking the movements of the second physical object in the view of the three-dimensional environment): the computer system detects second movement of the one or more portions of the second physical object (e.g., between positions, and/or forming various gestures or poses) in the second physical environment (e.g., in the second portion of the first physical environment, or in a different physical environment from the first physical environment); and in response to detecting the second movement of the one or more portions of the second physical object, updates the first virtual effect applied to the second portion of the view of the three-dimensional environment that is proximate to the view of the second physical object, including updating the second set of values of the first set of characteristics of the first virtual effect in accordance with the second movement of the one or more portions of the second physical object in the second physical environment (and, optionally, forgoing displaying and/or updating the first virtual effect in the first portion of the three-dimensional environment that is proximate to the view of the first physical object based on movement of the first physical object in the first portion of the first physical environment). For example, as described with reference to FIGS. 5F and 5H, the rings virtual effect 520, while applied to the representation of the first user 508, updates in accordance with the movements of the first user 503, and, after the rings virtual effect 532 is passed to the representation of the second user 529, the rings virtual effect 532 updates in accordance with the movements of the second user 505. Automatically determining whether to update a virtual effect based on the movements of a second user, based on whether or not the computer system has detected that the virtual effect has been passed to (e.g., and should be applied to) the second user, such that the body tracking elements of the virtual effect are only updated by the movement of the second user after the computer system detects that the virtual effect has been passed to the second user, provides the user with improved visual feedback without requiring additional user inputs to modify properties of the virtual effect.

In some embodiments, prior to detecting the occurrence of the second event (e.g., while the first virtual effect is applied to the first portion of the view of the three-dimensional environment that is proximate to the first physical object and is tracking the movements of the first physical object): the computer system detects (710) third movement of the one or more portions of the second physical object (e.g., between positions, and/or forming various gestures or poses) in the second physical environment; and in response to detecting the third movement of the one or more portions of the second physical object, forgoes updating the first virtual effect applied to the second portion of the view of the three-dimensional environment that is proximate to the view of the second physical object (e.g., while updating the first set of values of the first set of characteristics of the first virtual effect in accordance with the first movement of the one or more portions of the first physical object in the first portion of the first physical environment). For example, in some embodiments, while the first virtual effect is applied to a first subject, but not a second subject (e.g., before the virtual effect has been passed from the first subject to the second subject in response to the second event that meets the first criteria), the movements of the second subject do not cause the first virtual effect to change. The movements of the first subject continue to cause the virtual effect to change in response to tracking the movements of the one or more portions of the first subject. In some embodiments, after detecting the occurrence of the second event (e.g., while the first virtual effect is applied to the second portion of the view of the three-dimensional environment that is proximate to the view of the second physical object and is tracking the movements of the second physical object in the view of the three-dimensional environment): the computer system detects fourth movement of the one or more portions of the first physical object (e.g., between positions, and/or forming various gestures or poses) in the first portion of the first physical environment; and in response to detecting the fourth movement of the one or more portions of the first physical object, forgoes updating the first virtual effect applied to the first portion of the view of the three-dimensional environment that is proximate to the view of the first physical object (e.g., while updating the second set of values of the first set of characteristics of the first virtual effect in accordance with the second movement of the one or more portions of the second physical object in the second physical environment). For example, in some embodiments, while the first virtual effect is applied to the second subject, but not the first subject (e.g., after the virtual effect has been passed from the first subject to the second subject in response to the second event that meets the first criteria), the movements of the first subject do not cause the first virtual effect to change. The movements of the second subject continue to cause the virtual effect to change in response to tracking the movements of the one or more portions of the second subject. For example, as described with reference to FIG. 5F, while the rings virtual effect 520 is applied to the representation of the first user 508, the movements of the second user 505 do not affect the display of rings virtual effect 520 (e.g., and vice versa, such that, after the rings virtual effect 532 is passed to the second user, movements of the first user 508 do not cause a change in the rings virtual effect 532). Updating display of a body tracking element of a virtual effect such that the body tracking element only changes based on movements of a first user, without changing the body tracking element of the virtual effect based on movements of a second user, provides the user with improved visual feedback as to which user is currently selected as the subject for the virtual effect.

In some embodiments, prior to detecting the occurrence of the second event (e.g., while the first virtual effect is applied to the first portion of the view of the three-dimensional environment that is proximate to the first physical object and is tracking the movements of the first physical object), the computer system applies (712) a second virtual effect (e.g., distinct from the first virtual effect; another virtual effect concurrently applied with the first virtual effect) to the first portion of the view of the three-dimensional environment that is proximate to the view of the first physical object, wherein the second virtual effect is updated in accordance with tracking of the movement of the one or more portions of the first physical object in the first portion of the first physical environment. In some embodiments, the second virtual effect is also applied and updated in accordance with tracking of motion of one or more other portions of the first physical object in the first portion of the first physical environment (e.g., the second virtual effect optionally tracks the movement of the feet and arms of the first subject, while the first virtual effect tracks the movement of the feet rather than the arms of the first subject). In some embodiments, after detecting the occurrence of the second event (e.g., while the first virtual effect is applied to a second portion of the view of the three-dimensional environment that is proximate to the view of the second physical object and is tracking the movements of the second physical object in the view of the three-dimensional environment): the computer system continues to update the second virtual effect (e.g., distinct from the first virtual effect; another virtual effect concurrently applied with the first virtual effect) that is applied to the first portion of the view of the three-dimensional environment that is proximate to the view of the first physical object in accordance with tracking of the movement of the one or more portions of the first physical object in the first portion of the first physical environment (e.g., the second virtual effect continues to be displayed as tracking the one or more portions of the first physical object even after the first virtual effect has optionally been handed off (or passed) to the second physical object). For example, as described with reference to FIG. 5H, the rings virtual effect 532 is passed from the representation of the first user 508 to the representation of the second user 529, without passing the virtual bubbles 536, which continue to be applied to the representation of the first user 508. In some embodiments, a virtual effect is applied to both users concurrently, as described with reference to rings virtual effect 530 in FIG. 5G, which encircles the representations of both users at the same time. Displaying a first virtual effect that continues to follow the movements of a first user, after the first user has passed a second virtual effect to another user, provides continuous visual feedback to the users and reduces a number of inputs needed to apply a combination of virtual effects to different users as the number of users in the physical environment changes over time.

In some embodiments, while applying the first virtual effect to the second portion of the view of the three-dimensional environment that is proximate to the view of the second physical object (e.g., applying the first virtual effect in accordance with the tracking of movement of the one or more portions of the second physical object, and/or segmentation of the view of the second physical object), without applying the first virtual effect to the first portion of the view of the three-dimensional environment that is proximate to the view of the first physical object (e.g., in response to detecting the second event that meets the first criteria), the computer system detects (714) occurrence of a third event (e.g., receipt of a user input that corresponds to a request to perform an operation, satisfaction of one or more conditions (e.g., in the computer system, and/or in the real-world), and/or other user-generated or system-generated events). In some embodiments, in response to detecting the occurrence of the third event, in accordance with a determination that the occurrence of the third event meets second criteria (e.g., a second gesture and/or pose of the second physical object, such as a passing gesture and/or a pointing gesture is detected, or other conditions related to the motion of the second physical object, the position of the second physical object, the spatial relationship between the first physical object and the second physical object, and/or other aspects of the interaction between the first physical object and the second physical object (e.g., in a communication session, or shared experience, or in the physical world)) (e.g., the second criteria are the same as the first criteria, or the second criteria are different from the first criteria): the computer system re-applies the first virtual effect (e.g., an animated visual effect (e.g., including virtual lighting, animated changes in appearances of physical and objects, and/or display and movement of virtual objects) that overlays or changes the appearance of the view of the three-dimensional environment and/or the second physical object in the view of the three-dimensional environment that is visible via the display generation component) to the first portion of the view of the three-dimensional environment that is proximate to the view of the first physical object in accordance with the tracking of movement of the one or more portions of the first physical object (e.g., tracking of one or more portions moving relative to other portions of the first physical object) in the first portion of the first physical environment; and ceases to apply the first virtual effect to the second portion of the view of the three-dimensional environment that is proximate to the view of the second physical object. For example, in some embodiments, the second subject performs a gesture to pass the first virtual effect back to the first subject, and as a result, the first virtual effect is no longer applied to the second subject and is reapplied to the first subject and starts to track the movement of the first subject again. For example, as described with reference to FIG. 5H, in some embodiments, the representation of the second user 529 is enabled to perform a gesture and/or provide an input to pass the rings virtual effect 530 (e.g., or another virtual effect) back to the representation of first user (e.g., optionally different than the gesture and/or input used to pass the rings virtual effect 520 from the first user to the second user). Enabling a second user to pass a first virtual effect back to a first user, for example by automatically detecting a gesture and/or by detecting a pose, that the first virtual effect was previously applied to, provides continuous visual feedback to the users and reduces a number of inputs needed to select which virtual effects to apply to the different users.

In some embodiments, in response to detecting the occurrence of the second event, in accordance with a determination that the occurrence of the second event does not meet the first criteria, the computer system continues (716) to update the first virtual effect that is applied to the first portion of the view of the three-dimensional environment that is proximate to the view of the first physical object in accordance with the tracking of the movement of the one or more portions of the first physical object in the first portion of the first physical environment, without applying the first virtual effect to the second portion of the view of the three-dimensional environment that is proximate to the view of the second physical object (e.g., without regard to the movement of the second physical object). For example, in some embodiments, if the first subject attempts to perform a pose, but the pose is not detected for a threshold amount of time and/or does not conform to a standard pose (e.g., and thus does not meet the first criteria), the first virtual effect is not passed to the second subject and continues to be applied to the view of the first subject, including tracking the movement of the first subject. For example, in FIGS. 5F-5H, if the device 100 does not detect first user 503 pointing to the second user 505 (e.g., or does not detect another gesture that satisfies passing criteria), the rings virtual effect 520 is not passed to the representation of the second user 529 (e.g., and is maintained as being applied to the representation of the first user 508 and/or as being applied to both representations of the users). Maintaining a virtual effect to be applied to a first user, without the first user passing the virtual effect to a second user, for example when the computer system has not detected that the user has performed a gesture and/or a pose for passing the virtual effect, provides continuous visual feedback to the users and reduces a number of inputs needed to select when to apply different virtual effects to the different users.

In some embodiments, while applying the first virtual effect to the first portion of the view of the three-dimensional environment in accordance with the tracking of movement of the one or more portions of the first physical object in the first portion of the first physical environment, the computer system detects (718) occurrence of a third event; and in response to detecting the occurrence of the third event, and in accordance with a determination that the occurrence of the third event meet third criteria (e.g., satisfaction of one or more conditions, such as conditions based on duration of the virtual effect, the spatial relationships between the subject(s) and the environment, positions and poses of the subjects, detected user inputs, and/or conditions based on other factors and inputs), applies a third virtual effect (e.g., different from the first virtual effect) to the first portion of the view of the three-dimensional environment that is proximate to the view of the first physical object, wherein the third virtual effect is applied (e.g., with respective values for a respective set of characteristics of the third virtual effect) in accordance with the tracking of movement of the one or more portions of the first physical object in the first portion of the first physical environment. In some embodiments, the third virtual effect is a different animation, color, or emphasis. In some embodiments, the third virtual effect is applied concurrently with the first virtual effect. In some embodiments, the third virtual effect replaces the first virtual effect. For example, text is displayed (e.g., as the third virtual effect) in addition to a bubble animation (e.g., the first virtual effect) in response to a particular gesture and/or pose of the first physical object. In some embodiments, the virtual effect changes over time, for example, as a song updates, such as while a chorus is playing back, text appears for the chorus. For example, in FIG. 5F, text 522 is displayed based on a position of the arm of the first user 503, wherein text 522 is optionally updated based on the lyrics of the portion of a song that is currently playing back. Automatically displaying one or more virtual elements in response to and/or based on a condition being met, such as playback of different portions of a song, provides the user with visual feedback indicating that the condition has been detected without requiring the user to provide additional inputs to update virtual effect, thereby reducing a number of inputs required to update the virtual effect as conditions change over time.

In some embodiments, the determination that the occurrence of the third event meets the third criteria includes (720) a determination that movement of the one or more portions of the first physical object (e.g., as determined based on the tracking of movement of the one or more portions of the first physical object) has met a first set of conditions (e.g., duration, conformity to a standard pose, movement distance, position, and conditions based on other factors). For example, in accordance with a determination that the movement has met the first set of conditions, the third virtual effect is applied and in accordance with a determination that the movement has not met the first set of conditions, the third virtual effect is not applied. For example, as described with reference to FIG. 5F, text 522 is displayed based on a position of the arm of the first user 503, wherein text 522 is optionally scrolled and/or moved in the camera view based on the positions of the first user's arm (e.g., to avoid overlap with the first user's arm). Automatically displaying one or more virtual elements in response to and/or based on a detected type of movement, performed by a detected person, provides the user with visual feedback indicating that the respective movement has been detected without requiring the user to provide additional inputs to update virtual effect, thereby reducing a number of inputs required to update the virtual effect.

In some embodiments, the first physical object and the second physical object are (722) collocated in the first physical environment, and the second physical environment is a second portion of the first physical environment different from the first portion of the first physical environment. In some embodiments, the view of the three-dimensional environment includes a representation of a field of view of one or more cameras that capture the view of the first physical environment including the view of the first physical object and the view of the second physical object. In some embodiments, the view of the three-dimensional environment includes a representation of the first physical environment, including the view of the first physical object in the first portion of the representation of the first physical environment and including the view of the second physical object in the second portion of the representation of the first physical environment. For example, as described with reference to FIGS. 5G-5H, the first user 503 is co-located with the second user 505 in a same physical environment 501. Displaying a virtual effect that interacts with multiple users at the same time while the users are co-located, including automatically detecting the presence of two or more users, provides continuous visual feedback to the users and reduces a number of inputs needed to apply virtual effects to different users as the number of users in the physical environment changes over time.

In some embodiments, the first physical object and the second physical object are (724) not collocated in a same physical environment, and the first physical environment is different from the second physical environment. In some embodiments, the view of the three-dimensional environment is based on one of the first or second physical environment, and is an augmented reality view of said one of the first and second physical environment. In some embodiments, the view of the three-dimensional environment is a virtual environment that has one or more spatial characteristics that are optionally based on the spatial characteristics of the first and/or the second physical environment (e.g., the floor and/or orientation of the first and second physical environment), and are otherwise not showing respective views of the first and/or second physical environment. In some embodiments, a view of the first physical environment and a view of the second physical environment are concurrently displayed (e.g., side by side, or with other spatial arrangements) in a field of view of the display generation component, and the virtual effects are applied to the respective views and may be passed between the respective views of the first and second physical environment. For example, as described with reference to FIGS. 5J-5K, in some embodiments, the users are not co-located, and representations of the users are concurrently displayed (e.g., in distinct video tiles). Displaying a virtual effect that is passed between two subjects that are not co-located in a physical environment to share the virtual effect, provides improved feedback about the status of the device and/or the status of another device at another location.

In some embodiments, the computer system displays (726) the view of the three-dimensional environment in a user interface of a real-time communication session (e.g., a shared experience, a video call, a game, and other copresence sessions or communication sessions between the first physical object that is a first user and the second physical object that is a second user). For example, as described with reference to FIGS. 5J-5K, in some embodiments, the first user and the second user are participating in a real-time communication session (e.g., a video call or other communication session). Displaying a virtual effect that is passed between two subjects that are participating in a communication session, without requiring that the subjects are co-located to share the virtual effect, provides improved feedback about the status of both devices.

In some embodiments, the computer system displays (728) the view of the first physical object and the view of the second physical object in a first content region and a second content region in a user interface (e.g., a user interface that includes the view of the three-dimensional environment), wherein the first content region is distinct from the second content region (e.g., the content regions are discrete regions displayed side by side, or separated by a finite distance from each other). In some embodiments, prior to detecting the second event, while applying the first virtual effect to the first portion of the view of the three-dimensional environment that is proximate to the view of the first physical object in accordance with the tracking of movement of the one or more portions of the first physical object in the first portion of the first physical environment, the computer system visually emphasizes the first content region relative to the second content region (e.g., highlighting the boundary of the first content region or enlarging the size of the first content region, relative to the second content region); and in response to detecting the occurrence of the second event, in accordance with the determination that the occurrence of the second event meets the first criteria, visually emphasizes the second content region relative to the first content region (e.g., highlighting the boundary of the second content region or enlarging the size of the second content region, relative to the first content region), while applying the first virtual effect to the second portion of the view of the three-dimensional environment that is proximate to the view of the second physical object in accordance with the tracking of movement of the one or more portions of the second physical object in the second physical environment. For example, in some embodiments, in response to the virtual effect being passed from the first physical object to the second physical object in the view of the three-dimensional environment, the respective physical object that is displayed in a content region with the virtual effect is visually emphasized relative to the other content region that does not have the virtual effect any longer. For example, as described with reference to FIG. 5K, the virtual effect 550 is passed to the user displayed in the video tile 544, and in response to the virtual effect 550 being displayed in video tile 544, the video tile 544 is visually emphasized (e.g., increases in size to be displayed as the main tile). Automatically visually emphasizing a first video tile such that the first video tile that includes a virtual effect that was passed from a second video tile to the first video tile, improves visual feedback of the device and reduces a number of user inputs required to enlarge, or otherwise highlight, the first video tile for an improved view of the virtual effect.

In some embodiments, the first virtual effect is further applied (730) to the first portion of the view of the three-dimensional environment that is proximate to the view of the first physical object in accordance with segmentation of the view of the first physical object from a view of the first portion of the first physical environment. For example, as described above with reference to method 600, the first virtual effect includes segmented visual elements and body tracking visual elements. For example, as described with reference to FIGS. 5F-5H, rings virtual effect 520 is displayed with body tracking virtual elements and segmented virtual elements. Automatically detecting a person within the field of view of the one or more cameras, and automatically displaying segmented virtual elements to appear to be at least partially hidden behind the detected person, or otherwise be displayed as surrounding the person (e.g., without occluding the person), while also displaying body tracking virtual elements that are displayed based on detected movements of at least a portion of the person, provides the user with visual feedback indicating that the person has been detected, including the movements of certain body parts of the person, without requiring the user to provide inputs to manually identify the person or manually remove portions of the virtual effect that cover the person.

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7E. For example, the virtual effects described above with reference to method 700 optionally have one or more of the characteristics of the virtual effects described herein with reference to other methods described herein (e.g., method 600). For brevity, these details are not repeated here.

The operations described above with reference to FIGS. 6A-6F and 7A-7E are, optionally, implemented by components depicted in FIGS. 1A-1B. For example, detection operation 602 and applying operation 604, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system in communication with a display generation component and one or more cameras:
while a representation of a field of view of the one or more cameras, including a view of a first physical object that moves in a portion of a first physical environment, is visible via the display generation component, detecting occurrence of a first event;
in response to detecting the occurrence of the first event, applying a first virtual effect to the representation of the field of view of the one or more cameras, including:
applying the first virtual effect with a first set of values for a first characteristic of the first virtual effect, wherein the first set of values for the first characteristic of the first virtual effect are selected in accordance with segmentation of the view of the first physical object from the view of the portion of the first physical environment; and
applying the first virtual effect with a second set of values for a second characteristic of the first virtual effect, wherein the second set of values for the second characteristic of the first virtual effect are selected in accordance with tracking of movement of one or more portions of the first physical object in the portion of the first physical environment.

2. The method of claim 1, including:
detecting first movement of the one or more portions of the first physical object in the portion of the first physical environment from a first position to a second position, wherein applying the first virtual effect with the second set of values for the second characteristic of the first virtual effect includes:
in response to detecting the first movement of the one or more portions of the first physical object from the first position to the second position, displaying animated movements of the first virtual effect in accordance with the first movement of the one or more portions of the first physical object from the first position to the second position.

3. The method of claim 1, including:
detecting movement of the one or more portions of the first physical object in the portion of the first physical environment from a first pose to a second pose, wherein applying the first virtual effect with the second set of values for the second characteristic of the first virtual effect includes:
in response to detecting the movement of the one or more portions of the first physical object from the first pose to the second pose, updating display of the first virtual effect in accordance with the movement of the one or more portions of the first physical object from the first pose to the second pose.

4. The method of claim 1, wherein applying the first virtual effect with the first set of values for the first characteristic of the first virtual effect includes:
displaying one or more virtual background elements in the view of the portion of the first physical environment, and
forgoing display, based on the segmentation of the view of the first physical object from the view of the portion of the first physical environment, of one or more portions of the one or more virtual background elements in the view of the portion of the first physical environment in accordance with a determination that respective positions of the one or more portions of the one or more virtual background elements are behind the first physical object relative to a current viewpoint of a user that corresponds to the view of the portion of the first physical environment.

5. The method of claim 1, wherein:
the first virtual effect includes a first set of one or more virtual elements; and
applying the first virtual effect with the second set of values for the second characteristic of the first virtual effect includes displaying animated movements of the first set of one or more virtual elements, in the view of the portion of the first physical environment, that follow tracked movement of the one or more portions of the first physical object.

6. The method of claim 5, wherein displaying the animated movements of the first set of one or more virtual elements that follow the tracked movement of the one or more portions of the first physical object further includes:
forgoing display, based on the segmentation of the view of the first physical object from the view of the portion of the first physical environment, of one or more portions of the first set of one or more virtual elements in the view of the portion of the first physical environment in accordance with a determination that respective positions of the one or more portions of the first set of one or more virtual elements are behind the first physical object relative to a current viewpoint of a user that corresponds to the view of the portion of the first physical environment.

7. The method of claim 5, wherein the first set of the one or more virtual elements that follow the tracked movement of the one or more portions of the first physical object includes a plurality of virtual elements that move away from the one or more portions of the first physical object during the tracked movement of the one or more portions of the first physical object.

8. The method of claim 5, wherein the first set of the one or more virtual elements that follow the tracked movement of the one or more portions of the first physical object includes a set of one or more virtual outlines having respective shapes that correspond to a shape of the one or more portions of the first physical object.

9. The method of claim 1, including:

detecting movement of at least a first portion of the first physical object relative to the first physical environment; and in response to detecting the movement of at least the first portion of the first physical object, in accordance with a determination that the movement satisfies motion criteria, updating the first set of values for the first characteristic of the first virtual effect to an updated first set of values for the first characteristic, wherein the updated first set of values for the first characteristic are selected at least in part in accordance with the movement of at least the first portion of the first physical object that satisfies the motion criteria.

10. The method of claim 9, wherein detecting the movement of at least the first portion of the first physical object that satisfies the motion criteria includes detecting a first gesture of the first physical object formed by the movement of at least the first portion of the first physical object.

11. The method of claim 9, wherein detecting the movement of at least the first portion of the first physical object that satisfies the motion criteria includes detecting that the movement of at least the first portion of the first physical object causes the at least the first portion of the first physical object to come into contact or break contact with one or more physical surfaces in the first physical environment.

12. The method of claim 1, wherein:

applying the first virtual effect with the first set of values for the first characteristic of the first virtual effect includes displaying a second set of one or more virtual elements in the view of the portion of the first physical environment, wherein the first set of values for the first characteristic of the first virtual effect defines respective first positions at which the second set of one or more virtual elements are displayed within the view of the portion of the first physical environment in accordance with respective current positions of the one or more portions of the first physical object, and defines which portions of the second set of one or more virtual elements are occluded by the one or more portions of the first physical object in the view of the portion of the first physical environment; and the method includes:

detecting movement of at least a portion of the one or more portions of the first physical object in the portion of the first physical environment; and in response to detecting the movement of the at least a portion of the first physical object in the portion of the first physical environment, updating the first set of values for the first characteristic of the first virtual effect to define respective second positions at which the second set of one or more virtual elements are displayed within the view of the portion of the first physical environment in accordance with the respective current positions of the one or more portions of the first physical object, and to update which portions of the second set of one or more virtual elements are occluded by the one or more portions of the first physical object in the view of the portion of the first physical environment.

13. The method of claim 1, wherein:

applying the first virtual effect with the first set of values for the first characteristic of the first virtual effect includes displaying one or more textual elements in the view of the portion of the first physical environment, wherein the first set of values for the first characteristic of the first virtual effect defines a respective position at which the textual element is displayed within the view of the portion of the first physical environment in accordance with segmentation of the view of the first physical object from the view of the portion of the first physical environment.

14. The method of claim 13, wherein the respective position at which the textual element is displayed within the view of the portion of the first physical environment is selected in accordance with a requirement that the textual element displayed at the respective position would not intersect with the view of the first physical object in the view of the portion of the first physical environment.

15. The method of claim 1, wherein:

the representation of the field of view of the one or more cameras includes a second physical object, distinct from the first physical object, that moves in the portion of the first physical environment; and the method includes:

applying the first virtual effect with a third set of values for a third characteristic of the first virtual effect, wherein the third set of values for the third characteristic of the first virtual effect are selected in accordance with segmentation of the view of the second physical object from the view of the portion of the first physical environment; and applying the first virtual effect with a fourth set of values for a fourth characteristic of the first virtual effect, wherein the fourth set of values for the fourth characteristic of the first virtual effect are selected in accordance with tracking of movement of one or more portions of the second physical object in the portion of the first physical environment.

16. The method of claim 1, wherein applying the first virtual effect includes displaying a first virtual object at a respective position, relative to the view of the first physical environment, that corresponds to a first portion of the first physical object, wherein at least a portion of an outline of a visible portion of the first virtual object is based on an outline of the view of the first physical object that is determined based on segmenting the view of the first physical object from the view of the portion of the first physical environment.

17. The method of claim 1, wherein:

applying the first virtual effect includes displaying a second virtual object at a respective position, relative to the view of the first physical environment, that is separated from the view of the first physical object, and the method includes:

detecting movement of at least one of the one or more portions of the first physical object in the portion of the first physical environment, wherein applying the first virtual effect with the second set of values for the second characteristic of the first virtual effect includes, in response to detecting the movement of the at least one of the one or more portions of the first physical object, animating the second virtual object to move the second virtual object away from the at least one portion of the one or more portions of the first physical object in accordance with motion tracking of the at least one portion of the one or more portions of the first physical object.

18. The method of claim 1, including:

while applying the first virtual effect to the representation of the field of view of the one or more cameras, detecting the occurrence of a second event;

in response to detecting the occurrence of the second event:

ceasing to apply the first virtual effect to the representation of the field of view of the one or more cameras; and applying a fourth virtual effect, distinct from the first virtual effect to the representation of the field of view of the one or more cameras.

19. A computer system, comprising:

a display generation component;

one or more cameras;

one or more processors; and memory storing one or more programs, wherein the one or more programs are configured to be executed by the one or more processors, the one or more programs including instructions for:

while a representation of a field of view of the one or more cameras, including a view of a first physical object that moves in a portion of a first physical environment, is visible via the display generation component, detecting occurrence of a first event;

in response to detecting the occurrence of the first event, applying a first virtual effect to the representation of the field of view of the one or more cameras, including:

applying the first virtual effect with a first set of values for a first characteristic of the first virtual effect, wherein the first set of values for the first characteristic of the first virtual effect are selected in accordance with segmentation of the view of the first physical object from the view of the portion of the first physical environment; and applying the first virtual effect with a second set of values for a second characteristic of the first virtual effect, wherein the second set of values for the second characteristic of the first virtual effect are selected in accordance with tracking of movement of one or more portions of the first physical object in the portion of the first physical environment.

20. The computer system of claim 19, the one or more programs further including instructions for:

detecting first movement of the one or more portions of the first physical object in the portion of the first physical environment from a first position to a second position, wherein applying the first virtual effect with the second set of values for the second characteristic of the first virtual effect includes:

in response to detecting the first movement of the one or more portions of the first physical object from the first position to the second position, displaying animated movements of the first virtual effect in accordance with the first movement of the one or more portions of the first physical object from the first position to the second position.

21. The computer system of claim 19, the one or more programs further including instructions for:

detecting movement of the one or more portions of the first physical object in the portion of the first physical environment from a first pose to a second pose, wherein applying the first virtual effect with the second set of values for the second characteristic of the first virtual effect includes:

in response to detecting the movement of the one or more portions of the first physical object from the first pose to the second pose, updating display of the first virtual effect in accordance with the movement of the one or more portions of the first physical object from the first pose to the second pose.

22. The computer system of claim 19, wherein applying the first virtual effect with the first set of values for the first characteristic of the first virtual effect includes:

displaying one or more virtual background elements in the view of the portion of the first physical environment, and forgoing display, based on the segmentation of the view of the first physical object from the view of the portion of the first physical environment, of one or more portions of the one or more virtual background elements in the view of the portion of the first physical environment in accordance with a determination that respective positions of the one or more portions of the one or more virtual background elements are behind the first physical object relative to a current viewpoint of a user that corresponds to the view of the portion of the first physical environment.

23. The computer system of claim 19, wherein:

the first virtual effect includes a first set of one or more virtual elements; and applying the first virtual effect with the second set of values for the second characteristic of the first virtual effect includes displaying animated movements of the first set of one or more virtual elements, in the view of the portion of the first physical environment, that follow tracked movement of the one or more portions of the first physical object.

24. The computer system of claim 19, the one or more programs further including instructions for:

detecting movement of at least a first portion of the first physical object relative to the first physical environment; and in response to detecting the movement of at least the first portion of the first physical object, in accordance with a determination that the movement satisfies motion criteria, updating the first set of values for the first characteristic of the first virtual effect to an updated first set of values for the first characteristic, wherein the updated first set of values for the first characteristic are selected at least in part in accordance with the movement of at least the first portion of the first physical object that satisfies the motion criteria.

25. The computer system of claim 19, wherein:

applying the first virtual effect with the first set of values for the first characteristic of the first virtual effect includes displaying a second set of one or more virtual elements in the view of the portion of the first physical environment, wherein the first set of values for the first characteristic of the first virtual effect defines respective first positions at which the second set of one or more virtual elements are displayed within the view of the portion of the first physical environment in accordance with respective current positions of the one or more portions of the first physical object, and defines which portions of the second set of one or more virtual elements are occluded by the one or more portions of the first physical object in the view of the portion of the first physical environment; and the one or more programs further include instructions for:

detecting movement of at least a portion of the one or more portions of the first physical object in the portion of the first physical environment; and in response to detecting the movement of the at least a portion of the first physical object in the portion of the first physical environment, updating the first set of values for the first characteristic of the first virtual effect to define respective second positions at which the second set of one or more virtual elements are displayed within the view of the portion of the first physical environment in accordance with the respective current positions of the one or more portions of the first physical object, and to update which portions of the second set of one or more virtual elements are occluded by the one or more portions of the first physical object in the view of the portion of the first physical environment.

26. The computer system of claim 19, wherein:
applying the first virtual effect with the first set of values for the first characteristic of the first virtual effect includes displaying one or more textual elements in the view of the portion of the first physical environment, wherein the first set of values for the first characteristic of the first virtual effect defines a respective position at which the textual element is displayed within the view of the portion of the first physical environment in accordance with segmentation of the view of the first physical object from the view of the portion of the first physical environment.

27. The computer system of claim 19, wherein:
the representation of the field of view of the one or more cameras includes a second physical object, distinct from the first physical object, that moves in the portion of the first physical environment; and
the one or more programs further include instructions for:
applying the first virtual effect with a third set of values for a third characteristic of the first virtual effect, wherein the third set of values for the third characteristic of the first virtual effect are selected in accordance with segmentation of the view of the second physical object from the view of the portion of the first physical environment; and
applying the first virtual effect with a fourth set of values for a fourth characteristic of the first virtual effect, wherein the fourth set of values for the fourth characteristic of the first virtual effect are selected in accordance with tracking of movement of one or more portions of the second physical object in the portion of the first physical environment.

28. The computer system of claim 19, wherein applying the first virtual effect includes displaying a first virtual object at a respective position, relative to the view of the first physical environment, that corresponds to a first portion of the first physical object, wherein at least a portion of an outline of a visible portion of the first virtual object is based on an outline of the view of the first physical object that is determined based on segmenting the view of the first physical object from the view of the portion of the first physical environment.

29. The computer system of claim 19, wherein applying the first virtual effect includes displaying a second virtual object at a respective position, relative to the view of the first physical environment, that is separated from the view of the first physical object, and the one or more programs further include instructions for:
detecting movement of at least one of the one or more portions of the first physical object in the portion of the first physical environment, wherein applying the first virtual effect with the second set of values for the second characteristic of the first virtual effect includes, in response to detecting the movement of the at least one of the one or more portions of the first physical object, animating the second virtual object to move the second virtual object away from the at least one portion of the one or more portions of the first physical object in accordance with motion tracking of the at least one portion of the one or more portions of the first physical object.

30. The computer system of claim 19, the one or more programs further including instructions for:
while applying the first virtual effect to the representation of the field of view of the one or more cameras, detecting the occurrence of a second event;
in response to detecting the occurrence of the second event:
ceasing to apply the first virtual effect to the representation of the field of view of the one or more cameras; and
applying a fourth virtual effect, distinct from the first virtual effect to the representation of the field of view of the one or more cameras.

31. A non-transitory computer readable storage medium storing one or more programs, the one or more programs comprising instructions that, when executed by a computer system that is in communication with a display generation component and one or more cameras, cause the computer system to:
while a representation of a field of view of the one or more cameras, including a view of a first physical object that moves in a portion of a first physical environment, is visible via the display generation component, detect occurrence of a first event;
in response to detecting the occurrence of the first event, apply a first virtual effect to the representation of the field of view of the one or more cameras, including:
applying the first virtual effect with a first set of values for a first characteristic of the first virtual effect, wherein the first set of values for the first characteristic of the first virtual effect are selected in accordance with segmentation of the view of the first physical object from the view of the portion of the first physical environment; and
applying the first virtual effect with a second set of values for a second characteristic of the first virtual effect, wherein the second set of values for the second characteristic of the first virtual effect are selected in accordance with tracking of movement of one or more portions of the first physical object in the portion of the first physical environment.

32. The non-transitory computer readable storage medium of claim 31, the one or more programs further comprising instructions that cause the computer system to:
detect first movement of the one or more portions of the first physical object in the portion of the first physical environment from a first position to a second position, wherein applying the first virtual effect with the second set of values for the second characteristic of the first virtual effect includes:
in response to detecting the first movement of the one or more portions of the first physical object from the first position to the second position, displaying animated movements of the first virtual effect in accordance with the first movement of the one or more portions of the first physical object from the first position to the second position.

33. The non-transitory computer readable storage medium of claim 31, the one or more programs further comprising instructions that cause the computer system to:
detect movement of the one or more portions of the first physical object in the portion of the first physical environment from a first pose to a second pose, wherein applying the first virtual effect with the second set of values for the second characteristic of the first virtual effect includes:

in response to detecting the movement of the one or more portions of the first physical object from the first pose to the second pose, updating display of the first virtual effect in accordance with the movement of the one or more portions of the first physical object from the first pose to the second pose.

34. The non-transitory computer readable storage medium of claim 31, wherein applying the first virtual effect with the first set of values for the first characteristic of the first virtual effect includes:

displaying one or more virtual background elements in the view of the portion of the first physical environment, and forgoing display, based on the segmentation of the view of the first physical object from the view of the portion of the first physical environment, of one or more portions of the one or more virtual background elements in the view of the portion of the first physical environment in accordance with a determination that respective positions of the one or more portions of the one or more virtual background elements are behind the first physical object relative to a current viewpoint of a user that corresponds to the view of the portion of the first physical environment.

35. The non-transitory computer readable storage medium of claim 31, wherein:

the first virtual effect includes a first set of one or more virtual elements; and applying the first virtual effect with the second set of values for the second characteristic of the first virtual effect includes displaying animated movements of the first set of one or more virtual elements, in the view of the portion of the first physical environment, that follow tracked movement of the one or more portions of the first physical object.

36. The non-transitory computer readable storage medium of claim 31, the one or more programs further comprising instructions that cause the computer system to:

detect movement of at least a first portion of the first physical object relative to the first physical environment; and in response to detecting the movement of at least the first portion of the first physical object, in accordance with a determination that the movement satisfies motion criteria, update the first set of values for the first characteristic of the first virtual effect to an updated first set of values for the first characteristic, wherein the updated first set of values for the first characteristic are selected at least in part in accordance with the movement of at least the first portion of the first physical object that satisfies the motion criteria.

37. The non-transitory computer readable storage medium of claim 31, wherein:

applying the first virtual effect with the first set of values for the first characteristic of the first virtual effect includes displaying a second set of one or more virtual elements in the view of the portion of the first physical environment, wherein the first set of values for the first characteristic of the first virtual effect defines respective first positions at which the second set of one or more virtual elements are displayed within the view of the portion of the first physical environment in accordance with respective current positions of the one or more portions of the first physical object, and defines which portions of the second set of one or more virtual elements are occluded by the one or more portions of the first physical object in the view of the portion of the first physical environment; and the one or more programs further comprise instructions that cause the computer system to:

detect movement of at least a portion of the one or more portions of the first physical object in the portion of the first physical environment; and in response to detecting the movement of the at least a portion of the first physical object in the portion of the first physical environment, update the first set of values for the first characteristic of the first virtual effect to define respective second positions at which the second set of one or more virtual elements are displayed within the view of the portion of the first physical environment in accordance with the respective current positions of the one or more portions of the first physical object, and to update which portions of the second set of one or more virtual elements are occluded by the one or more portions of the first physical object in the view of the portion of the first physical environment.

38. The non-transitory computer readable storage medium of claim 31, wherein:

applying the first virtual effect with the first set of values for the first characteristic of the first virtual effect includes displaying one or more textual elements in the view of the portion of the first physical environment, wherein the first set of values for the first characteristic of the first virtual effect defines a respective position at which the textual element is displayed within the view of the portion of the first physical environment in accordance with segmentation of the view of the first physical object from the view of the portion of the first physical environment.

39. The non-transitory computer readable storage medium of claim 31, wherein:

the representation of the field of view of the one or more cameras includes a second physical object, distinct from the first physical object, that moves in the portion of the first physical environment; and the one or more programs further comprise instructions that cause the computer system to:

apply the first virtual effect with a third set of values for a third characteristic of the first virtual effect, wherein the third set of values for the third characteristic of the first virtual effect are selected in accordance with segmentation of the view of the second physical object from the view of the portion of the first physical environment; and apply the first virtual effect with a fourth set of values for a fourth characteristic of the first virtual effect, wherein the fourth set of values for the fourth characteristic of the first virtual effect are selected in accordance with tracking of movement of one or more portions of the second physical object in the portion of the first physical environment.

40. The non-transitory computer readable storage medium of claim 31, wherein applying the first virtual effect includes displaying a first virtual object at a respective position, relative to the view of the first physical environment, that corresponds to a first portion of the first physical object, wherein at least a portion of an outline of a visible portion of the first virtual object is based on an outline of the view of the first physical object that is determined based on segmenting the view of the first physical object from the view of the portion of the first physical environment.

41. The non-transitory computer readable storage medium of claim 31, wherein applying the first virtual effect includes displaying a second virtual object at a respective position, relative to the view of the first physical environment, that is separated from the view of the first physical object, and the one or more programs further comprise instructions that cause the computer system to:

detect movement of at least one of the one or more portions of the first physical object in the portion of the first physical environment, wherein applying the first virtual effect with the second set of values for the second characteristic of the first virtual effect includes, in response to detecting the movement of the at least one of the one or more portions of the first physical object, animating the second virtual object to move the second virtual object away from the at least one portion of the one or more portions of the first physical object in accordance with motion tracking of the at least one portion of the one or more portions of the first physical object.

42. The non-transitory computer readable storage medium of claim 31, the one or more programs further comprising instructions that cause the computer system to:

while applying the first virtual effect to the representation of the field of view of the one or more cameras, detect the occurrence of a second event;

in response to detecting the occurrence of the second event:

cease to apply the first virtual effect to the representation of the field of view of the one or more cameras; and apply a fourth virtual effect, distinct from the first virtual effect to the representation of the field of view of the one or more cameras.

* * * * *